(12) United States Patent
Oberoi et al.

(10) Patent No.: US 11,884,377 B2
(45) Date of Patent: *Jan. 30, 2024

(54) HIGH-DENSITY ROBOTIC SYSTEM

(71) Applicant: The Boeing Company, Chicago, IL (US)

(72) Inventors: Harinder S. Oberoi, Snohomish, WA (US); Kevin Marion Barrick, Kingston, WA (US); Charles Yuanxin Hu, Newcastle, WA (US)

(73) Assignee: The Boeing Company, Chicago, IL (US)

( * ) Notice: Subject to any disclaimer, the term of this patent is extended or adjusted under 35 U.S.C. 154(b) by 1393 days.

This patent is subject to a terminal disclaimer.

(21) Appl. No.: 16/230,522

(22) Filed: Dec. 21, 2018

(65) Prior Publication Data
US 2020/0198754 A1    Jun. 25, 2020

(51) Int. Cl.
| | |
|---|---|
| B64C 1/06 | (2006.01) |
| B25J 9/16 | (2006.01) |
| B25J 5/00 | (2006.01) |
| B64C 1/12 | (2006.01) |
| B64C 1/14 | (2006.01) |
| B64F 5/10 | (2017.01) |

(52) U.S. Cl.
CPC ............... B64C 1/069 (2013.01); B25J 5/007 (2013.01); B25J 9/1682 (2013.01); B64C 1/12 (2013.01); B64C 1/14 (2013.01); B64F 5/10 (2017.01)

(58) Field of Classification Search
CPC ... B64C 1/069; B64C 1/12; B64C 1/14; B25J 5/007; B25J 9/1682; B25J 11/007; B25J 9/00; B25J 9/16; B25J 11/00; B25J 11/005; B25J 13/00; B64F 5/10; G05B 2219/31031; G05B 2219/39149; G05B 2219/45066; G05B 19/41805; Y02P 90/02; B21J 15/28; B23B 39/00; B23P 19/00
See application file for complete search history.

(56) References Cited

U.S. PATENT DOCUMENTS 4,885,836 A  * 12/1989  Bonomi  .................. B25J 9/0084
                                                       29/818
4,936,726 A     6/1990  Medard
5,042,787 A     8/1991  Duffaud
(Continued)

FOREIGN PATENT DOCUMENTS

| EP | 0338117 A2 | 10/1989 |
|---|---|---|
| EP | 2116340 A1 | 11/2009 |
| EP | 2965872 A2 | 1/2016 |

OTHER PUBLICATIONS

U.S. Appl. No. 16/230,280, filed Dec. 21, 2018.
(Continued)

*Primary Examiner* — Jeff A Burke
*Assistant Examiner* — Sihar A Karwan
(74) *Attorney, Agent, or Firm* — Haynes and Boone, LLP

(57) ABSTRACT

Methods and apparatuses for performing automated operations, such as installing fasteners at a plurality of locations along a joint, using a high-density robotic cell. A plurality of different tasks for a fastener installation operation is performed concurrently at selected locations of the plurality of locations using a plurality of single function end effectors positioned relative to the selected locations in a high-density setup.

26 Claims, 35 Drawing Sheets

(56) References Cited

U.S. PATENT DOCUMENTS

| | | | |
|---|---|---|---|
| 6,088,897 A | 7/2000 | Banks et al. | |
| 2004/0075206 A1 | 4/2004 | Starr | |
| 2010/0071192 A1* | 3/2010 | Sarh | B23B 35/00 269/8 |
| 2010/0217437 A1* | 8/2010 | Sarh | B64F 5/10 700/248 |
| 2011/0031671 A1* | 2/2011 | Toncelli | B25B 11/005 269/100 |
| 2011/0245971 A1 | 10/2011 | Sarh et al. | |
| 2012/0011693 A1 | 1/2012 | Amirehteshami et al. | |
| 2013/0341847 A1 | 12/2013 | Bense et al. | |
| 2016/0011593 A1 | 1/2016 | Oberoi et al. | |
| 2016/0243702 A1 | 8/2016 | Crothers | |
| 2017/0008094 A1 | 1/2017 | Nguyen et al. | |
| 2017/0072117 A1* | 3/2017 | Kurihara | F16K 7/17 |
| 2018/0326507 A1 | 11/2018 | Halvorsen et al. | |

OTHER PUBLICATIONS

U.S. Appl. No. 16/230,370, filed Dec. 21, 2018.
U.S. Appl. No. 16/230,441, filed Dec. 21, 2018.
U.S. Appl. No. 16/230,522, filed Dec. 21, 2018.
U.S. Appl. No. 16/229,402, filed Dec. 21, 2018.
Extended European Search Report dated May 27, 2020 from European Patent Application No. 19218372.1; pp. 1-11.
Extended European Search Report dated May 26, 2020 from European Patent Application No. 19218373.9; pp. 1-10.
Extended European Search Report dated May 26, 2020 from European Patent Application No. 19218374.7; pp. 1-10.
Extended European Search Report dated May 26, 2020 from European Patent Application No. 19218376.2; pp. 1-10.
Extended European Search Report dated Jun. 2, 2020 from European Patent Application No. 19218869.6; pp. 1-12.
Extended European Search Report dated May 26, 2020 from European Patent Application No. 19218877.9; pp. 1-14.
Extended European Search Report dated Jun. 2, 2020 from European Patent Application No. 19218998.3; pp. 1-14.
Marino A. et al: "A general low-cost and flexible architecture for robotized drilling in aircraft assembly lines," 2016 International Symposium on Power Electronics, Electrical Drives, Automation and Motion (SPEEDAM), IEEE, Jun. 22, 2016; pp. 1401-1408.
Wikipedia; Robot end effector; Downloaded May 31, 2020 from https://en.wikipedia.org/w/index.php?title=Robot_end_effector&oldid=950165238, Edited Apr. 10, 2020. Text is available under the Creative Commons Attribution-ShareAlike License; 5 pages.
Mir, R. and DeVlieg, R., "777X Control Surface Assembly Using Advanced Robotic Automation," SAE Technical Paper 2017-01-2092, 2017, doi: 10.4271/2017-01-2092, 7 pages.
Everhart, T., "Neighboring Mobile Robot Cell with Drilling and Fastening," SAE Technical Paper 2017-01-2094, 2017, doi:10.4271/2017-01-2094, 3 pages.

* cited by examiner

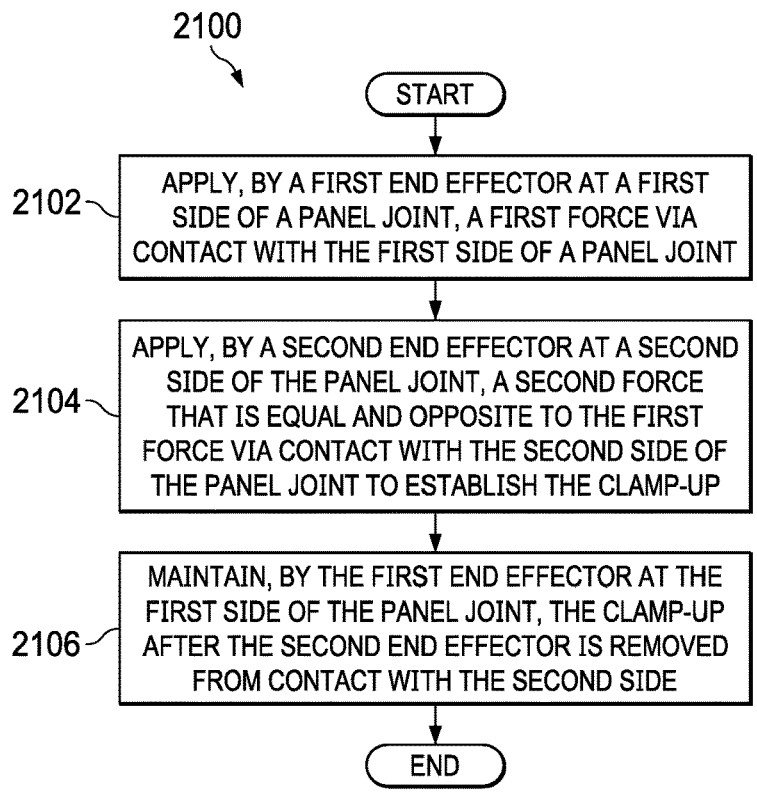
Fig. 21
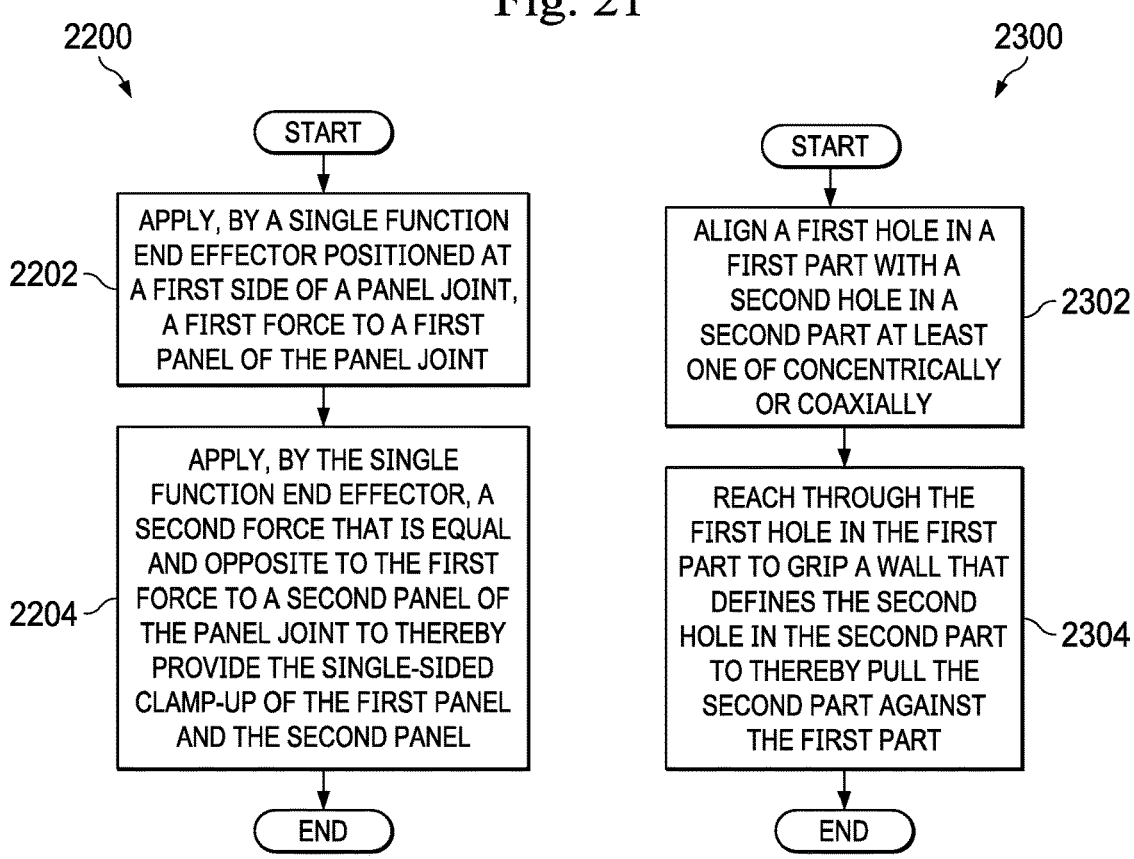
Fig. 22
Fig. 23

HIGH-DENSITY ROBOTIC SYSTEM

CROSS-REFERENCE TO RELATED APPLICATIONS

This application is related to U.S. patent application Ser. No. 16/230,189, filed Dec. 21, 2018, entitled "Method and Apparatus for Single-Sided Clamp-up;" U.S. patent application Ser. No. 16/230,280, filed Dec. 21, 2018, entitled "Method and Apparatus for Single-Sided Clamp-up;" U.S. patent application Ser. No. 16/230,370, filed Dec. 21, 2018, entitled "Method and Apparatus for Single-Sided Clamp-up;" and U.S. patent application Ser. No. 16/230,441, filed Dec. 21, 2018, entitled "High-Density Robotic System," each of which is incorporated herein by reference in its entirety.

FIELD

This disclosure generally relates to the assembly of parts and, more particularly, to methods and apparatuses for performing multiple operations using a high-density robotic cell that includes multiple single function end effectors.

BACKGROUND

Automating certain operations during the assembly of structures may increase assembly accuracy, improve assembly efficiency, and reduce overall assembly. For example, the tasks involved in the joining of two parts may be automated. These tasks may include clamping together the two parts, drilling holes through the two parts, inspecting the drilled holes, and inserting fasteners through the drilled holes.

Currently, some fastener installation operations are automated using robots with multifunction end effectors. A multifunction end effector may be a machine with multiple moving parts that work together to perform the various tasks involved in fastener installation, including clamping, drilling, inspection, and fastener insertion. One or more of these tasks may require that parts be held in place together (e.g., clamped up) in order for a fastener to be installed through the parts. Some currently available systems for maintaining the clamp-up of parts may be more complex and less efficient than desired for performing certain types of assembly operations.

Further, some currently available systems robotic systems and end effectors are larger in size, scale, and complexity, and thus require more volumetric space and maintenance than desired. Accordingly, a lower density of robotic devices than desired may be positioned near each other within a small volumetric space, which may limit the number of operations that can be performed concurrently. Further, the down time required for routine maintenance or repair of multifunction end effectors may be greater than desired, which may, in turn, slow down production rates more than desired. In some cases, the lower density of robotic devices that can be used may result in greater takt times and lower production efficiencies than desired.

SUMMARY

In another example embodiment, a high-density robotic system comprises a first plurality of robotic devices; a second plurality of robotic devices; a first platform; and a second platform. Each of the first plurality of robotic devices is capable of providing a single-sided clamp-up. The second plurality of robotic devices includes a first robotic device coupled to a drilling end effector; a second robotic device coupled to an inspection end effector; and a third robotic device coupled to a fastener insertion end effector. The first platform supports the first plurality of robotic devices, the first platform being sized to fit and move within an interior of a fuselage assembly. The second platform supports the second plurality of robotic devices, the second platform being sized for positioning and movement along an exterior of the fuselage assembly.

In another example embodiment, a method is provided for performing automated fastener installation operations along a fuselage assembly for an aircraft. A first platform supporting a first plurality of robotic devices of a robotic cell is positioned within an interior of a fuselage assembly relative to a selected section of the fuselage assembly. A second platform supporting a second plurality of robotic devices of the robotic cell is positioned along an exterior of the fuselage assembly relative to the selected section of the fuselage assembly. Automated fastener installation operations are performed at selected fastener installation points on the selected section of the fuselage assembly using a first plurality of end effectors coupled to the first plurality of robotic devices and a second plurality of end effectors coupled to the second plurality of robotic devices, with the first plurality of end effectors being used to provide single-sided clamp-up at the selected fastener installation points.

In another example embodiment, a method is provided for performing automated operations using a high-density robotic cell. A plurality of different tasks is performed at each location of a plurality of locations along an assembly according to a predetermined task sequence using a plurality of robotic devices. The plurality of robotic devices is used to perform at least two of the plurality of different tasks for at least two different locations of the plurality of locations concurrently within a high-density robotic zone, during at least one stage in the predetermined task sequence.

In another example embodiment, a method is provided for installing fasteners at a plurality of locations along a joint. A plurality of different tasks for a fastener installation operation is performed concurrently at selected locations of the plurality of locations using a plurality of single function end effectors positioned relative to the selected locations in a high-density setup.

In another example embodiment, a method is provided for providing multiple single-sided clamp-ups. A two-sided clamp-up is established at a first fastener installation point using a first robotic device at a first side of a joint and a second robotic device at a second side of the joint. The two-sided clamp-up at the first fastener installation point is converted to a single-sided clamp-up using the first robotic device. The second robotic device is moved along the second side of the joint to a second fastener installation point, while maintaining the single-sided clamp-up at the first fastener installation point. A third robotic device is moved along the second side of the joint to the first fastener installation point, while maintaining the single-sided clamp-up at the first fastener installation point.

In another example embodiment, a method is provided for installing fasteners on a splice. A sequence of operations to be performed by a plurality of cells on the splice is determined. The sequence of operations is performed on the splice using the plurality of cells, each cell of the plurality of cells including a first plurality of robotic devices located in a first high-density robotic zone at a first side of the splice and a second plurality of robotic devices located in a second high-density robotic zone at a second side of the splice.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the example embodiments are set forth in the appended claims. The example embodiments, however, as well as a preferred mode of use, further objectives and features thereof, will best be understood by reference to the following detailed description of an example embodiment of the present disclosure when read in conjunction with the accompanying drawings.

FIG. 21 is a flowchart of a process for maintaining a single-sided clamp-up in accordance with an example embodiment.

FIG. 22 is a flowchart of a process for maintaining a single-sided clamp-up in accordance with an example embodiment.

FIG. 23 is a flowchart of a process for providing a clamp-up in accordance with an example embodiment.

FIG. 36 is a flowchart of a process for installing fasteners on a splice in accordance with an example embodiment.

DETAILED DESCRIPTION

Figure 1:
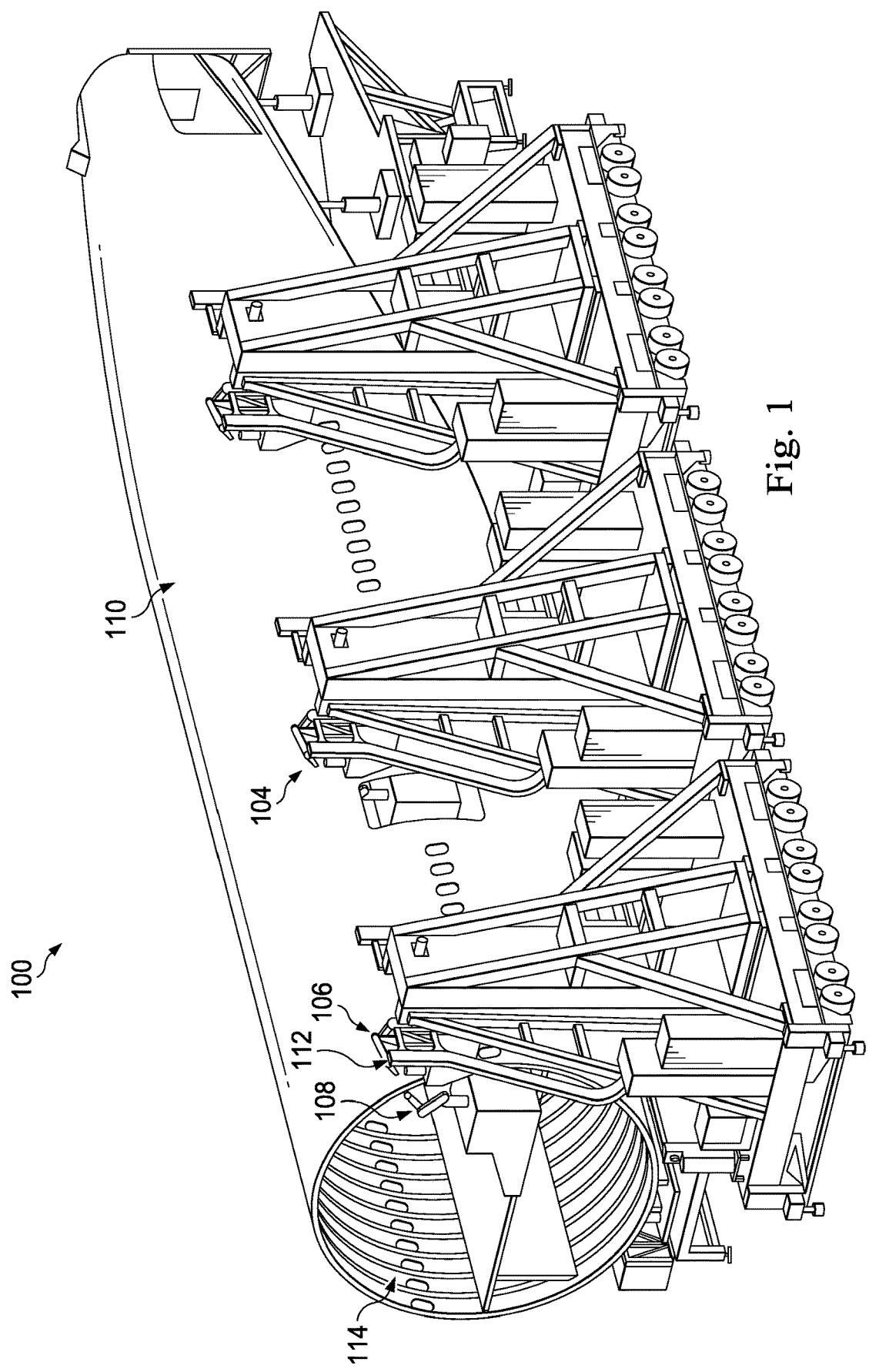
FIG. 1 is an illustration of a perspective view of manufacturing environment 100 in accordance with an example embodiment.

The example embodiments described below provide methods and apparatuses for improving the efficiency and ease of joining parts together. For example, the methods and apparatuses described below may improve the efficiency and ease and reduce the complexity of installing fasteners to join parts together. The example embodiments recognize and take into account that single function end effectors allow the various tasks (e.g., drilling, inspection, fastener insertion) of a fastener installation operation to be separated. By using a different single function end effector for the different tasks, the end effectors may be made smaller, lighter, and less complex than multifunction end effectors.

The simplicity of single function end effectors may help improve the overall efficiency and reliability of using end effectors to automate fastener installation operations. Further, the simplicity of single function end effectors may reduce the amount of maintenance required, the overall size of the supporting robot and associated structure, or both.

In particular, the example embodiments recognize and take into account that the parts of an assembly through which a fastener is being installed need to be held in place together (e.g., clamped together) while the single function end effectors are being switched out to perform the various tasks. The example embodiments provide methods and apparatuses for holding these parts together from one side of the assembly to enable the switching out of single function end effectors on the other side of the assembly.

In one example embodiment, a method is provided for automating a fastener installation. A first mechanical force is applied to a first part and a second mechanical force is applied to a second part to form a clamp-up of the first part and the second part. Air is suctioned through a fastener hole, which is formed by a first hole in the first part that is aligned with a second hole in the second part, to pull the second part towards the first part and thereby maintain the clamp-up of the first part and the second part even after the second mechanical force has been removed.

In another example embodiment, method is provided for aligning a first hole in a first panel with a second hole in a second panel to define a through-hole. A wall that defines the second hole is gripped from within the through-hole to pull the second panel towards the first panel and thereby establish a clamp-up of the first panel and the second panel.

In yet another example embodiment, a method is provided for using a single function end effector to maintain a clamp-up. The single function end effector is positioned at one side of a panel joint and applies both a first force on a first panel of the panel joint and a second force on a second panel of the panel joint to maintain the clamp-up. The first force may be, for example, a suction force, while the second force may be, for example, a reactive force applied in response to the suction force. In this manner, a single-sided clamp-up is achieved.

Thus, the example embodiments provide methods and systems for establishing a clamp-up, maintaining a clamp-up, or both of a first panel and a second panel. These methods and systems involve gripping a wall that defines a hole in the second panel from within a hole in the first panel to pull the second panel towards the first panel. The first hole and the second hole form a through-hole extending through the first panel and the second panel.

This gripping may be performed by, for example, drawing a partial vacuum (e.g., suctioning) through a fastener hole (e.g., the through-hole) in a direction from the second panel towards the first panel. This gripping force is combined with an opposing force (e.g., a reactive force) created by the single function end effector being positioned in contact with the first panel. In this manner, single-sided clamp-up is achieved. The clamp-up is formed from the side of the first panel to allow movement of tools and devices and provide space for any number of operations to be performed at the side of the second panel.

In some cases, one or more panels may be present between the first panel and the second panel. The fastener hole extends through the first panel, the second panel, and any number of panels between the first and second panels. In other cases, sealant is applied on the faying surfaces of one or both of the first and second panels.

Referring now to the figures, FIG. 1 is an illustration of a perspective view of manufacturing environment 100 in accordance with an example embodiment. Within manufacturing environment 100, fuselage assembly 102 is being built. In this illustrative example, plurality of assembly systems 104 is positioned relative to fuselage assembly 102.

Assembly system 106 is an example of one of plurality of assembly systems 104. Assembly system 106 includes robotic devices 108 positioned relative to exterior 110 of fuselage assembly 102 and robotic devices 112 positioned relative to interior 114 of fuselage assembly 102. Robotic devices 108 and robotic devices 112 work together to perform fastener installation operations for the building of fuselage assembly 102.

Figure 2:
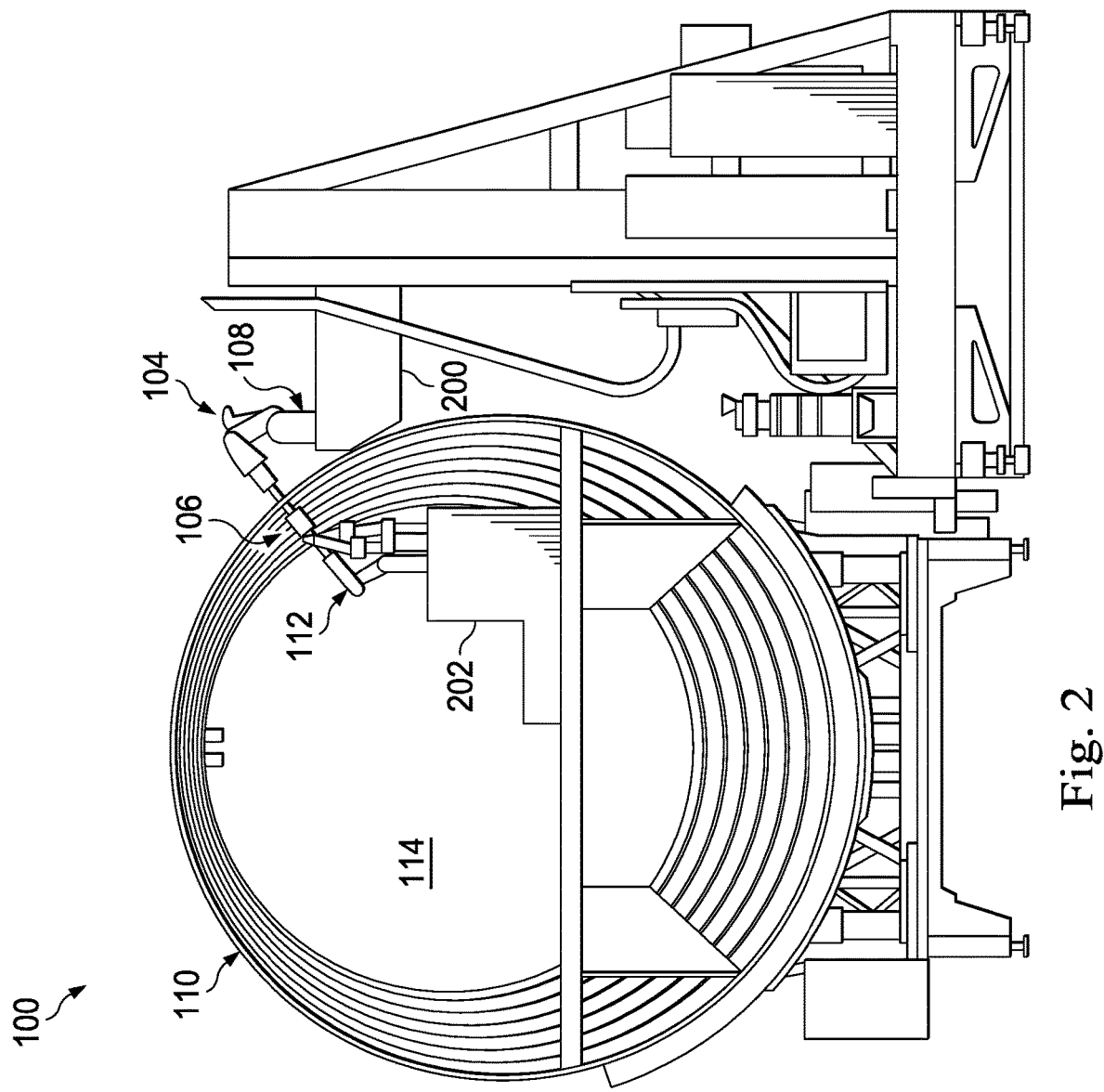
FIG. 2 is an illustration of an end view of the fuselage assembly from FIG. 1 being built in accordance with an example embodiment.

FIG. 2 is an illustration of an end view of fuselage assembly 102 being built in accordance with an example embodiment. As depicted, robotic devices 108 are supported by platform 200 and robotic devices 112 are supported by platform 202. Robotic devices 108 and robotic devices 112 work together to install fasteners that join fuselage panels together to build fuselage assembly 102.

In this illustrative example, robotic devices 108 are coupled with end effectors for performing drilling, inspection, and fastener insertion tasks. These end effectors are single function end effectors that may be switched out by being moved around relative to, for example, fastener installation point 113 to perform their individual tasks. A single function end effector is an end effector used to perform a single function per robotic device per fastener installation point. In some cases, robotic devices 108 are moved around on platform 200 in order to position the end effector for a particular task relative to fastener installation point 113. In other cases, robotic devices 108 may remain stationary on platform 200 but may be used to move their end effectors around in order to position the proper end effector for a given task relative to fastener installation point 113.

Each of robotic devices 112 is coupled with an end effector that is used to hold together the fuselage panels from the interior side of fuselage assembly 102 during the switching out of the single function end effectors coupled to robotic devices 108. For example, after the end effector on one of robotic devices 108 has been used to perform its designated task, that end effector may be moved away from fastener installation point 113 to make room for a different end effector. An end effector coupled to one of robotic devices 112 is used to maintain the clamp-up of the fuselage panels from only the interior side of fuselage assembly 102, while the end effectors are being switched around on the exterior side of fuselage assembly 102.

Figure 3:
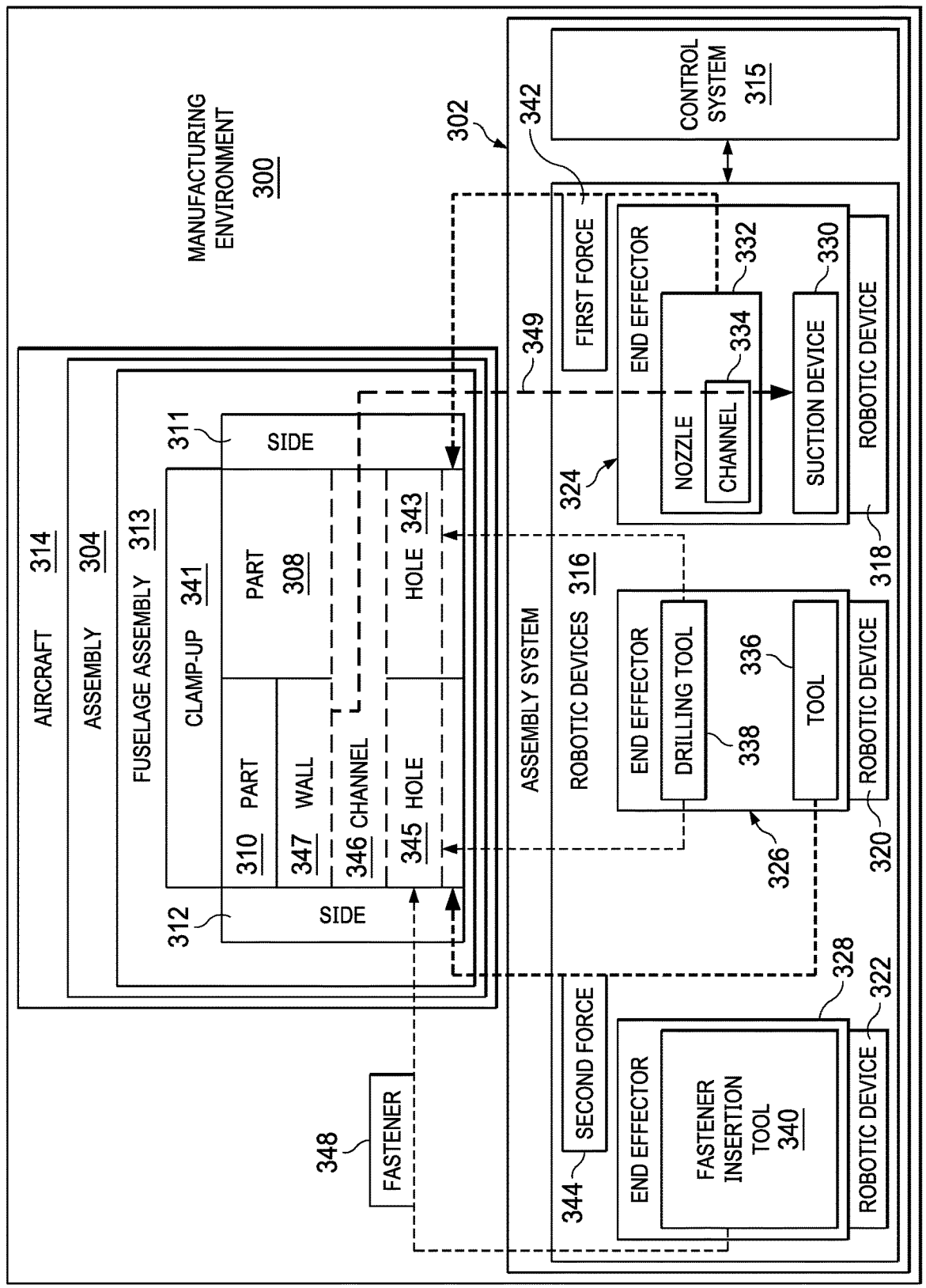
FIG. 3 is a block diagram of a manufacturing environment in accordance with an example embodiment.

FIG. 3 is a block diagram of a manufacturing environment 300 in accordance with an example embodiment. Manufacturing environment 100 in FIG. 1 is an example of one implementation for manufacturing environment 300. Within manufacturing environment 300, assembly system 302 is used to build assembly 304.

Assembly 304 includes part 308 and part 310. Part 308 and part 310 are mated to form a joint (not shown) in assembly 304. Side 311 of part 308, which forms a first side of the joint, faces opposite part 310. Side 312 of part 310, which forms a second side of the joint, faces opposite part 308.

Although assembly 304 is described as having only two parts in these example embodiments, in other cases, assembly 304 may include more than two parts. In one illustrative example, assembly 304 takes the form of fuselage assembly 313 of aircraft 314. In one example, part 308 and part 310 take the form of fuselage panels. In other examples, part 308 and part 310 take the form of other types of aircraft parts, such as wing panels. When part 308 and part 310 take the form of panels, they together form a panel joint.

Assembly system 106 in FIG. 1 is an example of one implementation for assembly system 302. Assembly system 302 includes control system 315 and plurality of robotic devices 316. Control system 315 controls the operation of robotic devices 316. Control system 315 is implemented using software, hardware, firmware, or a combination thereof.

When software is used, the operations performed by control system 315 may be implemented using, for example, without limitation, program code configured to run on a processor unit. When firmware is used, the operations performed by control system 315 may be implemented using, for example, without limitation, program code and data and stored in persistent memory to run on a processor unit.

When hardware is employed, the hardware may include one or more circuits that operate to perform the operations performed by control system 315. Depending on the implementation, the hardware may take the form of a circuit system, an integrated circuit, an application specific integrated circuit (ASIC), a programmable logic device, or some other suitable type of hardware device configured to perform any number of operations. A programmable logic device may be configured to perform certain operations. The device may be permanently configured to perform these operations or may be reconfigurable. A programmable logic device may take the form of, for example, without limitation, a programmable logic array, a programmable array logic, a field programmable logic array, a field programmable gate array, or some other type of programmable hardware device.

In these illustrative examples, control system 315 may be implemented using a computer system. The computer system may include a single computer or multiple computers in communication with each other.

Plurality of robotic devices 316 includes, for example, without limitation, robotic device 318, robotic device 320, and robotic device 322. Robotic device 318, robotic device 320, and robotic device 322 are coupled with end effector 324, end effector 326, and end effector 328, respectively. Each of these end effectors may be considered a single function end effector. In some illustrative examples, end effector 324, end effector 326, and end effector 328 are considered part of robotic device 318, robotic device 320, and robotic device 322, respectively. In other illustrative examples, end effector 324, end effector 326, and end effector 328 are considered separate from but attachable to and detachable from robotic device 318, robotic device 320, and robotic device 322.

In one example embodiment, end effector 324 includes suction device 330 and a tool, which may be nozzle 332, coupled to suction device 330. Nozzle 332 is directly or indirectly coupled to suction device 330. In these illustrative examples, nozzle 332 may be an elongated member with channel 334 that extends through nozzle 332. Suction device 330 generates suction that with sufficient power, suctions air into and through channel 334 within nozzle 332.

End effector 326 includes tool 336 and drilling tool 338. In some illustrative examples, tool 336 is a cylindrical member that surrounds drilling tool 338. End effector 328 includes fastener insertion tool 340.

To perform a fastener installation, end effector 324 and end effector 326 are positioned on opposite sides of assembly 304. These end effectors are used to apply equal and opposite forces (e.g., first force 342 and second force 344 to part 308 and part 310, respectively) to form clamp-up 341. In particular, end effector 324 and end effector 326 are operated to apply equal and opposite forces to side 311 of part 308 and side 312 of part 310, respectively, to form clamp-up 341.

For example, at least one of robotic device 318 or end effector 324 is operated to apply first force 342 to side 311 of part 308 using nozzle 332. First force 342 is a first mechanical force, which may also be referred to as a clamping force in some cases. In some cases, end effector 324 includes an extension system for moving nozzle 332 towards side 311 to apply first force 342 to part 308. Further, at least one of robotic device 320 or end effector 326 may be operated to apply second force 344 to the other side of assembly 304 using tool 336. Second force 344 is a second mechanical force, which may also be referred to as a clamping force in some cases. In some cases, end effector 326 includes an extension system for moving tool 336 towards side 312 to apply second force 344 to part 310.

In one example, nozzle 332 and tool 336 are simultaneously extended towards and pressed against part 308 and part 310, respectively, to apply first force 342 to part 308 and second force 344 to part 310. Nozzle 332 and tool 336 are pressed against part 308 and part 310, respectively, until the desired force static equilibrium is achieved between first force 342 and second force 344. In other words, nozzle 332 and tool 336 are pressed or pushed against part 308 and part 310, respectively, until first force 342 and second force 344, which are equal and opposite forces, reach amounts sufficient to establish clamp-up 341 of part 308 and part 310.

Once clamp-up 341 is achieved, nozzle 332 and tool 336 are held in fixed positions with respect to the reference coordinate system. Thus, clamp-up 341 is maintained in a fixed position relative to the reference coordinate system by the force static equilibrium created by the positioning of nozzle 332 and tool 336 with respect to the reference coordinate system.

In some illustrative examples, clamp-up 341 includes part 308, part 310, with both having sealant applied to the faying surfaces of these parts. In other words, the clamp-up may include the sealant sealing these parts together. This type of clamp-up 341 of part 308 and part 310 may be used for "one-up" assembly.

In some illustrative examples, drilling tool 338 is used to drill hole 343 through part 308 and hole 345 through part 310 while clamp-up 341 of these parts is maintained using suction 349. Drilling tool 338 is positioned at side 312 such that the drilling of both hole 343 and hole 345 is performed from side 312. In this manner, hole 345 is formed before hole 343. In one or more examples, drilling tool 338 includes a suction device or some other type of cleanup device that is used to help remove part shavings or castoffs that are created during drilling.

Maintaining clamp-up 341 of these parts during drilling ensures that hole 343 and hole 345 are aligned during and after drilling to form fastener hole 346. Further, maintaining clamp-up 341 of these parts during drilling may also help maintain clamp-up of a sealant (not shown) between part 308 and part 310; prevent gaps between part 308 and part 310; prevent drill filings, shavings, or castoffs from falling through or otherwise entering one or more gaps between part 308 and part 310; reduce or eliminate a need to deburr edges of hole 343 and hole 345 after drilling; or a combination thereof.

Hole 343 in part 308 and hole 345 in part 310 are formed concentrically and coaxially. Fastener hole 346 may also be referred to as a channel or a through-hole. As used herein, a through-hole is a hole that passes through two or more parts and is thereby formed by the coaxial holes through these two or more parts.

Prior to installation of fastener 348 within fastener hole 346, end effector 326 needs to be switched out for end effector 328 having fastener insertion tool 340. But because tool 336 of end effector 326 is being used to maintain clamp-up 341, a different mechanism for maintaining clamp-up 341 is needed before end effector 328 can be switched out. For example, movement of tool 336 away from part 310 or movement of nozzle 332 away from part 308, without some additional mechanism for maintaining clamp-up 341, could undo clamp-up 341. Accordingly, a mechanism for maintaining clamp-up 341 while still allowing end effector 326 to be switched out with end effector 328 is needed.

Suction device 330 of end effector 324 is used to maintain clamp-up 341 from only side 311 to thereby allow end effector 326 at side 312 to be switched out with end effector 328. In particular, suction device 330 generates suction 349 to suction air through fastener hole 346 from side 311. Suctioning is performed while the force static equilibrium between first force 342 and second force 344 is maintained.

The volumetric flow rate of the suctioning is sufficient to pull part 310 towards part 308 to maintain clamp-up 341. In particular, the volumetric flow rate is sufficient to provide a gripping force that grips wall 347 defining hole 345 to pull part 310 towards part 308. In other illustrative examples, wall 347 may also be referred to as a hole wall. This suctioning is sufficient to independently maintain clamp-up 341 of part 308 and part 310 relative to each other.

By using the suctioning to grip wall 347 that defines hole 345 in part 310, suction device 330 applies a suction force to part 310. This suction force pulls part 310 towards part 308 and ultimately, towards end effector 324. The positioning of nozzle 332 of end effector 324 relative to part 308 and with respect to the reference coordinate system creates a reactive force in response to the suction force. This reactive force is equal and opposite to the suction force.

Suctioning is performed until a desired force static equilibrium is reached between the suction force and the reactive force. Once the desired force static equilibrium is reached, suctioning can be used to independently maintain clamp-up 341 even when tool 336 is moved away from clamp-up 341.

In this manner, suction device 330 produces suction 349 sufficient to hold part 308 and part 310 in place relative to each other even after second force 344 has been removed (e.g., when tool 336 is moved away and end effector 326 is switched out for another end effector). In other words, when tool 336 is moved away and out of contact with part 310, such that second force 344 is removed, the suctioning of air through fastener hole 346 and into channel 334 of nozzle 332 maintains clamp-up 341 of part 308 and part 310.

In one or more illustrative examples, control system 315 is used to control the operation of end effector 324, end effector 326, and end effector 328. Control system 315 ensures that the desired force static equilibriums discussed above are established to thereby maintain clamp-up 341 and prevent any undesired shifting of part 308 relative to part 310 when end effector 326 for drilling is switched out with end effector 328 for fastener installation.

Specifically, end effector 326 with drilling tool 338 may be switched out with end effector 328 having fastener insertion tool 340. Fastener insertion tool 340 is used to insert fastener 348 within fastener hole 346 while suction device 330 continues to suction air through fastener hole 346 from the opposite side 311 of assembly 304. In this manner, assembly system 302 may allow installation of fastener 348 to be performed in a simple, easy, and efficient manner.

Suction device 330 provides a sufficient suction force that in combination with the reactive force provided by nozzle 332 maintains clamp-up 341 without requiring an additional force at side 312 of clamp-up 341. In other words, suction device 330 and nozzle 332 together ensure that clamp-up 341 is independently maintained from a single side of clamp-up 341.

Fastener 348 is installed while clamp-up 341 is maintained with suction 349. In these illustrative examples, suctioning continues until fastener 348 is fully installed within fastener hole 346. In some cases, fastener 348 is considered fully installed when a desired interference fit is formed between fastener 348 and fastener hole 346. In other examples, fastener 348 is considered fully installed only after fastener 348 has been inserted within fastener hole 346 and fastener retaining hardware has been installed over fastener 348. Fastener retaining hardware may include, for example, a collar, a nut, some other type of hardware, or a combination thereof. In other examples, fastener 348 may be considered fully installed after one or more other operations have been performed.

Once fastener 348 has been fully installed, suction 349 is no longer needed to maintain clamp-up. In other words, fastener 348 is used to maintain clamp-up 341 after suctioning has been stopped.

The illustration of manufacturing environment 100 in FIG. 1 is not meant to imply physical or architectural limitations to the manner in which an example embodiment may be implemented. Other components in addition to or in place of the ones illustrated may be used. Some components may be optional. Further, the blocks are presented to illustrate functional components. One or more of these blocks may be combined, divided, or combined and divided into different blocks when implemented in an example embodiment.

For example, in some cases, the drilling of fastener hole 346 may be part of a different process prior to part 308 and part 310 being brought together to form clamp-up 341. For example, first hole 343 may be drilled into part 308 and hole 345 may be drilled into part 310 prior to these parts being clamped-up.

Part 308 and part 310 may then be positioned relative to each other. In these examples, part 308 and part 310 are positioned to align hole 343 and hole 345 at least one of concentrically or coaxially. Hole 343 and hole 345 may be sized such that when hole 343 and hole 345 are aligned together they form fastener hole 346. In other examples, hole 343 and hole 345 may be determinate assembly (DA) holes. When hole 343 and hole 345 are determinate assembly holes and aligned coaxially, they form an index hole (not shown). Part 308 and part 310 may be temporarily mated using, for example, a temporary fastener installed through the index hole. The index hole may also be referred to as a reference hole, a guide hole, a tooling hole, or a through-hole.

In one or more examples, after the coaxial alignment of hole 343 and hole 345, suction 349 is used to establish and maintain clamp-up 341 of part 308 and part 310. This suctioning is formed at side 311 such that clamp-up 341 is a single-sided clamp-up. In some cases, when a temporary fastener is used to join part 308 and part 310, suction 349 is applied simultaneously with the removal of the temporary fastener to thereby establish and maintain clamp-up 341.

With reference to FIGS. 4-15, illustrations of an assembly system for performing a fastener installation operation are depicted in accordance with an example embodiment. In some illustrative examples, the assembly system may be referred to as a fastener installation system.

Figure 4:
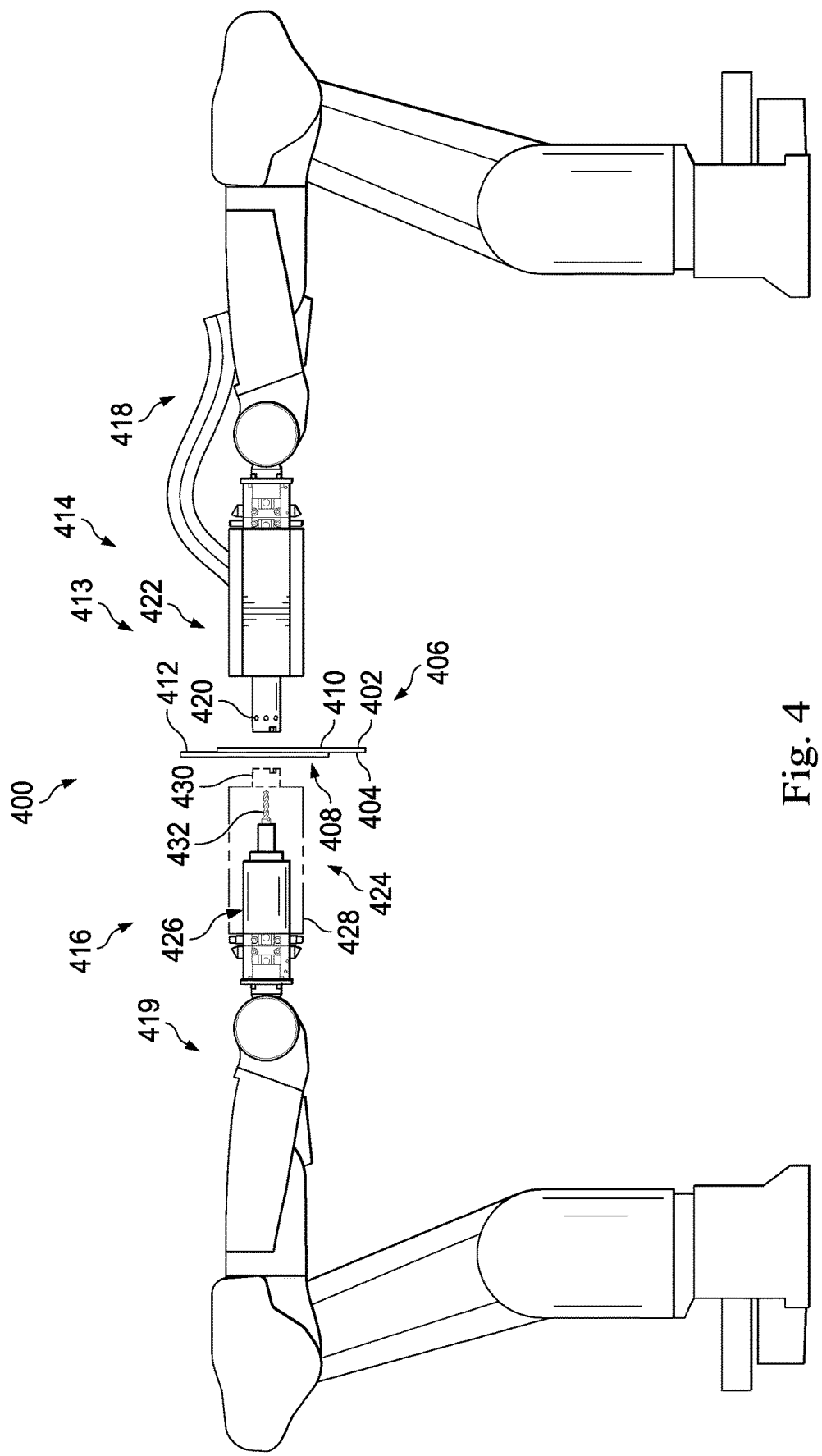
FIG. 4 is an illustration of a side view of robotic devices with single function end effectors positioned relative to an assembly in accordance with an example embodiment.

FIG. 4 is an illustration of an end view of single function end effectors positioned relative to a lap splice in accordance with an example embodiment. Lap splice 400 is an example of one implementation for assembly 304 in FIG. 3 or a panel joint in assembly 304. In addition to lap splice 400, the example embodiments may be also applicable to other types of splices not shown.

Lap splice 400 includes first part 402 and second part 404, which may be examples of implementations for part 308 and part 310 of FIG. 3, respectively. In other examples, lap splice 400 may include a third part (not shown) or some other number of parts. In one illustrative example, first part 402 and second part 404 take the form of fuselage panels. The size and scale of first part 402 and second part 404 in FIGS. 4-15 is shown for illustrative purposes only. In other illustrative examples, the size of first part 402 and second part 404 may be smaller than or much larger than shown in FIGS. 4-15.

Lap splice 400 has first side 406 and second side 408. In this illustrative example, first side 406 is formed by surface 410 of first part 402 and second side 408 is formed by surface 412 of second part 404. When first part 402 and second part 404 take the form of fuselage panels of a fuselage assembly, surface 410 of first part 402 may be facing an interior of the fuselage assembly and surface 412 of second part 404 may be facing an exterior of the fuselage assembly (the head of the fastener will be installed on the exterior surface, 412 when process completed).

In this illustrative example, assembly system 413 is positioned relative to assembly 409. Assembly system 413 includes end effector 414, end effector 416, robotic device 418, and robotic device 419.

End effector 414 and end effector 416 are coupled to robotic device 418 and robotic device 419, respectively. End effector 414 and end effector 416 may be examples of implementations for end effector 324 and end effector 326 of FIG. 3, respectively. End effector 414 is positioned relative to first side 406 of lap splice 400 and end effector 416 is positioned relative to second side 408 of lap splice 400.

End effector 414 and end effector 416 may be single function end effectors. End effector 414 includes at least nozzle 420 and suction device 422, which are examples of implementations of nozzle 332 and suction device 330, respectively, from FIG. 3. End effector 416 includes tool 424 and drilling tool 426. Tool 424 is depicted as transparent in FIG. 4 for illustrative purposes only. Tool 424 and drilling tool 426 are examples of implementations of tool 336 and drilling tool 338, respectively, from FIG. 3.

In this illustrative example, tool 424 includes element 428 and element 430. Element 428 takes the form of, for example, without limitation, a first cylindrical member that surrounds drilling tool 426. Element 430 takes the form of, for example, without limitation, a second cylindrical member having a smaller diameter than the first cylindrical member but sufficiently large to allow drill bit 432 of drilling tool 426 to pass through the second cylindrical member. In some illustrative examples, element 430 is sufficiently large to allow drill shavings or chips to be collected during drilling.

Figure 5:
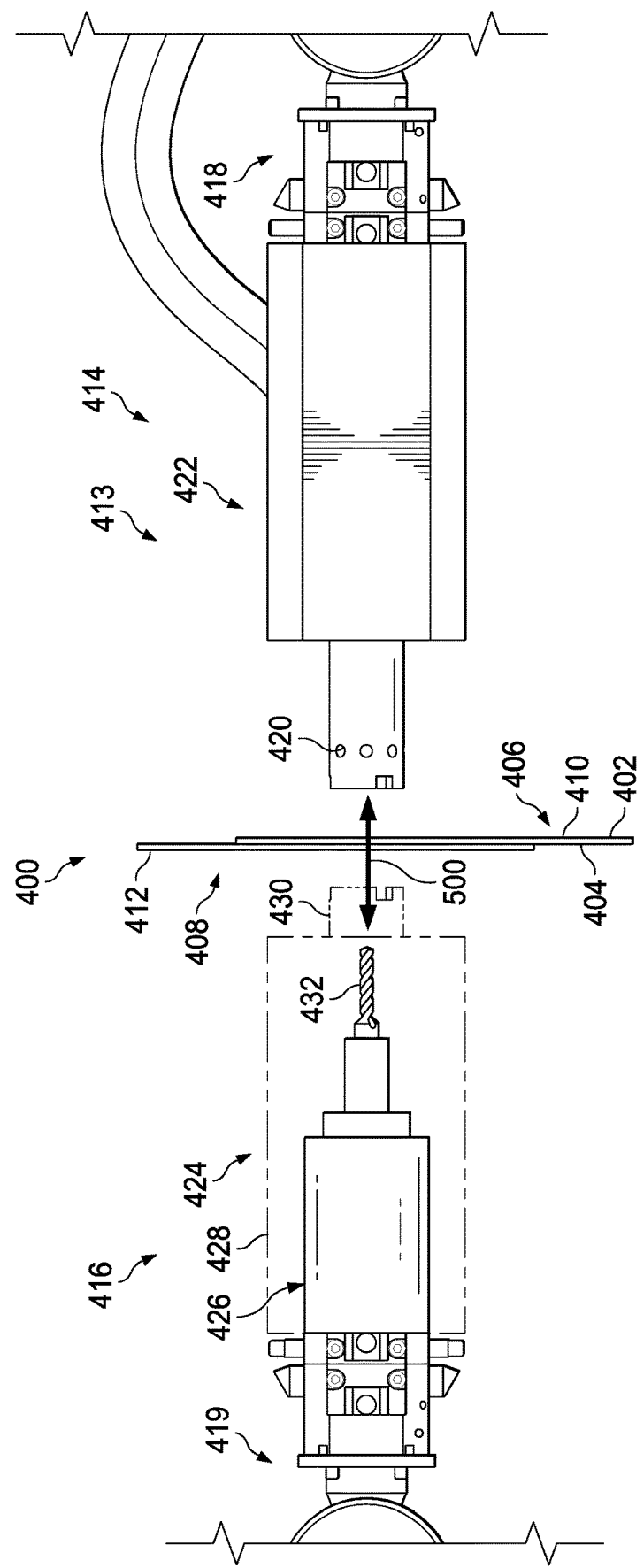
FIG. 5 is an illustration of an enlarged side view of end effectors from FIG. 4 positioned relative to the lap splice from FIG. 4 in accordance with an example embodiment.

FIG. 5 is an illustration of an enlarged side view of end effector 414 and end effector 416 positioned relative to lap splice 400 in accordance with an example embodiment. In this illustrative example, end effector 414 and end effector 416 have been positioned in alignment with reference axis 500 through lap splice 400. Reference axis 500 may be an axis substantially perpendicular to lap splice 400 that passes through lap splice 400 at the location at which a hole is to be drilled and a fastener is to be installed.

Figure 6:
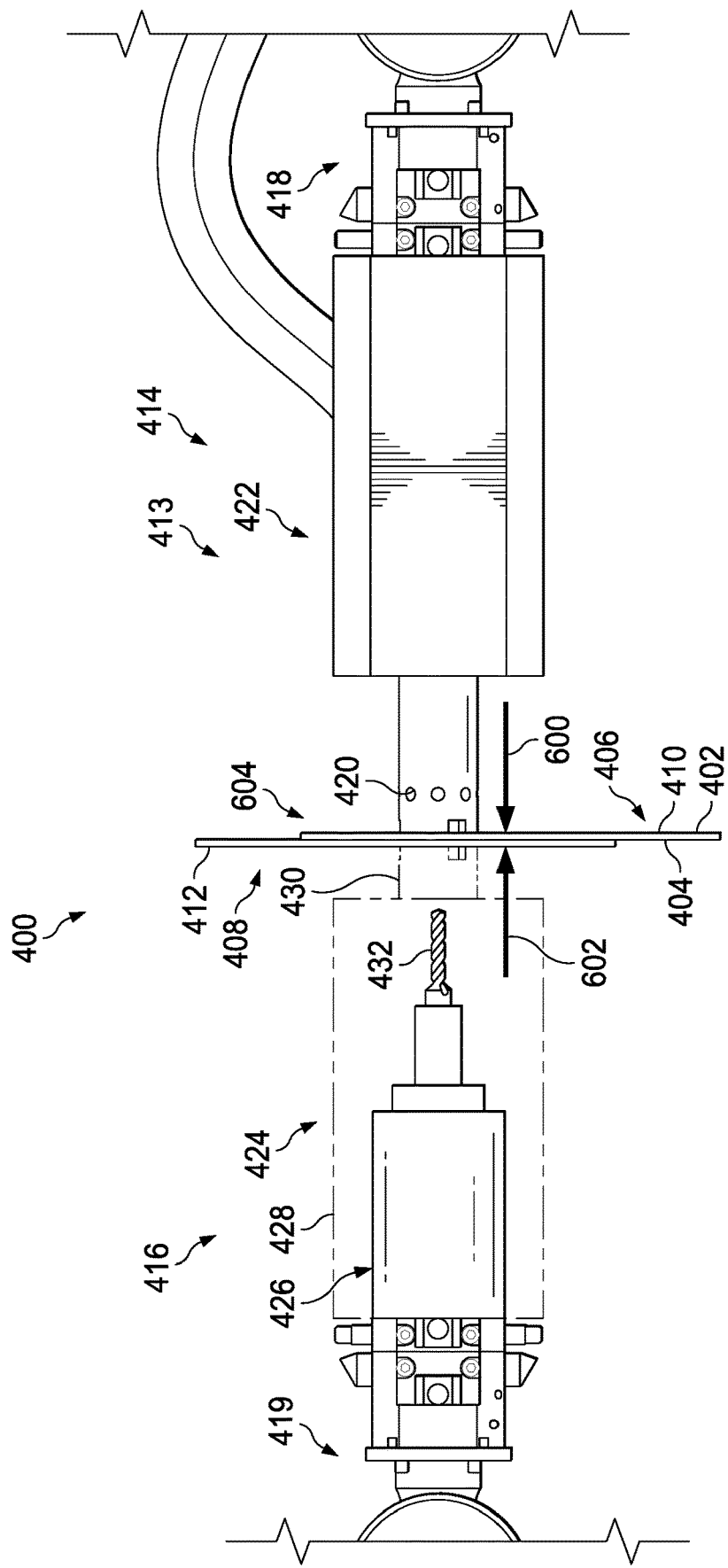
FIG. 6 is an illustration of a side view of the end effectors from FIG. 4 applying forces to the lap splice from FIG. 4 in accordance with an example embodiment.

FIG. 6 is an illustration of a side view of end effector 414 and end effector 416 applying forces to lap splice 400 in accordance with an example embodiment. As depicted, at least one of end effector 414 or robotic device 418 has been used to move nozzle 420 into contact with first side 406 of lap splice 400. Nozzle 420 is pushed against first side 406 to apply first force 600 to first side 406. First force 600 is an example of first force 342 in FIG. 3. First force 600 is a mechanical force.

Similarly, at least one of end effector 416 or robotic device 419 has been used to move element 430 into contact with second side 408 of lap splice 400. In particular, element 430 is pushed against second side 408 to apply second force 602 to second side 408.

Nozzle 420 and element 430 are pushed against first part 402 and second part 404, respectively, until a desired force static equilibrium is reached between first force 600 and second force 602 applied to lap splice 400. Once this desired force static equilibrium has been reached, clamp-up 604 of first part 402 and second part 404 is achieved. In other words, first part 402 and second part 404 may be held in place such that each of these parts is held in a particular position relative to the other.

While nozzle 420 and element 430 are no longer pushed against first part 402 and second part 404, respectively, they are kept fixed in the positions at which the desired force static equilibrium is achieved to maintain clamp-up 604. In some cases, sealant may be present in between first part 402 and second part 404.

Figure 7:
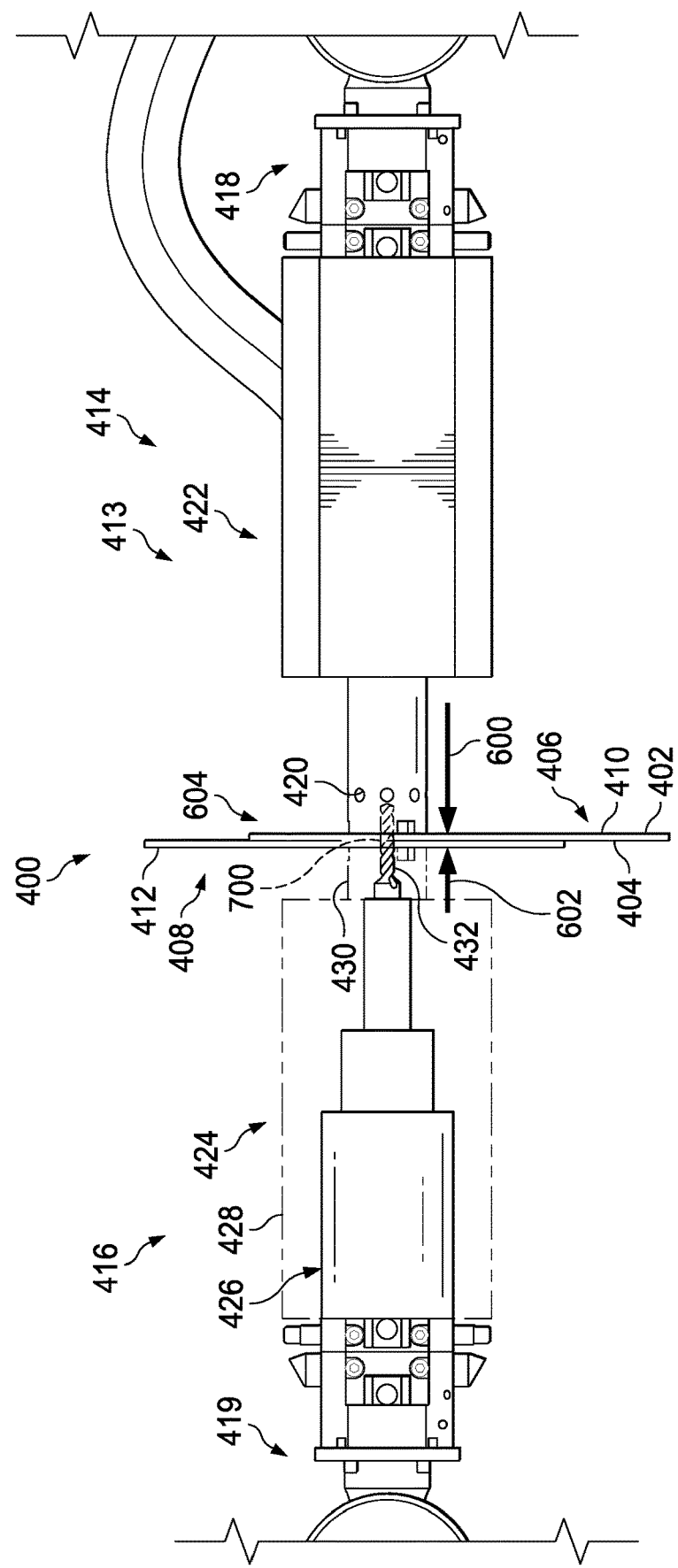
FIG. 7 is an illustration of a side view of a drilling operation in accordance with an example embodiment.

FIG. 7 is an illustration of a side view of a drilling operation in accordance with an example embodiment. Once clamp-up 604 of first part 402 and second part 404 has been established, drilling tool 426 of end effector 416 is operated to drill fastener hole 700 that extends through lap splice 400. Fastener hole 700 may extend from second side 408 of second part 404 all the way through to first side 406 of first part 402. In some cases, fastener hole 700 may be countersunk. Fastener 700 is an example of one implementation for fastener hole 346 in FIG. 3.

Figure 8:
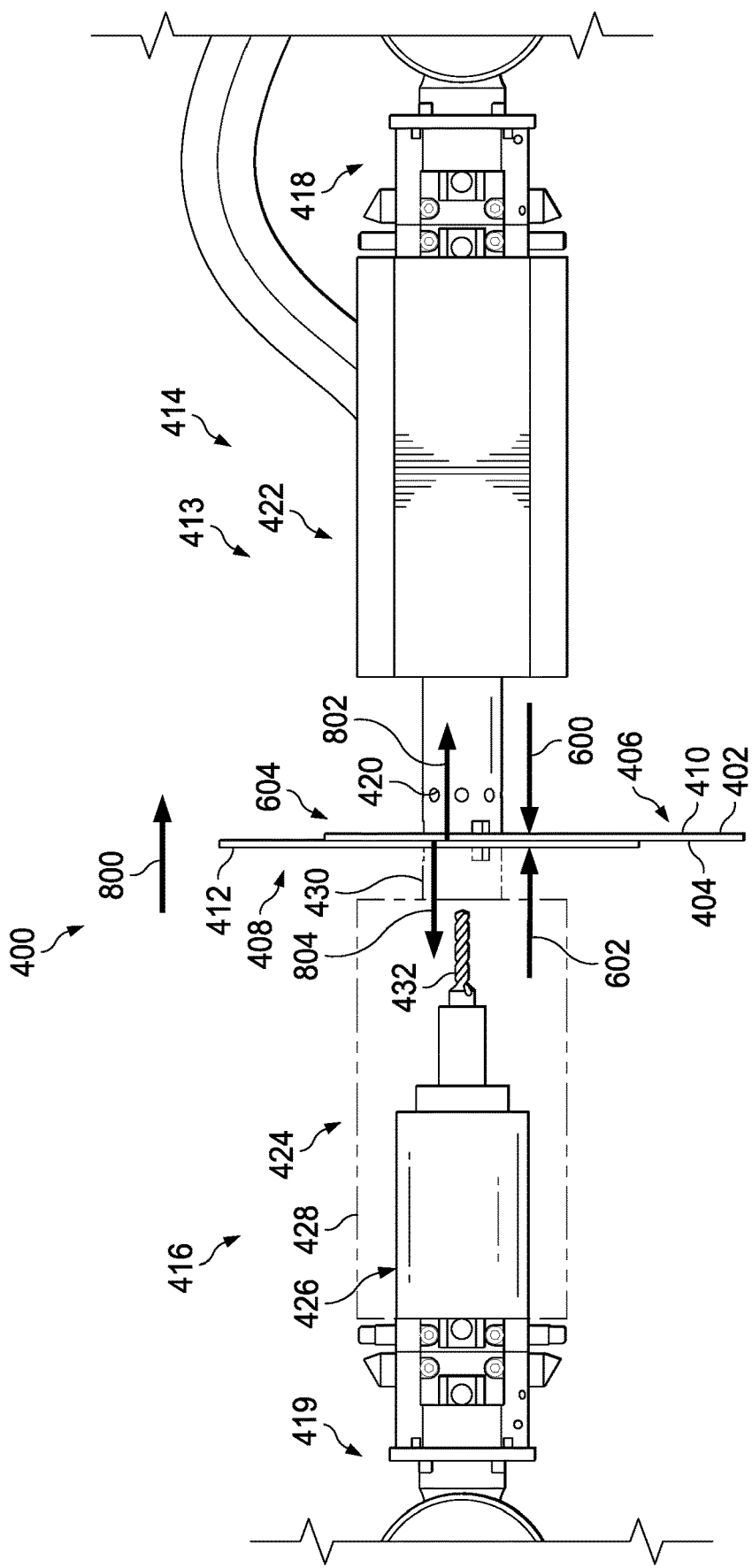
FIG. 8 is an illustration of a side view of a suctioning operation in accordance with an example embodiment.

FIG. 8 is an illustration of a side view of a suctioning operation in accordance with an example embodiment. After fastener hole 700 has been drilled, drill bit 432 is moved away from second part 404. For example, drill bit 432 may be retracted within element 428.

Suction device 422 of end effector 414 is operated to suction air through fastener hole 700 from first side 406 of lap splice 400. Air is suctioned through fastener hole 700 in the direction of arrow 800 from second side 408 of lap splice 400 towards first side 406 of lap splice 400. The air is suctioned through fastener hole 700 and into nozzle 420.

This suctioning creates a force, which may be suction force 802, that is applied to second part 404. Suction force 802 pulls second part 404 towards first part 402. Reactive force 804 is created in response to suction force 802 by the positioning of nozzle 420 in contact with first part 402.

Suctioning is performed until the desired force static equilibrium is achieved between suction force 802 and reactive force 804. For example, suction power may be increased until the desired force static equilibrium is achieved and sufficient suction power has been generated to allow clamp-up 604 to be maintained via suction independently of first force 600 and second force 602.

In these illustrative examples, suction device 422 may be operated to continue to suction air through fastener hole 700 until the fastener installation operation has been completed. In some examples, each of element 430 and nozzle 420, or both, may have at least one of a notch, a groove, a port, an opening, or some other type of vent for allowing air to pass in and out. This venting helps ensure that the suction power is not greater than desired. For example, element 430 may have one or more notches along the edge of element 430 that comes into contact with second part 404 to help make moving element 430 away from second part 404 while suctioning is ongoing easier.

Figure 9:
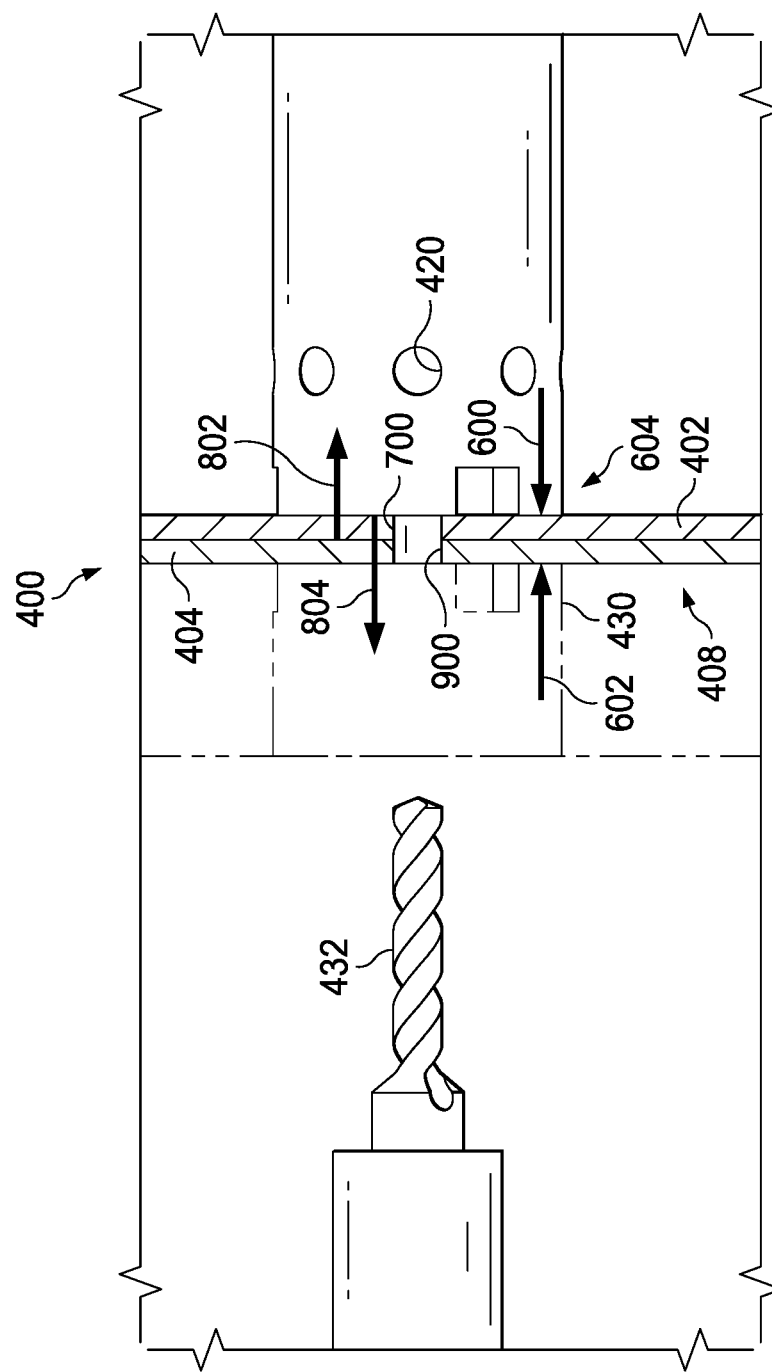
FIG. 9 is an illustration of an enlarged cross-sectional side view of the parts from FIG. 8 in accordance with an example embodiment.

FIG. 9 is an illustration of an enlarged cross-sectional side view of first part 402 and second part 404 in accordance with an example embodiment. This view allows fastener hole 700 and wall 900 that defines the portion of fastener hole 700 formed within second part 404 to be more clearly seen. Wall 900 may also be referred to as a hole wall.

As depicted, suction force 802 may be a gripping force that grips wall 900 defining the portion of fastener hole 700 formed within second part 404 to thereby pull second part 404 towards first part 402, and ultimately, towards nozzle 420. Nozzle 420 applies reactive force 804 on first part 402.

Together, suction force 802 and reactive force 804 may be used to independently maintain clamp-up 604 even after element 430 is moved away and out of contact with second part 404. By allowing clamp-up 604 to be maintained independently of first force 600 and second force 602, end effector 416 may be switched out with a different end effector. For example, at least one of end effector 416 or robotic device 419 may be operated to move element 430 of tool 424 away from lap splice 400. Robotic device 419 may then be switched out with a different robotic device and a different effector may be positioned relative to lap splice 400.

Figure 10:
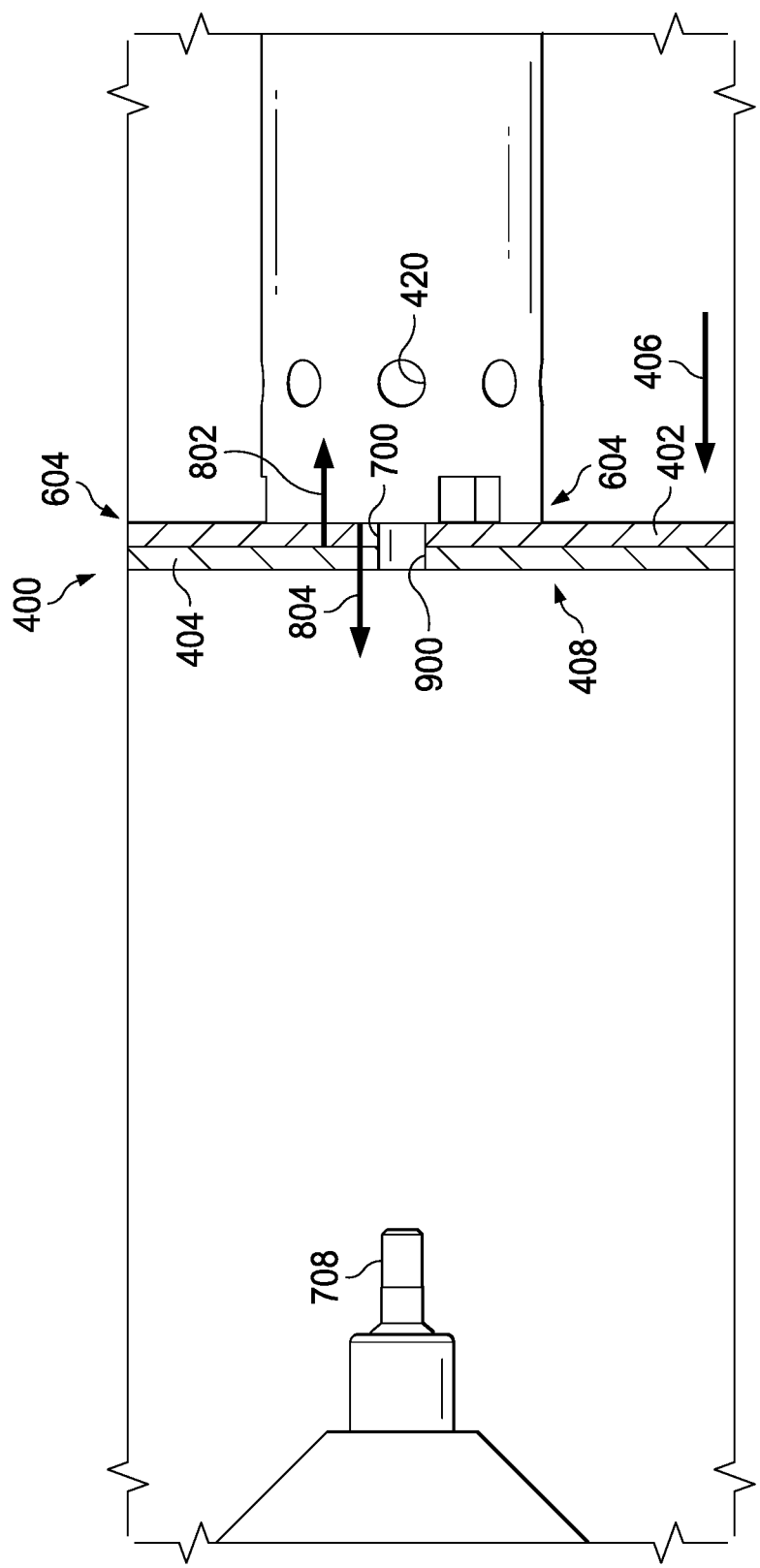
FIG. 10 is an illustration of an enlarged side view of a single-sided clamp-up in accordance with an example embodiment.

FIG. 10 is an illustration of an enlarged side view of a single-sided clamp-up in accordance with an example embodiment. As depicted, element 430 shown in the previous figures has been moved out of contact with first part 402. But even without first force 600 and second force 602, suction force 802 and reactive force 804 are able to independently maintain clamp-up.

Thus, single-sided clamp up is achieved. This type of single-sided clamp-up at first side 406 of lap splice 400 frees up the space around fastener hole 700 at second side 408 of lap splice 400 to allow for simpler and easier switching out of end effectors. No specialized tools are needed at second side 408 of lap splice 400 to maintain clamp-up 604.

Figure 11:
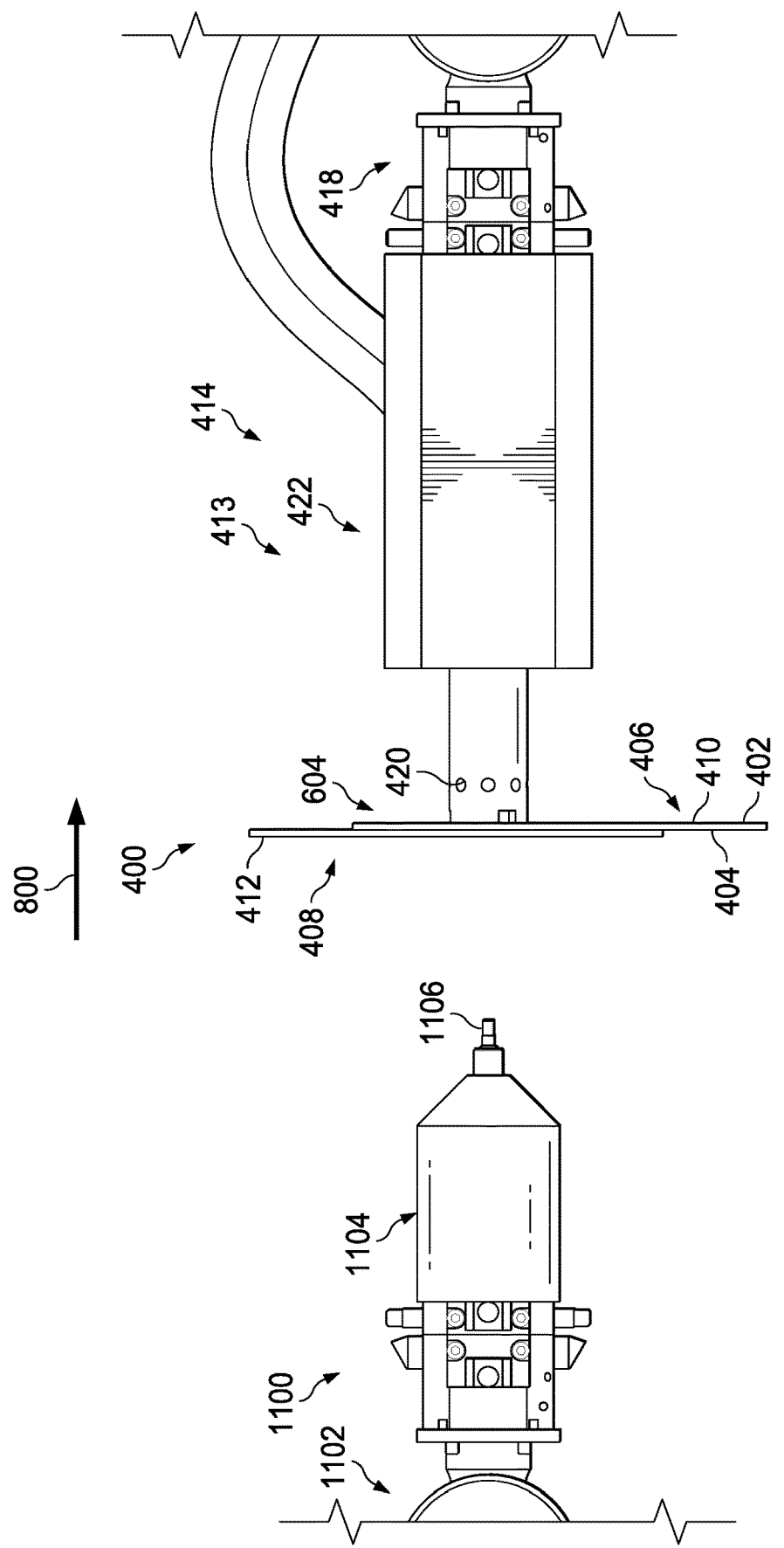
FIG. 11 is an illustration of another side view of the single-sided clamp-up from FIG. 10 in accordance with an example embodiment.

FIG. 11 is an illustration of another side view of the single-sided clamp-up from FIG. 10 in accordance with an example embodiment. As depicted, end effector 416 from FIGS. 4-9 has been switched out with end effector 1100, which is coupled to robotic device 1102. End effector 1100 and robotic device 1102 are part of assembly system 413.

In this illustrative example, robotic device 419 with end effector 416 is moved to allow robotic device 1102 with end effector 1100 to be positioned relative to second side 408 of lap splice 400. In other illustrative examples, end effector 416 may be swapped with end effector 1100 and end effector 1100 then coupled to robotic device 419. As depicted, the switching of end effectors occurs after fastener hole 700 has been drilled through lap splice 400 and single-sided clamp-up has been achieved.

In this illustrative example, end effector 1100 includes fastener insertion tool 1104. At least one of end effector 1100 or robotic device 1102 may be used to move and position fastener insertion tool 1104 relative to fastener hole 700 that has been drilled through lap splice 400. Fastener insertion tool 1104 is used to insert fastener 1106 into fastener hole 700. In one or more examples, fastener insertion tool 1104 installs fastener 1106 by forming a desired interference fit between fastener 1106 and fastener hole 700.

Figure 12:
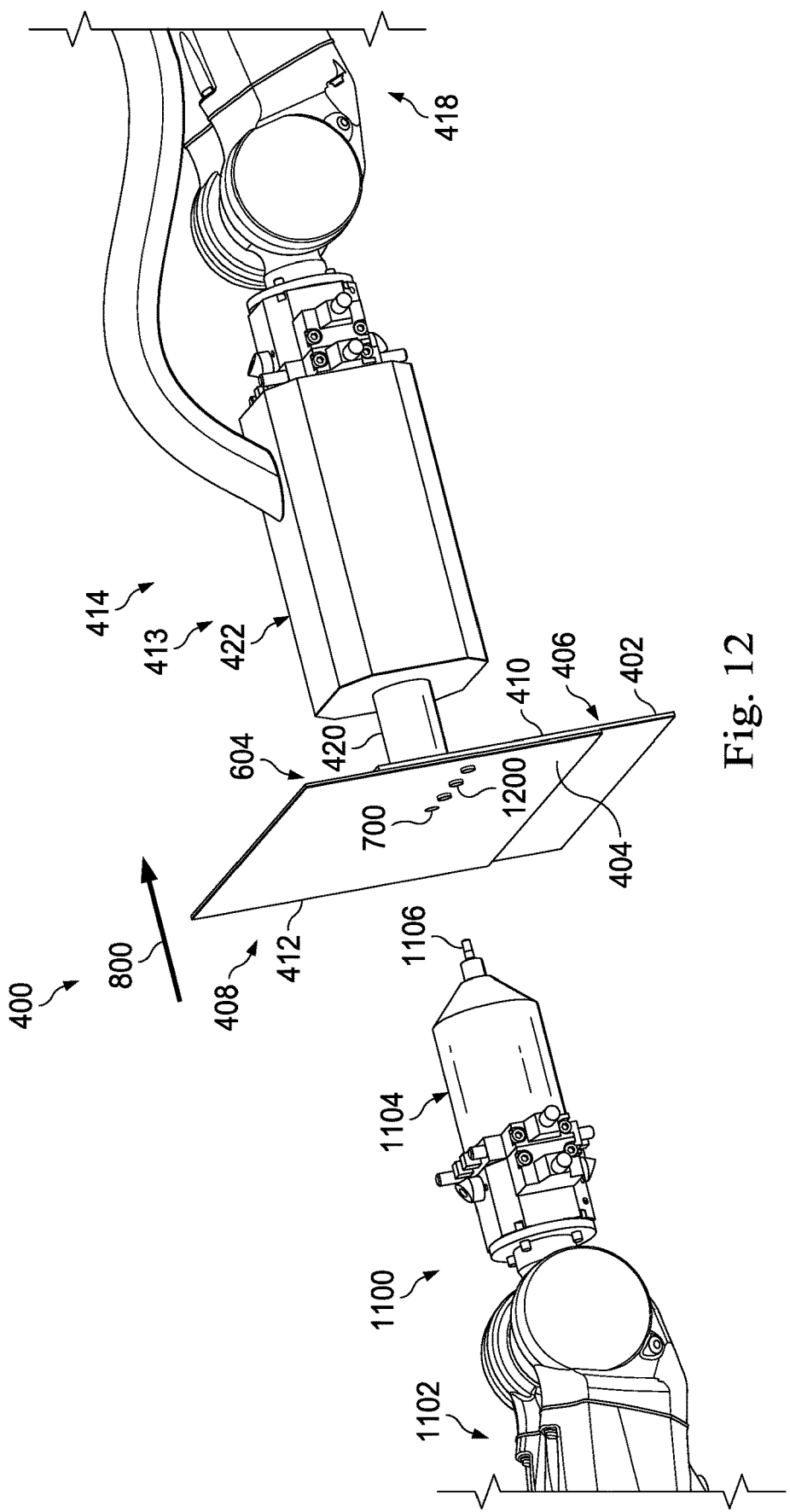
FIG. 12 is an illustration of a perspective view of an end effector positioned relative to a second side of the lap splice from FIG. 11 in accordance with an example embodiment.

FIG. 12 is an illustration of a perspective view of end effector 1100 positioned relative to second side 408 of lap splice 400 in accordance with an example embodiment. As depicted, fastener hole 700 is one of a plurality of fastener holes through lap splice 400 in which fasteners 1200 have been installed.

Figure 13:
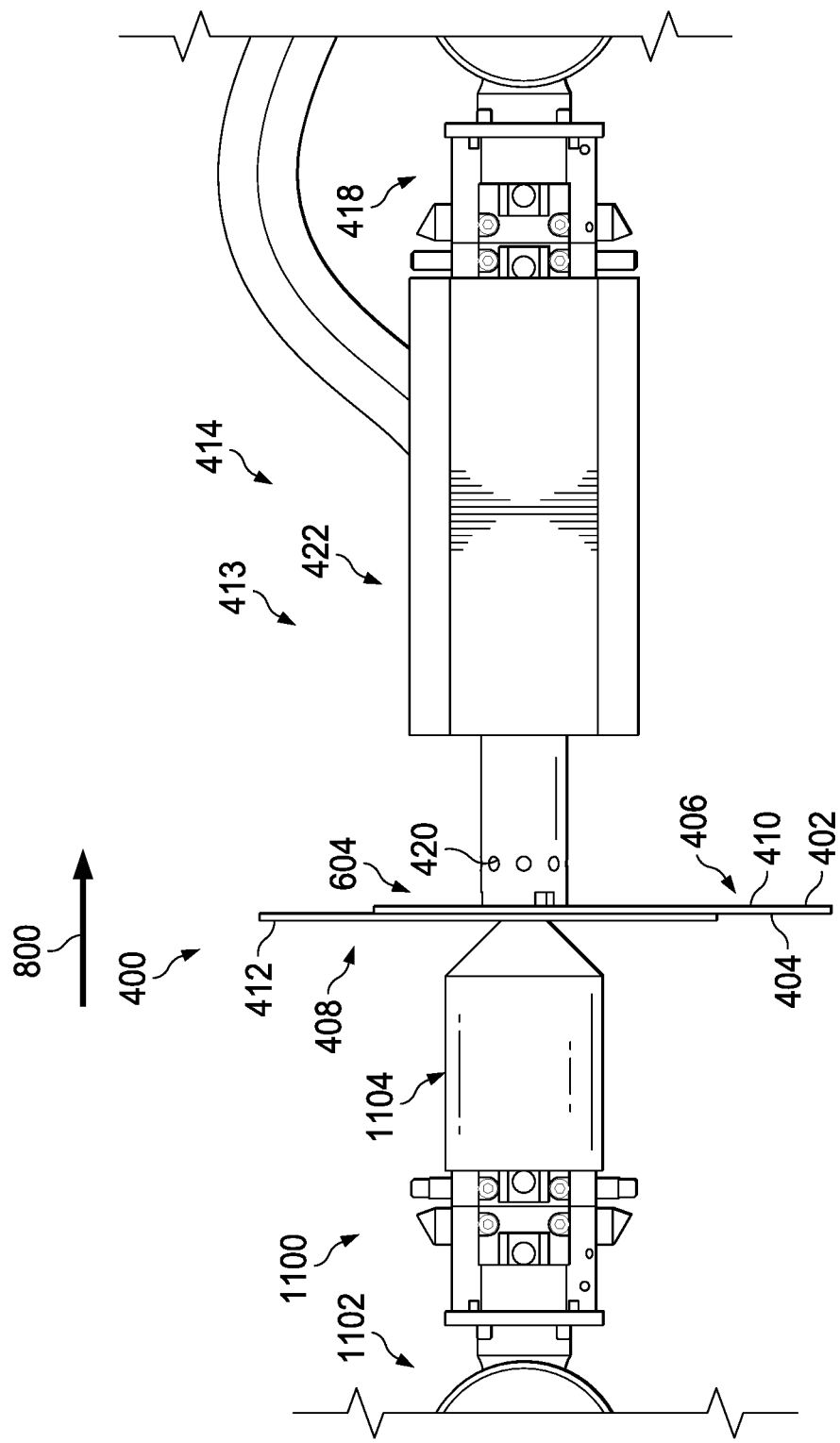
FIG. 13 is an illustration of a side view of a fastener insertion tool being used to insert the fastener (shown in FIGS. 11 and 12) into the fastener hole (shown in FIG. 11) in accordance with an example embodiment.

FIG. 13 is an illustration of a side view of fastener insertion tool 1104 being used to insert fastener 1106 (shown in FIGS. 11 and 12) into fastener hole 700 (shown in FIG. 11) in accordance with an example embodiment. Fastener insertion tool 1104 inserts fastener 1106 into fastener hole 700 while suction device 422 continues to suction air through fastener hole 700.

Figure 14:
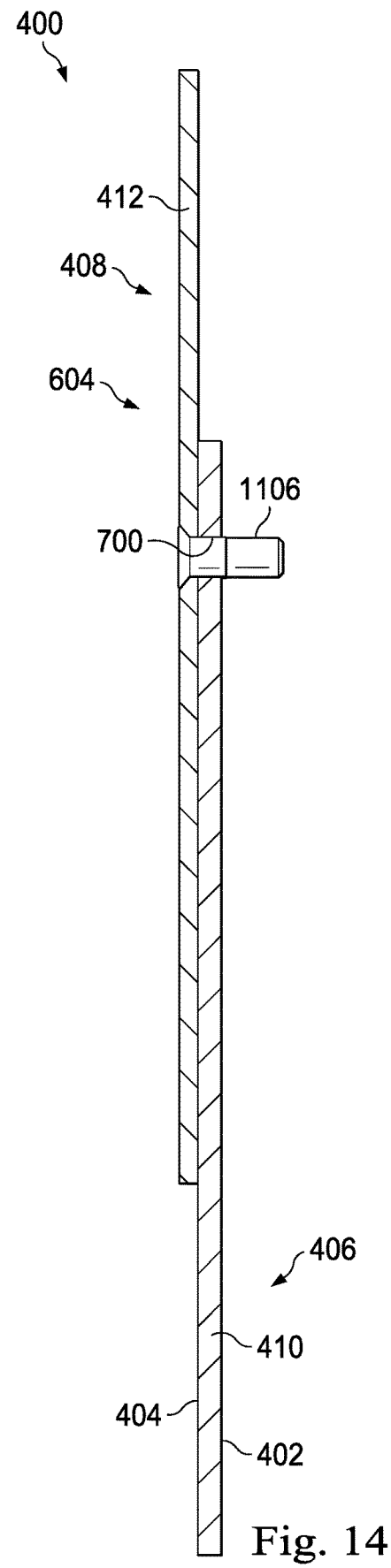
FIG. 14 is an illustration of a cross-sectional view of the installed fastener in the lap splice in accordance with an example embodiment.

FIG. 14 is an illustration of a cross-sectional view of the installed fastener 1106 in lap splice 400 in accordance with an example embodiment. In this particular illustrative example, fastener 1106 is a countersunk fastener and fastener hole 700 is a countersunk hole.

Figure 15:
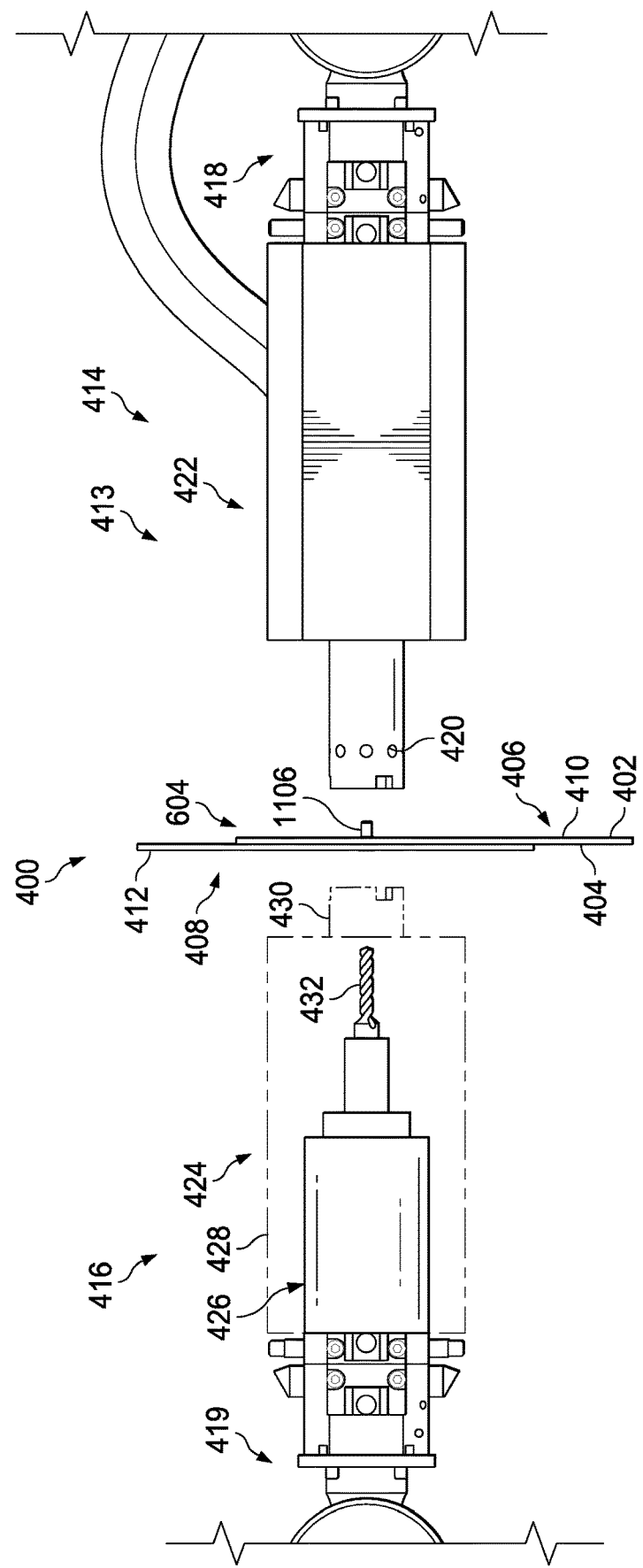
FIG. 15 is an illustration of a completion of the fastener installation operation in accordance with an example embodiment.

FIG. 15 is an illustration of a completion of the fastener installation operation in accordance with an example embodiment. As depicted, fastener 1106 has been installed in lap splice 400. Once fastener 1106 has been installed, suctioning is no longer needed to maintain clamp-up 504 from the previous figures. Fastener 1106 is capable of independently maintaining clamp-up 604 with respect to the portion of lap splice 400 in which fastener 1106 is installed.

In one or more illustrative examples, installation of fastener 1106 is completed once a desired interference fit has been formed between fastener 1106 and fastener hole 700. Once this interference fit has been formed, suctioning is discontinued. In other illustrative examples, fastener 1106 is considered fully installed when fastener retaining hardware is installed over fastener 1106. Suctioning continues until all the operations required to complete installation of fastener 1106 have been completed to ensure that the fastener installation meets requirements.

After fastener 1106 is fully installed, end effector 414 may be moved away from lap splice 400 and repositioned relative to a next location on lap splice 400 at which a fastener is to be installed. Further, end effector 1100 from FIGS. 11-13 may be switched out with end effector 416 and end effector 416 may be repositioned relative to the next location on lap splice 400 at which the new fastener is to be installed.

The illustrations of end effectors, tools, devices, and other components in FIGS. 4-15 are not meant to imply physical or architectural limitations to the manner in which an example embodiment may be implemented. Other components in addition to or in place of the ones illustrated may be used. Some components may be optional. The different components shown in FIGS. 4-15 may be illustrative examples of how components shown in block form in FIG. 3 can be implemented as physical structures. Additionally, some of the components in FIGS. 4-15 may be combined with components in FIG. 3, used with components in FIG. 3, or a combination of the two.

Figure 16:
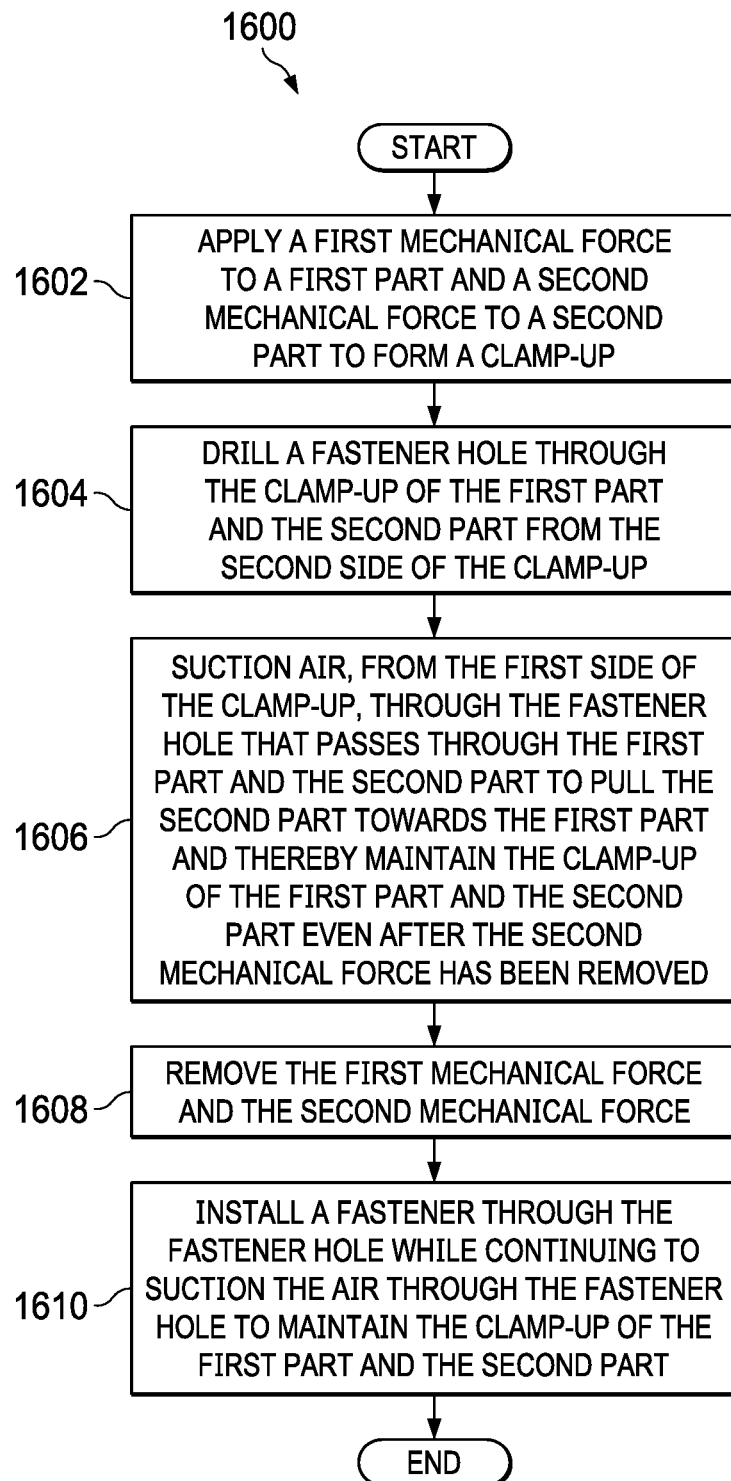
FIG. 16 is a flowchart of a method for performing a fastener installation in accordance with an example embodiment.

FIG. 16 is a flowchart of a method for performing a fastener installation in accordance with an example embodiment. Process 1600 illustrated in FIG. 16 may be implemented using assembly system 302 from FIG. 3 or assembly system 413 from FIGS. 4-15.

The process may begin by applying a first mechanical force to a first part and a second mechanical force to a second part to form a clamp-up of the first part and the second part (operation 1602). The assembly includes a first part and a second part positioned in contact with each other. The first part forms the first side of the clamp-up and the second part forms the second side of the clamp-up.

Optionally, a fastener hole is drilled through the clamp-up of the first part and the second part from the second side of the clamp-up (operation 1604). The fastener hole extends from the second side to the first side of the assembly. The fastener hole may be formed by a first hole drilled through the first part and a second hole drilled through the second part. In these illustrative examples, the first hole and the second hole are coaxial.

Air is suctioned, from the first side of the clamp-up, through the fastener hole that passes through the first part and the second part to pull the second part towards the first part and thereby maintain the clamp-up of the first part and the second part even after the second mechanical force has been removed (operation 1606). In other words, the suctioning of the air through the fastener hole maintains the "clamp-up" of the first part and the second part without requiring use of the second mechanical force at the second side of the clamp-up.

In particular, in operation 1606, suctioning is performed at a volumetric flow rate sufficient to maintain the clamp-up from just the first side of the clamp-up without requiring use of additional force at the second side of the clamp-up. Air is suctioned through the fastener hole to grip a wall of the second hole in the second part and thereby pull the second part towards the first part.

In these examples, air is suctioned from the first side of the clamp-up through the fastener hole in a direction towards the first part and at a volumetric flow rate sufficient to maintain a gripping of the wall of the second hole while overcoming a volume of suction lost at the second side of the clamp-up. For example, some volume of suction or suction force may be lost due to an open end of the fastener hole at the second side.

In some examples, depending on the implementation, operation 1606 may be begun after operation 1604 has been completed or during operation 1604. In other words, suctioning may be performed only after the fastener hole has been drilled or while the fastener hole is being drilled.

The first mechanical force and the second mechanical force are removed (operation 1608). Operation 1608 includes, for example, switching out the end effector that performed the drilling of operation 1604 with a new end effector. The suctioning performed in operation 1606 continues in order to maintain the clamp-up of the first part and the second part during the switching out of the end effectors.

Thereafter, a fastener is installed within the fastener hole while continuing to suction the air through the fastener hole to maintain the clamp-up of the first part and the second part (operation 1610). In one or more illustrative examples, operation 1610 includes inserting the fastener into the fastener hole and forming a desired interference fit. In other illustrative examples, operation 1610 includes inserting the fastener into the fastener hole and installing fastener retaining hardware around the elongate portion of the fastener extending through the fastener hole.

Continuing to perform the suctioning of air in operation 1606 while operation 1610 is performed ensures that the clamp-up of the first part and the second part is maintained throughout the insertion of the fastener. The suctioning of the air through the hole may be continued until the entire fastener installation operation is completed. For example, suctioning may be continued to maintain the clamp-up until a desired interference fit is formed between the fastener and the fastener hole.

Figure 17:
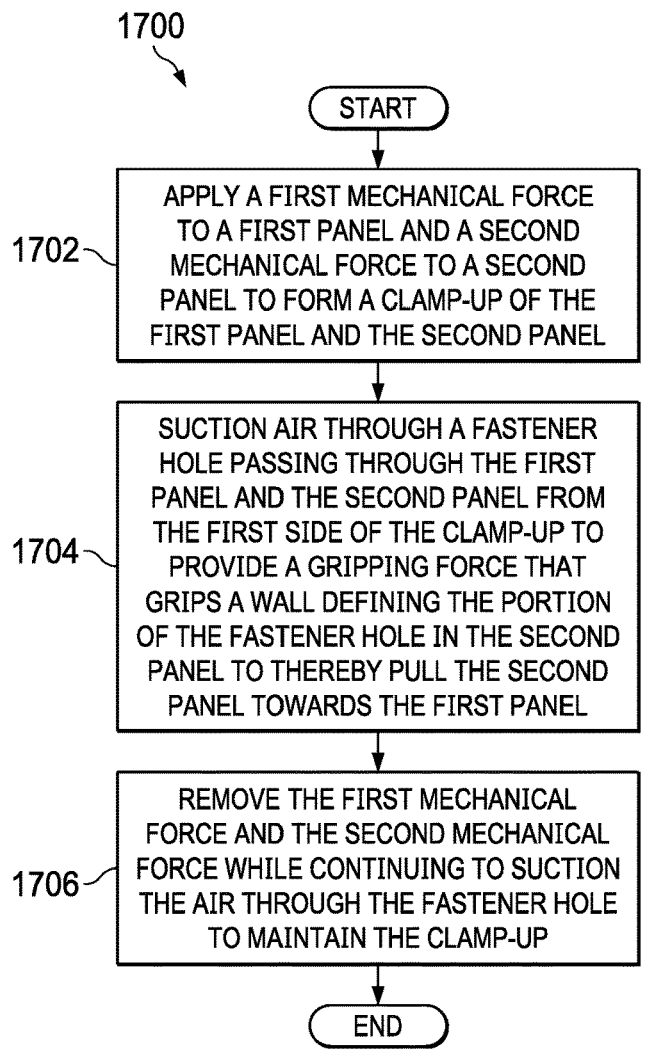
FIG. 17 is a flowchart of a process for maintaining a clamp-up in accordance with an example embodiment.

FIG. 17 is a flowchart of a process for maintaining a clamp-up in accordance with an example embodiment. Process 1700 illustrated in FIG. 17 may be performed using, for example, assembly system 302 from FIG. 3 or assembly system 413 from FIGS. 4-15.

Process 1700 may begin by applying a first mechanical force to a first panel and a second mechanical force to a second panel to form a clamp-up of the first panel and the second panel (operation 1702). The first panel and the second panel are fuselage panels.

Operation 1702 may be performed by applying the first force using a tool coupled to a first end effector, such as end effector 414 in FIG. 4. The tool may be, for example, a nozzle, such as nozzle 420 in FIG. 4. However, in other illustrative examples, the tool may be some other type of member, element, or structural component. The second force is applied using a tool coupled to a second end effector, such as end effector 416 in FIG. 4.

Air is suctioned through a fastener hole passing through the first panel and the second panel from the first side of the clamp-up to provide a gripping force that grips a wall defining the portion of the fastener hole in the second part to thereby pull the second part towards the first part (operation 1704). In operation 1704, a partial vacuum is drawn through the fastener hole and through the nozzle positioned relative to the first panel at the first side of the clamp-up to maintain the clamp-up.

In some illustrative examples, the fastener hole may be drilled as part of the process 1700. For example, the hole may be drilled between the performing of operations 1702 and 1704. In other illustrative examples, the drilling of the fastener hole is part of a different process or is performed prior to process 1700. For example, a first hole may be drilled into the first panel and a second hole may be drilled into the second panel prior to these panels being "clamped-up." The first panel and the second panel may then be positioned relative to each other such that the holes are aligned to form a single coaxial fastener hole prior to operation 1702. Afterwards, operation 1702 may be performed to initiate process 1700.

With reference again to operation 1704, the suctioning of the air is performed with sufficient suction power (e.g., a sufficient volumetric flow rate) to maintain the clamp-up of the first panel and the second panel without requiring the second mechanical force. The suctioning maintains the clamp-up when the gripping force provided by the suctioning is opposite and equal to the first mechanical force being applied. As the second panel is pulled towards the first panel, the first mechanical force causes the first panel to exert an equal reactive force on the second panel to thereby maintain the clamp-up.

Thereafter, the second mechanical force is removed while continuing to suction the air through the fastener to maintain the clamp-up (operation 1706). In some illustrative examples, process 1700 terminates. In other illustrative examples, process 1700 includes installing a fastener through the fastener hole from the second side of the clamp-up while continuing to suction the air through the fastener hole from the first side to maintain the clamp-up during fastener installation.

Figure 18:
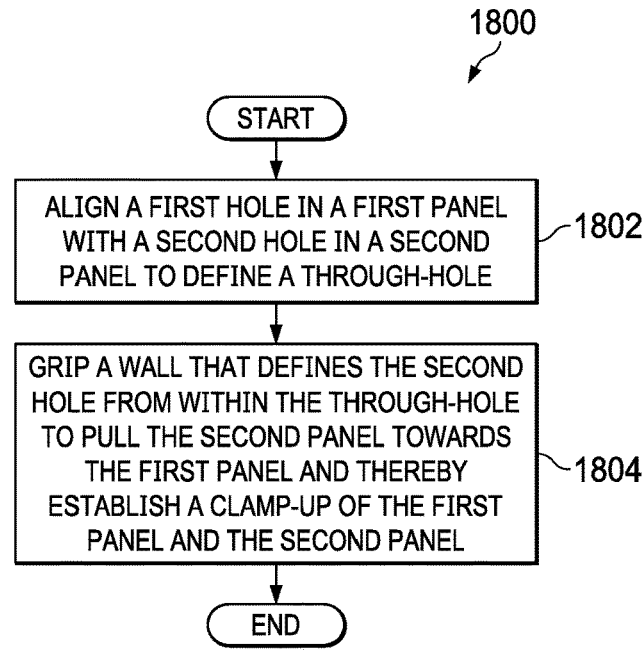
FIG. 18 is a flowchart of a process for maintaining a clamp-up in accordance with an example embodiment.

FIG. 18 is a flowchart of a process for establishing a clamp-up in accordance with an example embodiment. Process 1800 illustrated in FIG. 18 may be performed using, for example, assembly system 302 from FIG. 3 or assembly system 413 from FIGS. 4-15.

Process 1800 begins by aligning a first hole in a first panel with a second hole in a second panel to define a through-hole (operation 1802). In these illustrative examples, operation 1802 is performed to at least one of concentrically or coaxially align the first hole and the second hole to define the through-hole. As one illustrative example, the first panel and the second panel are positioned relative to each other to coaxially align the first hole with the second hole.

In some examples, the through-hole takes the form of a fastener hole, such as fastener hole 346 in FIG. 3. In other examples, the through-hole takes the form of an index hole. For example, the first hole and the second hole that are aligned in operation 1802 may be determinate assembly holes. The first and second holes may be coaxially aligned in operation 1802 to form an index hole. In one or more illustrative examples, the first panel and the second panel in operation 1802 may be fuselage panels, wing panels, or some other type of panels.

In still other illustrative examples, aligning the first hole in the first panel with the second hole in the second panel in operation 1802 comprises drilling the first hole in the first panel and drilling the second hole in the second panel in a manner that coaxially aligns these two holes and forms a through-hole through the first panel and the second panel.

Thereafter, a hole-wall that defines the second hole is gripped from within the through-hole to pull the second panel towards the first panel and thereby establish a clamp-up of the first panel and the second panel (operation 1804). The clamp-up established in operation 1804 is a single-sided clamp-up. Operation 1804 may be performed using, for example, suction to grip the wall of the second hole. Air is suctioned through the through-hole such that the suctioning force provides a gripping force to grip the wall of the second hole. In particular, a partial vacuum is drawn through the through-hole to thereby provide a gripping force that grips the wall of the second hole. The partial vacuum is created despite the outward-facing end of the second hole being an open end.

The clamp-up formed in operation 1804 may be maintained until one or more operations are performed with respect to the through-hole. For example, the clamp-up may be maintained until either a temporary fastener has been installed to maintain clamp-up or a drilling operation has been performed to enlarge the through-hole to form a fastener hole. In some cases, the clamp-up is maintained until a fastener installation operation has been performed to install a fastener within the through-hole, wherein the hole diameter is within tolerance for a fastener installation. In some cases, the clamp-up may be maintained until a drilling operation and a fastener installation operation have been performed. In still other examples, the clamp-up is maintained until a fastener installation operation has been performed that includes insertion of the fastener through the through-hole and the securing of a nut or collar onto the fastener.

The single-sided clamp-up allows various tools and devices to be moved around relative to the location of the through-hole from the opposite side from where the partial vacuum is being drawn. The single-sided clamp-up improves the efficiency of assembly processes.

Figure 19:
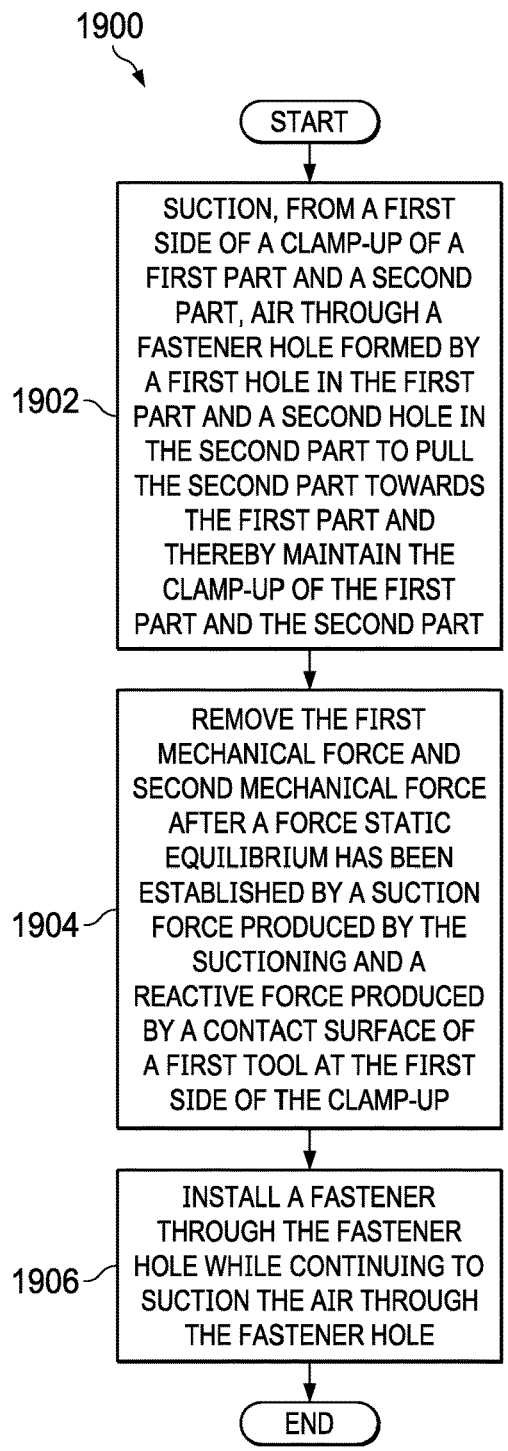
FIG. 19 is a flowchart of a process for maintaining a single-sided clamp-up in accordance with an example embodiment.

FIG. 19 is a flowchart of a process for maintaining a single-sided clamp-up in accordance with an example embodiment. Process 1900 illustrated in FIG. 19 may be performed using, for example, assembly system 302 from FIG. 3 or assembly system 413 from FIGS. 4-15. In particular, process 1900 may be performed using end effector 324 in FIG. 3 or end effector 414 in FIGS. 4-15.

Process 1900 includes suctioning, from a first side of a clamp-up of a first part and a second part, air through a fastener hole formed by a first hole in the first part and a second hole in the second part to pull the second part towards the first part and thereby maintain the clamp-up of the first part and the second part (operation 1902). In one or more illustrative examples, operation 1902 includes suctioning, from the first side of the clamp-up, the air through the fastener hole to grip a wall that defines the second hole in the second part to thereby pull the second part towards the first part.

Optionally, process 1900 also includes removing the first mechanical force and second mechanical force after a force static equilibrium has been established by a suction force produced by the suctioning and a reactive force produced by a contact surface of a first tool at the first side of the clamp-up (operation 1904), with the process terminating thereafter. The first mechanical force may have been applied by the first tool at the first side of the clamp-up. The second mechanical force may have been applied by a second tool at a second side of the clamp-up during the suctioning.

The suction force and the reactive force maintain the clamp-up of the first part and the second part without the first mechanical force and the second mechanical force. In these illustrative examples, the first mechanical force and the second mechanical force are applied at least until the force static equilibrium is established by the suction force produced by the suctioning and the reactive force produced by the contact surface of the first tool at the first side of the clamp-up.

Optionally, process 1900 further includes installing a fastener through the fastener hole while continuing to suction the air through the fastener hole (operation 1906). In operation 1906, the suctioning may be performed at least until the fastener is fully installed.

Figure 20:
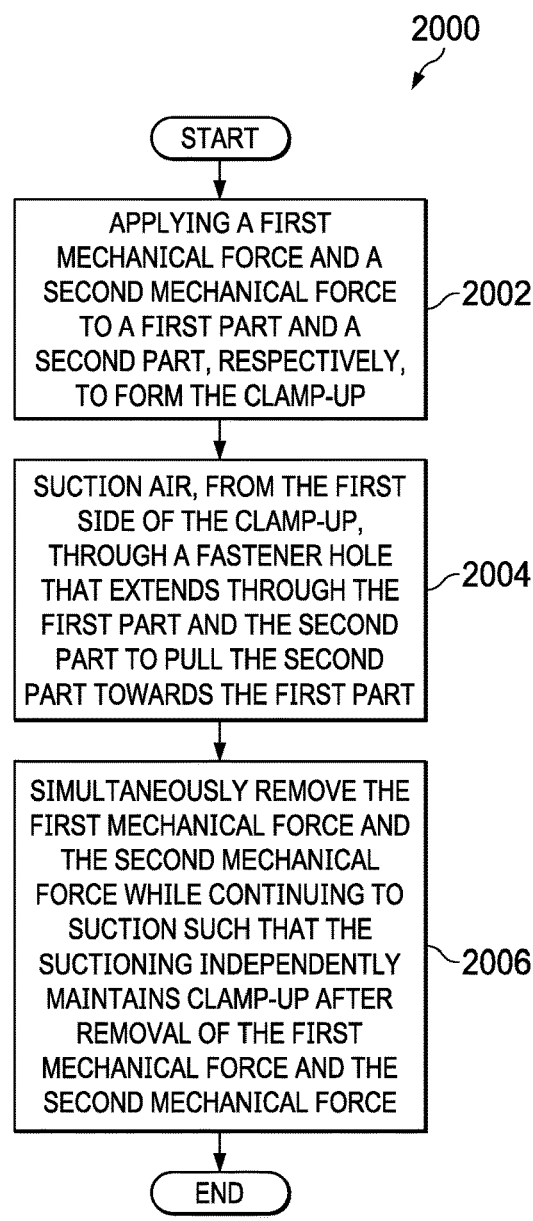
FIG. 20 is a flowchart of a process for maintaining a single-sided clamp-up in accordance with an example embodiment.

FIG. 20 is a flowchart of a process for maintaining a single-sided clamp-up in accordance with an example embodiment. Process 2000 illustrated in FIG. 20 may be performed using, for example, assembly system 302 from FIG. 3 or assembly system 413 from FIGS. 4-15.

Process 2000 begins by applying a first mechanical force and a second mechanical force to a first part and a second part, respectively, to form the clamp-up (operation 2002). The first part forms a first side of the clamp-up and the second part forms a second side of the clamp-up. Next, air is suctioned, from the first side of the clamp-up, through a fastener hole that extends through the first part and the second part to pull the second part towards the first part (operation 2004). The first mechanical force and the second mechanical force are removed simultaneously while continuing to suction such that the suctioning independently maintains clamp-up after removal of the first mechanical force and the second mechanical force (operation 2006), with the process terminating thereafter.

FIG. 21 is a flowchart of a process for maintaining a single-sided clamp-up in accordance with an example embodiment. Process 2100 illustrated in FIG. 21 may be performed using, for example, assembly system 302 from FIG. 3 or assembly system 413 from FIGS. 4-15.

Process 2100 includes applying, by a first end effector at a first side of a panel joint, a first force via contact with the first side of a panel joint (operation 2102). Process 2100 includes applying, by a second end effector at a second side of the panel joint, a second force that is equal and opposite to the first force via contact with the second side of the panel joint to establish the clamp-up (operation 2104). Further, process 2100 includes maintaining, by the first end effector at the first side of the panel joint, the clamp-up after the second end effector is removed from contact with the second side (operation 2106), with the process terminating thereafter.

FIG. 22 is a flowchart of a process for maintaining a single-sided clamp-up in accordance with an example embodiment. Process 2200 illustrated in FIG. 22 may be performed using, for example, assembly system 302 from FIG. 3 or assembly system 413 from FIGS. 4-15.

Process 2200 includes applying, by a single function end effector positioned at a first side of a panel joint, a first force to a first panel of the panel joint (operation 2202). Process 2200 further includes applying, by the single function end effector, a second force that is equal and opposite to the first force to a second panel of the panel joint to thereby provide the single-sided clamp-up of the first panel and the second panel (operation 2204), with the process terminating thereafter.

In some illustrative examples, one or more operations may be performed prior to operation 2202. For example, in some cases, holes are created in the first panel and the second panel prior to operation 2202. These holes may be formed via drilling, punching through the panels, or by some other hole-making operation. These holes may be drilled while an initial clamp-up of the panels has been established such that holes are aligned at least one of concentrically or coaxially to form a through-hole (fastener hole). In other illustrative examples, determinate assembly holes may be formed in the panels individually and then the panels later brought together to align the holes.

FIG. 23 is a flowchart of a process for providing a single-sided clamp-up in accordance with an example embodiment. Process 2300 illustrated in FIG. 23 may be performed using a single function end effector, such as end effector 324 in FIG. 3 or end effector 414 described in FIGS. 4-15.

Process 2300 includes, optionally, aligning a first hole in a first part with a second hole in a second part at least one of concentrically or coaxially (operation 2302). In some examples, operation 2302 includes drilling through a clamp-up formed by the first part and the second part to form the first hole and the second hole that are at least one of concentrically or coaxially aligned. In one or more illustrative examples, operation 2302 includes simply aligning the first part already having the first hole with the second part already having the second hole (e.g. determinate assembly holes) to thereby align the first hole and the second hole.

Next, process 2300 includes reaching through the first hole in the first part to grip a wall that defines the second hole in the second part to thereby pull the second part against the first part (operation 2304), with the process terminating thereafter. In some examples, operation 2304 includes creating a pressure differential that acts on the wall of the second hole in the second part to pull the second part against the first part. In one or more examples, operation 2304 includes suctioning, by a suction device positioned relative to the first part, air through the first hole and the second hole to pull the second part towards the first part.

In this manner, process 2300 provides a method for establishing and maintaining a clamp-up. In particular, a single-sided clamp-up is provided.

The different example embodiments recognize and consider that it is desirable to have methods and systems for improving the efficiency and production times for building assemblies. For example, the example embodiments recognize that it is desirable to have fully automated methods and systems for concurrently performing multiple fastener installation operations along an assembly, such as a fuselage assembly. Further, the example embodiments recognize that using multiple end effectors to provide single-sided clamp-ups at multiple locations at a first side of the assembly enables single function end effectors to be moved around on the opposite side of the assembly. This movement and interchangeability of the single function end effectors on the opposite side of the assembly enables multiple tasks to be concurrently performed in a manner that meets desired takt and production times.

Further, it is desirable to reduce end effector complexity because complexity may result in more maintenance and slower production rates than desired. For example, highly complex multifunction end effectors, which are typically heavy, may require more maintenance and may be more difficult to repair and/or replace as compared to single function end effectors that are less complex. Further, because the multifunction end effectors are typically very large and heavy, these types of end effectors require large robots to move them around which makes these multifunction end effectors less nimble than desired (i.e. less easily manipulatable than desired). Single function end effectors may thus require less down time, which may improve production rates.

In certain instances, switching between the different functions of a multifunction end effector may be more complex than desired or take more time than desired, which may result in in slower production rates. The example embodiments, however, recognize and take into account that robotic devices with coupled with much lighter single function end effectors can be easily and quickly swapped out with other robotic devices having single function end effectors because of the smaller size and scale needed for these robotic devices. In this manner, production rates may be improved. Because single function end effectors are much lighter and less massive than multifunction end effectors, single function end effectors may be moved around using smaller robotic devices that are nimbler than the larger robotic devices needed for multifunction end effectors.

Figure 24:
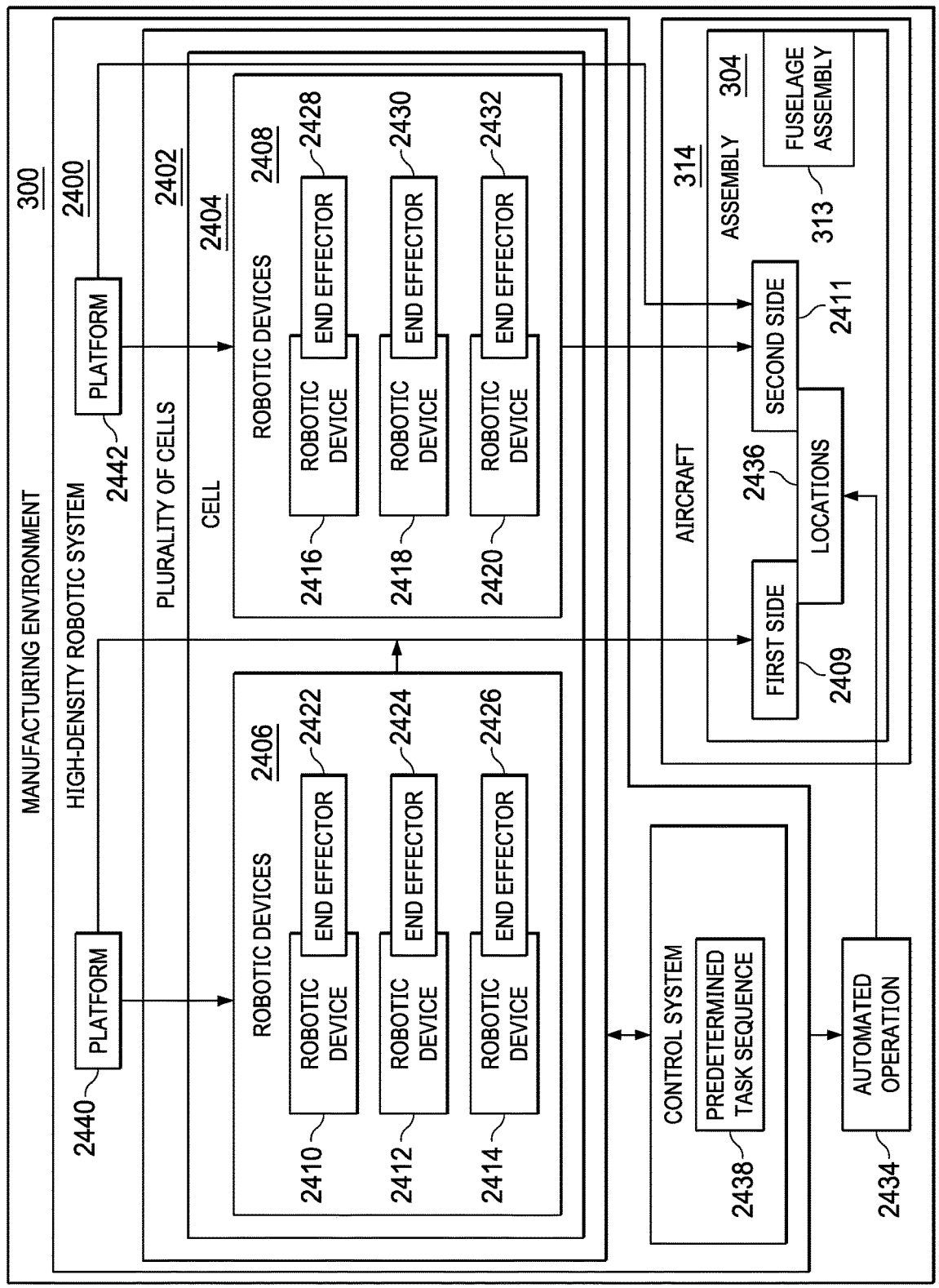
FIG. 24 is a block diagram of a manufacturing environment in accordance with an example embodiment.

With reference now to FIG. 24, a block diagram of a manufacturing environment is depicted in accordance with an example embodiment. Manufacturing environment 300 in FIG. 24 is similar to manufacturing environment 300 from FIG. 3. High-density robotic system 2400 includes a plurality of cells 2402. Each of cells 2402 is an example of one implementation for assembly system 302 described in FIG. 3.

Cells 2402, which may also be referred to as robotic cells or high-density robotic cells, are used to build assembly 304. As previously described, in some examples, assembly 304 takes the form of fuselage assembly 313. In other examples, assembly 304 may take the form of a wing assembly or some other assembly for aircraft 314. Each of cells 2402 includes robotic devices for performing various operations at locations along assembly 304.

Cell 2404 is an example of one of plurality of cells 2402. Cell 2404 includes robotic devices 2406 and robotic devices 2408, which may also be referred to as a first plurality of robotic devices and a second plurality of robotic devices, respectively. Each of robotic devices 2406 may be implemented in a manner similar to robotic device 318 described in FIG. 3. Further, each of robotic devices 2408 may be implemented in a manner similar to robotic device 320 in FIG. 3, robotic device 322 in FIG. 3, or a different type of robotic device.

In these illustrative examples, robotic devices 2406 are positioned at and used at first side 2409 of assembly 304, while robotic devices 2408 are positioned at and used at second side 2411 of assembly 304. When assembly 304 takes the form of fuselage assembly 313, first side 2409 is accessible from within an interior of fuselage assembly 313, while second side 2411 is accessible from an exterior of fuselage assembly 313. For example, first side 2409 may be at or near the inner mold line (IML) of fuselage assembly 313 (e.g., on the side facing the inner mold line), while second side 2411 may be at or near the outer mold line (OML) of fuselage assembly 313 (e.g., on the side facing the outer mold line). Accordingly, in some examples, robotic devices 2406 may be referred to as IML robotic devices and robotic devices 2408 may be referred to as OML robotic devices.

In these illustrative examples, robotic devices 2406 includes robotic device 2410, second robotic device 2412, and third robotic device 2414, which may be referred to as a first robotic device, a second robotic device, and a third robotic device, respectively. Similarly, robotic devices 2408 includes robotic device 2416, robotic device 2418, and robotic device 2420, which may be referred to as a first robotic device, a second robotic device, and a third robotic device, respectively.

End effector 2422, end effector 2424, and end effector 2426 are coupled to robotic device 2410, robotic device 2412, and robotic device 2414, respectively. End effector 2422, end effector 2424, and end effector 2426 may also be referred to as a first end effector, a second end effector, and a third end effector, respectively. These end effectors are single function end effectors. In one or more illustrative examples, each of end effectors 2422, 2424, and 2426 is implemented in a manner similar to end effector 324 described in FIG. 3. For example, each of end effectors 2422, 2424, and 2426 may include a nozzle and a suction device similar to nozzle 332 and suction device 330, respectively, from FIG. 3.

End effector 2428, end effector 2430, and end effector 2432 are coupled to robotic device 2416, robotic device 2418, and robotic device 2420, respectively. End effector 2428, end effector 2430, and end effector 2432 may also be referred to as a first end effector, a second end effector, and a third end effector, respectively. These end effectors are single function end effectors.

In one or more illustrative examples, end effector 2428 is implemented in a manner similar to end effector 326. For example, end effector 2428 may include a tool and a drilling tool (not shown) similar to tool 336 and drilling tool 338, respectively, from FIG. 3. End effector 2430 may include an inspection device (not shown) for inspecting holes. In these examples, end effector 2432 is implemented in a manner similar to end effector 328 in FIG. 3. For example, end effector 2432 may include a fastener insertion tool (not shown) similar to fastener insertion tool 340 in FIG. 3.

Cell 2404 is used to perform automated operation 2434 at each of a plurality of locations 2436 along assembly 304. In these illustrative examples, automated operation 2434 takes the form of a fastener installation. Accordingly, each of locations 2436 may also be referred to as a fastener installation point. In one illustrative example, the fastener installation comprises a plurality of tasks (operations or suboperations) such as, for example, without limitation, a clamp-up task, a drilling task, a fastener insertion task, and an inspection task. Cell 2404 is used to perform these various tasks according to predetermined task sequence 2438.

In these illustrative examples, predetermined task sequence 2438 requires that at any given one of locations 2436, the drilling task is performed before the inspection task and the inspection test is performed before the fastener insertion task. Depending on the implementation, predetermined task sequence 2438 may include zero, one, two, or some other number of tasks may be performed before the drilling task, between the drilling task and the inspection task, between the inspection task and the fastener insertion task, after the fastener insertion task, or a combination thereof.

Control system 315 controls cell 2404 to quickly, accurately, and efficiently perform automated operation 2434 at each of locations 2436 along a selected portion of assembly 304 according to predetermined task sequence 2438. Predetermined task sequence 2438 requires that the above-described tasks are performed concurrently at various locations of locations 2436. As used herein, concurrently means simultaneously or generally at the same time. For example, two tasks that begin at the same time, end at the same time, or both may be considered as being performed concurrently. Further, when one task is performed over a duration of time that overlaps with the performance of another task, these two tasks may be considered as being performed concurrently. In still other examples, two tasks that are performed within a given time interval may be considered as being performed concurrently, regardless of whether the duration of time for the actual tasks themselves overlap.

For example, control system 315 may control cell 2404 to perform a drilling task at one location of locations 2436 at the same time (or within a same time interval) as an inspection task at another location of locations 2436. Further, control system 315 may control cell 2404 to perform a drilling task at one location of locations 2436 at the same time (or within a same time interval) as an inspection task at another location of locations 2436 and a fastener insertion task at yet another location of locations 2436. The inspection task may be a hole inspection task.

Thus, control system 315 controls cell 2404 to perform multiple fastener installation operations concurrently by performing the specialized tasks that make up these multiple fastener installation operations in a sequential fashion but at multiple locations at the same time. Further, control system 315 may control all of cells 2402 to quickly, accurately, and efficiently perform automated operation 2434 at each of multiple locations along different portions of assembly 304 concurrently.

In some illustrative examples, robotic devices 2406 of cell 2404 are supported by platform 2440, while robotic devices 2408 of cell 2404 are supported by platform 2442. In these examples robotic devices 2406 and their corresponding end effectors are sized to allow interchangeability of robotic devices 2406. In other words, robotic devices 2406 may be movable on platform 2440 while platform 2440 remains stationary such that robotic devices 2406 can switch positions on platform 2440 without any assistance from platform

2440. This interchangeability allows predetermined task sequence 2438 to be quickly, accurately, and efficiently performed.

As used herein, robotic devices are considered interchangeable when one robotic device is swapped out for another robotic device. For example, control system 315 may control robotic devices 2408 such that when robotic device 2416 has performed its individualized, specialized task at location A on assembly 304 and is moved to location B, robotic device 2418 is moved into location A to perform its individualized, specialized task. Similarly, when robotic device 2416 has performed its individualized, specialized task at location B and is moved to location C, and when robotic device 2418 has performed its individualized, specialized task at location A and is moved to location B, robotic device 2420 is moved to location A to perform its individualized, specialized task. In this manner, robotic devices 2408 are interchangeable at locations 2436 such that automated operation 2434 may be performed according to predetermined task sequence 2438.

In these examples robotic devices 2408 and their corresponding end effectors are sized to allow interchangeability of robotic devices 2408. In other words, robotic devices 2408 may be movable on platform 2442 while platform 2442 remains stationary such that robotic devices 2408 can switch positions on platform 2442 without any assistance from platform 2442. This interchangeability allows predetermined task sequence 2438 to be performed quickly, accurately, and efficiently.

Figure 25:
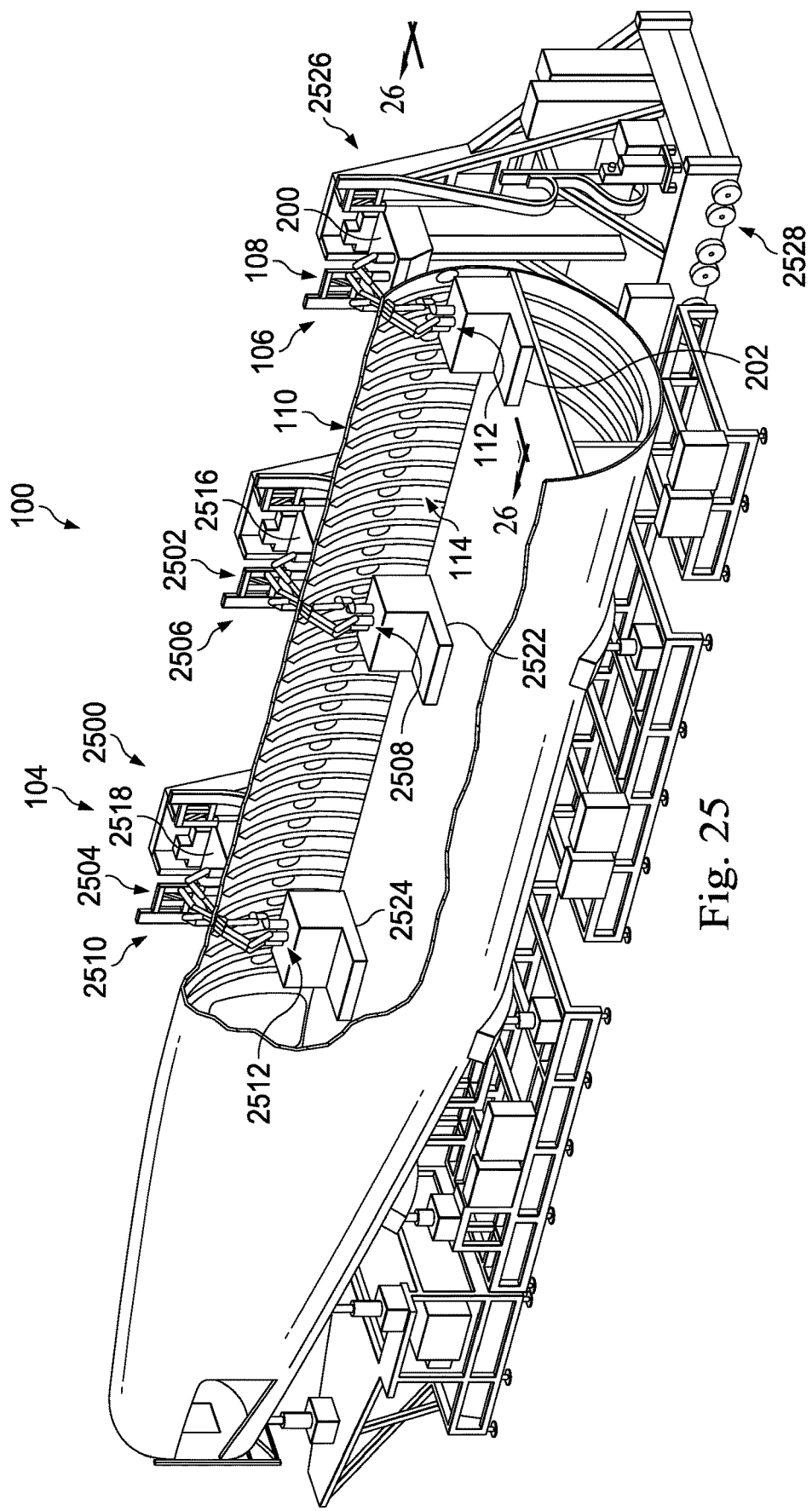
FIG. 25 is an illustration of another perspective view of the manufacturing environment from FIG. 1 in accordance with an example embodiment.

FIG. 25 is an illustration of another perspective view of manufacturing environment 100 from FIG. 1 in accordance with an example embodiment. Plurality of assembly systems 104 may also be referred to as a plurality of cells 2500. In other words, each of plurality of assembly systems 104 may be an example of one implementation for cell 2404 in FIG. 24.

As previously described, plurality of assembly systems 104 is positioned relative to fuselage assembly 102. Plurality of assembly systems 104 includes assembly system 106, assembly system 2502, and assembly system 2504, each of which may be referred to as a cell.

As discussed above, assembly system 106 includes robotic devices 108 positioned relative to exterior 110 of fuselage assembly 102 (e.g., to perform tasks along the outer mold line side of fuselage assembly 102) and robotic devices 112 positioned relative to interior 114 (e.g., to perform tasks along the inner mold line side of fuselage assembly 102) of fuselage assembly 102. Robotic devices 108 and robotic devices 112 work together to perform automated fastener installation operations for the building of fuselage assembly 102. Robotic devices 108 are examples of implementations of robotic devices 2408 in FIG. 24 and robotic devices 112 are examples of implementations of robotic devices 2406 in FIG. 24.

Further, assembly system 2502 includes robotic devices 2506 positioned relative to interior 114 of fuselage assembly 102 and robotic devices 2508 positioned relative to exterior 110 of fuselage assembly 102. Robotic devices 2506 and robotic devices 2508 work together to perform automated fastener installation operations. Robotic devices 2506 and robotic devices 2508 are examples of implementations of robotic devices 2406 and robotic devices 2408, respectively, in FIG. 24.

Assembly system 2504 includes robotic devices 2510 positioned relative to interior 114 of fuselage assembly 102 and robotic devices 2512 positioned relative to exterior 110 of fuselage assembly 102. Robotic devices 2510 and robotic devices 2512 work together to perform automated fastener installation operations. Each of these robotic devices performs a different, specialized task specific to interior 114 or exterior 110 of fuselage assembly 102. Robotic devices 2510 and robotic devices 2512 are examples of implementations of robotic devices 2406 and robotic devices 2408, respectively, in FIG. 24. Each of robotic devices 2510 and robotic devices 2512 is coupled with a single function end effector.

Robotic devices 112, robotic devices 2506, and robotic devices 2510 are supported by platform 202, platform 2516, and platform 2518, respectively. In some illustrative examples, examples, these platforms are movable platforms. As one illustrative example, each of platform 202, platform 2516, and platform 2518 may be integrated with or otherwise coupled (directly or indirectly) to a corresponding movable device, such as an automated guided vehicle (AGV).

In one illustrative example, platform 202 includes, is part of, or is coupled to a movement system (not shown in this view) that allows platform 202 to be moved along an interior of fuselage assembly 102. For example, platform 202 may be moved along a floor inside fuselage assembly 102 to thereby move robotic devices 112 relative to fuselage assembly 102.

Further, robotic devices 108, robotic devices 2508, and robotic devices 2512 are supported by platform 200, platform 2522, and platform 2524, respectively. In some illustrative examples, examples, these platforms are movable platforms. As one illustrative example, each of platform 200, platform 2522, and platform 2524 may be integrated with or otherwise coupled to a corresponding movable device, such as an automated guided vehicle (AGV).

In some examples, platform 200, platform 2522, and platform 2524 are integrated with or coupled to towers, which may be mobile towers. As one illustrative example, robotic devices 108 are supported by platform 200, which Is coupled to tower 2526. Platform 200 is movable in a vertical direction along tower 2526 (e.g., up and down tower 2526). Further, tower 2526 includes, is part of, or is coupled to automated guided vehicle 2528, which allows platform 200, and thereby robotic devices 108, to be positioned along a length of fuselage assembly 102.

Because each of the robotic devices in plurality of assembly systems 104 is coupled to a single function end effector, multiple robotic devices may be supported on a platform and moved around the platform in a precise and efficient manner for performing operations on fuselage assembly 102. In particular, each of the robotic devices in plurality of assembly systems 104 performs its specialized task according to a predetermined task sequence.

Figure 26:
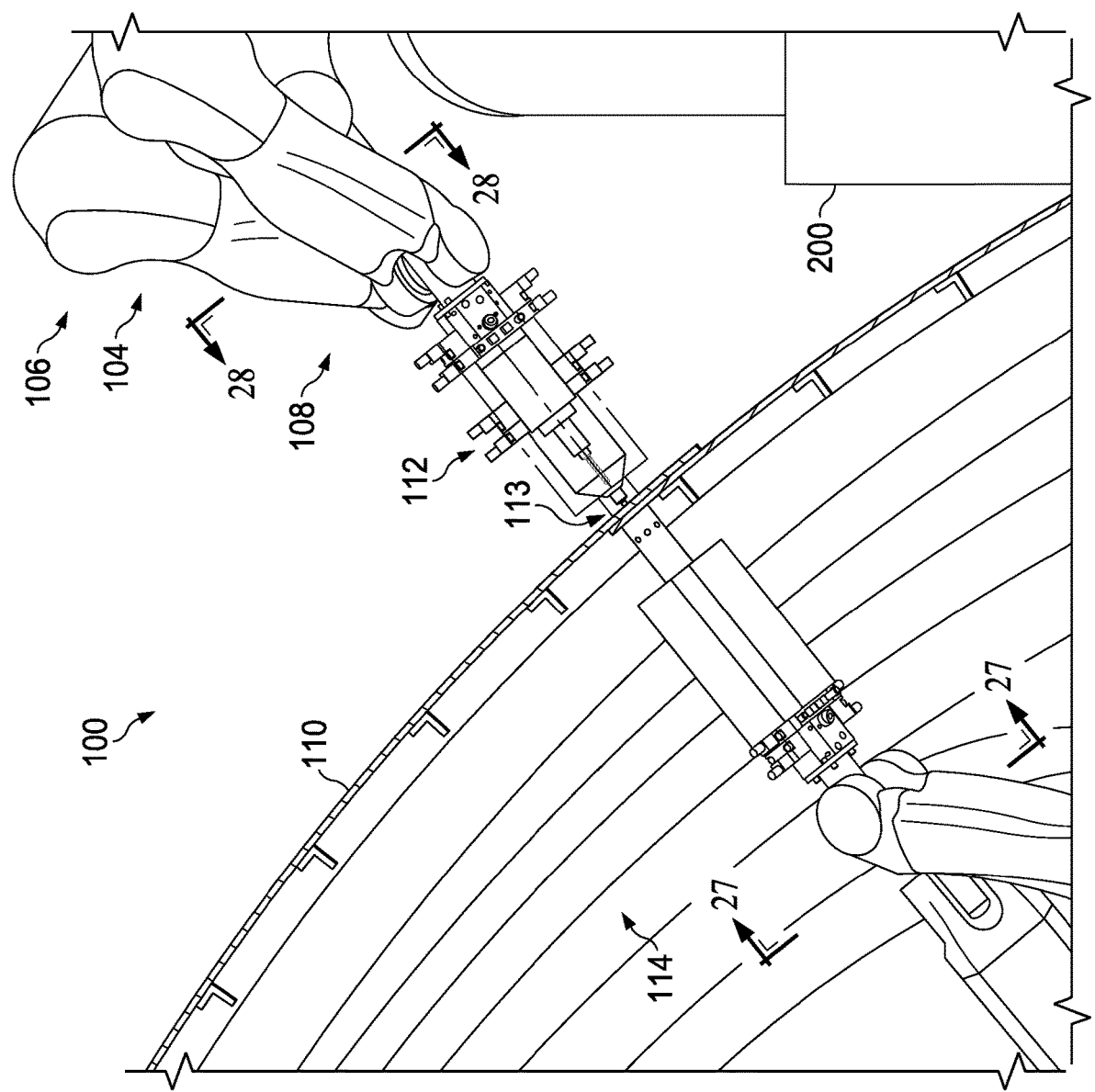
FIG. 26 is an illustration of an enlarged end view of a fuselage assembly being built in accordance with an example embodiment.

FIG. 26 is an illustration of an enlarged end view of fuselage assembly 102 being built in accordance with an example embodiment. This enlarged end view is illustrated from the view of lines 26-26 in FIG. 25. Robotic devices 108 and robotic devices 112 work together to install fasteners that join fuselage panels together to build fuselage assembly 102.

In this illustrative example, robotic devices 108 are coupled with single function end effectors for performing drilling, inspection, and fastener insertion tasks. These single function end effectors may be switched out by being moved around relative to, for example, fastener installation point 113 to perform their individual tasks. As previously described, a single function end effector is an end effector used to perform a single function per robotic device per fastener installation point. In this manner, multiple single function end effectors may be controlled and coordinated to perform individualized, specialized tasks in a predetermined sequence. Accordingly, an automated operation comprised of multiple such specialized tasks may be performed by these single function end effectors working in a coordinated, serial manner.

In some cases, each of robotic devices 108 are moved around on platform 200 in order to position its corresponding end effector for a particular task relative to fastener installation point 113. In other cases, robotic devices 108 may remain stationary on platform 200 but may be used to move and position their end effectors relative to a next location in order to position the proper end effector for a given task relative to fastener installation point 113.

Figure 27:
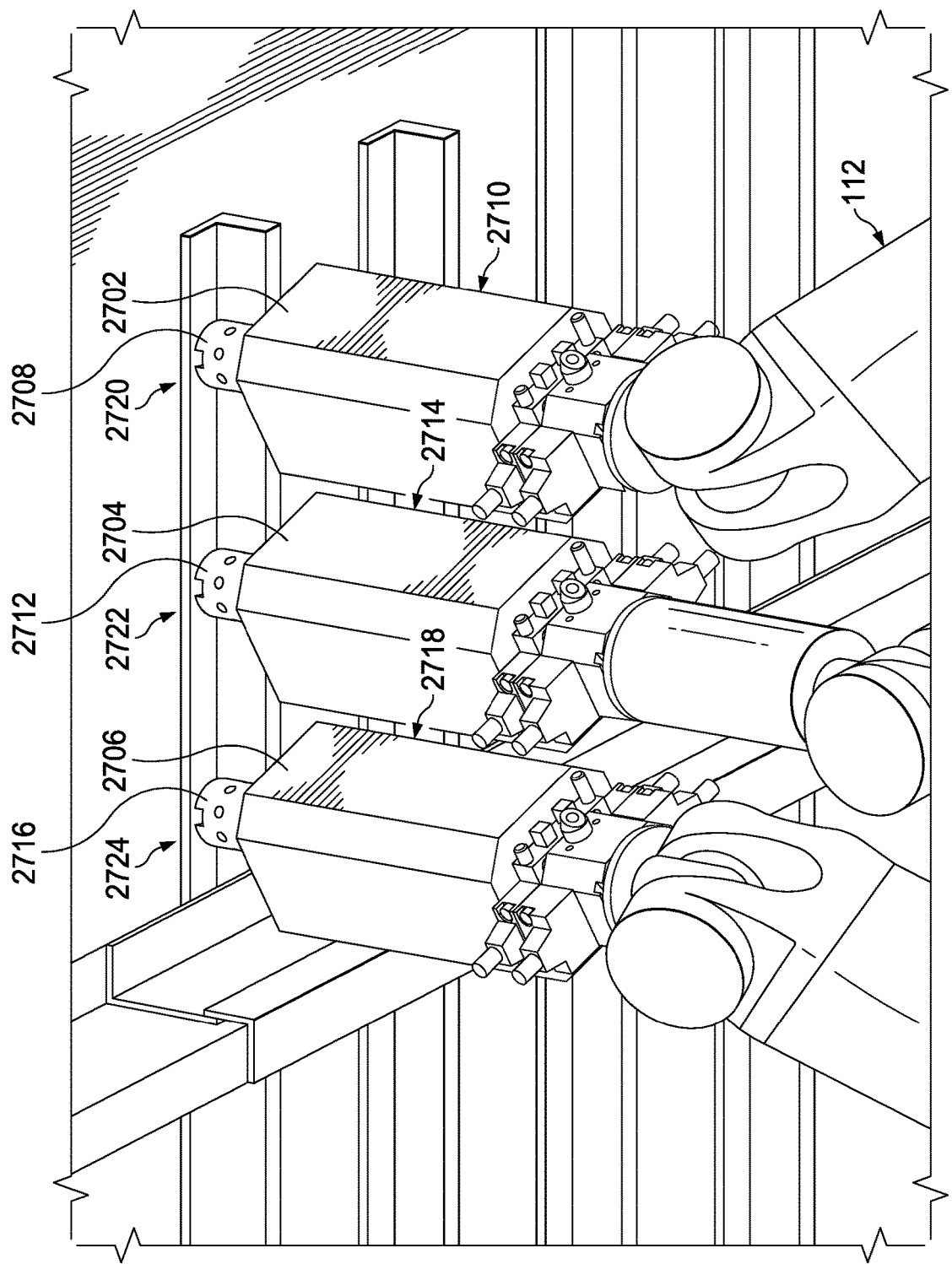
FIG. 27 is an illustration of an enlarged perspective view of end effectors coupled to robotic devices from FIGS. 25-26 in accordance with an example embodiment.

FIG. 27 is an illustration of an enlarged perspective view of end effectors 2700 coupled to robotic devices 112 from FIGS. 25-26 in accordance with an example embodiment. This view of end effectors 2700 is depicted with respect to arrow 27-27 shown in FIG. 26. End effectors 2700 include end effector 2702, end effector 2704, and end effector 2706. End effector 2702, end effector 2704, and end effector 2706 are examples of implementations for end effector 2422, end effector 2424, and end effector 2426, respectively.

Further, each of end effector 2702, end effector 2704, and end effector 2706 may be implemented in a manner similar to end effector 324 described in FIG. 3 and end effector 414 described in FIGS. 4-15. In this illustrative example, end effector 2702 includes nozzle 2708 and suction device 2710. End effector 2704 includes nozzle 2712 and suction device 2714. End effector 2706 includes nozzle 2716 and suction device 2718.

End effector 2702, end effector 2704, and end effector 2706 are used to provide a single-sided clamp-up from interior 114 of fuselage assembly 102 which allows robotic devices 108 in FIGS. 25-26 to facilitate the performing of multiple tasks at multiple locations concurrently such that fastener installation operations are performed as these multiple locations in a serial manner. In particular, robotic devices 2408 may be moved around on platform 200 in FIGS. 25-26 and interchanged to perform various tasks simultaneously at multiple fastener installation points but according to a predetermined task sequence.

End effectors 2700 may each include a sensor system for use in guiding each end effector to a particular fastener installation point. The sensor system may include at least one of, for example, a laser distance sensor, an imaging device, or some other type of sensor.

As depicted, end effectors 2702, 2704, and 2706 are positioned relative to fastener installation points 2720, 2722, and 2724, respectively. In this illustrative example, these fastener installation points are close together. The positioning of end effectors 2702, 2704, and 2706 so close to each other, which allows end effectors 2702, 2704, and 2706 to be positioned relative to fastener installation points 2720, 2722, and 2724, respectively, may be referred to as a high-density setup.

In some illustrative examples, these fastener installation points at which different tasks are concurrently being performed may be adjacent to each other. In other examples, one or more locations may be present between the fastener installation points at which different tasks are concurrently being performed.

The size and shape of these end effectors allows them to be positioned in this high-density setup and allows easy and efficient interchangeability of robotic devices 108 on platform 200. In other words, robotic devices 108 may be easily and quickly moved around on platform 200 to switch up the positioning of end effectors 2702, 2704, and 2706 relative to fastener installation points 2720, 2722, and 2724, respectively.

Figure 28:
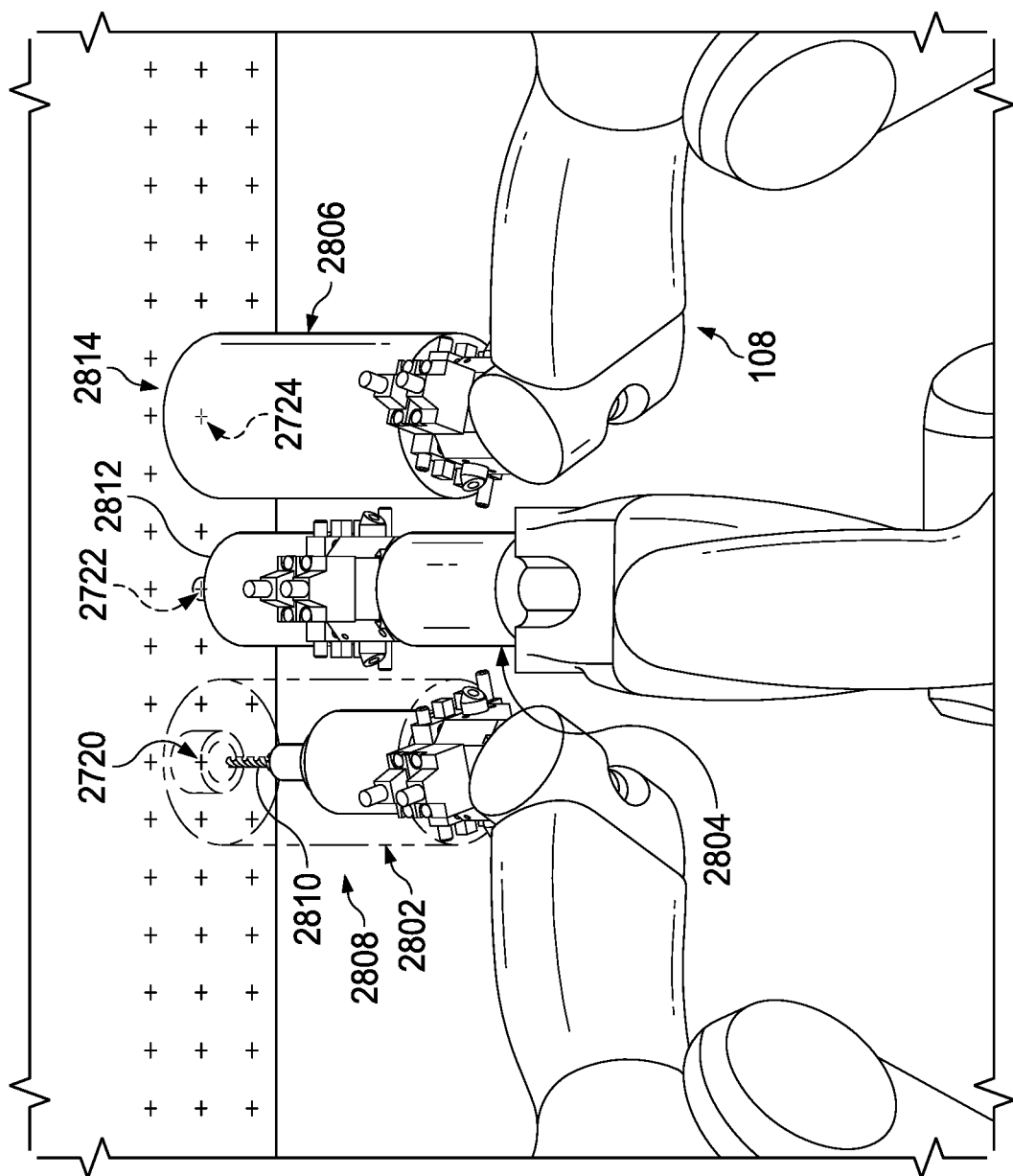
FIG. 28 is an illustration of an enlarged perspective view of end effectors coupled to robotic devices from FIGS. 25-26 in accordance with an example embodiment.

FIG. 28 is an illustration of an enlarged perspective view of end effectors 2800 coupled to robotic devices 108 from FIGS. 25-26 in accordance with an example embodiment. This view of end effectors 2800 is depicted with respect to arrow 28-28 in FIG. 26. End effectors 2800 include end effector 2802, end effector 2804, and end effector 2806. End effectors 2802, 2804, and 2806 are positioned along exterior 110 of fuselage assembly 102 opposite of end effectors 2702, 2704, and 2706, respectively. End effector 2802, end effector 2804, and end effector 2806 are examples of implementations for end effector 2428, end effector 2430, and end effector 2432, respectively.

End effector 2802 may be implemented in a manner similar to end effector 326 in FIG. 3 and end effector 416 in FIGS. 4-9. For example, end effector 2802 includes tool 2808 and drilling tool 2810, which may be implemented similarly to tool 424 and drilling tool 426, respectively, of end effector 416 in FIGS. 4-9.

End effector 2804 includes inspection device 2812. Inspection device 2812 may be used to inspect, for example, a hole that was drilled using drilling tool 426 of end effector 2802. Inspection device 2812 ensures that the drilled hole meets hole tolerances and requirements for fastener installation. Hole tolerances and requirements may define a quality of the hole. For example, inspection device 2812 may be used to inspect at least one of a hole diameter, a roundness of the hole, an angle of the hole relative to the surface, a countersink depth, a countersink size, a countersink angle, or some other type of hole feature.

Inspection device 2812 may take a number of different forms. For example, without limitation, inspection device 2812 may include at least one of a laser sensor, an imaging device, or some other type of sensor.

End effector 2806 may be implemented in a manner similar to end effector 328 described in FIG. 3 and end effector 1100 described in FIGS. 11-13. For example, end effector 2806 includes fastener insertion tool 2814, which may be implemented similarly to fastener insertion tool 1104 in FIGS. 11-13.

End effectors 2800 may each include a sensor system for use in guiding each end effector to a particular fastener installation point. The sensor system may include at least one of, for example, a laser distance sensor, an imaging device, or some other type of sensor.

As depicted, end effectors 2802, 2804, and 2806 are positioned relative to fastener installation points 2720, 2722, and 2724, respectively. In this illustrative example, these fastener installation points are close together but spaced apart (e.g., non-adjacent). For example, fastener installation points 2720, 2722, and 2724 are spaced apart by three fastener installation points. This type of spacing may be used to ensure that end effectors 2802, 2804, and 2806 do not collide. The positioning of end effectors 2802, 2804, and 2806 so close to each other such that end effectors 2802, 2804, and 2806 are positioned relative to fastener installation points 2816, 2818, and 2820, respectively, may be referred to as a high-density setup. This type of setup allows multiple different, specialized tasks to be performed concurrently. The size and shape of these end effectors allows them to be positioned in this high-density setup and allows easy and efficient interchangeability of robotic devices 108 on platform 200. In other words, robotic devices 108 may be easily and quickly moved around on platform 200 to switch up the positioning of end effectors 2802, 2804, and 2806 relative to the multiple fastener installation points, to thereby switch up the functions being performed at the fastener installation points.

Each of robotic devices 112 is coupled with an end effector that is used to hold together the fuselage panels from the interior side of fuselage assembly 102 during the switching out of the single function end effectors coupled to robotic devices 108. In other words, each of robotic devices 112 includes a single function end effector that provides a single-sided clamp-up. For example, after the end effector on one of robotic devices 108 has been used to perform its designated task, that end effector may be moved away from fastener installation point 113 (e.g., to another installation point) to make room for a different end effector. An end effector coupled to one of robotic devices 112 is used to maintain the clamp-up of the fuselage panels from only the interior side of fuselage assembly 102, while the end effectors of robotic devices 108 are being switched around and used efficiently within a high-density robotic zone at exterior 110 of fuselage assembly 102.

Figure 29:
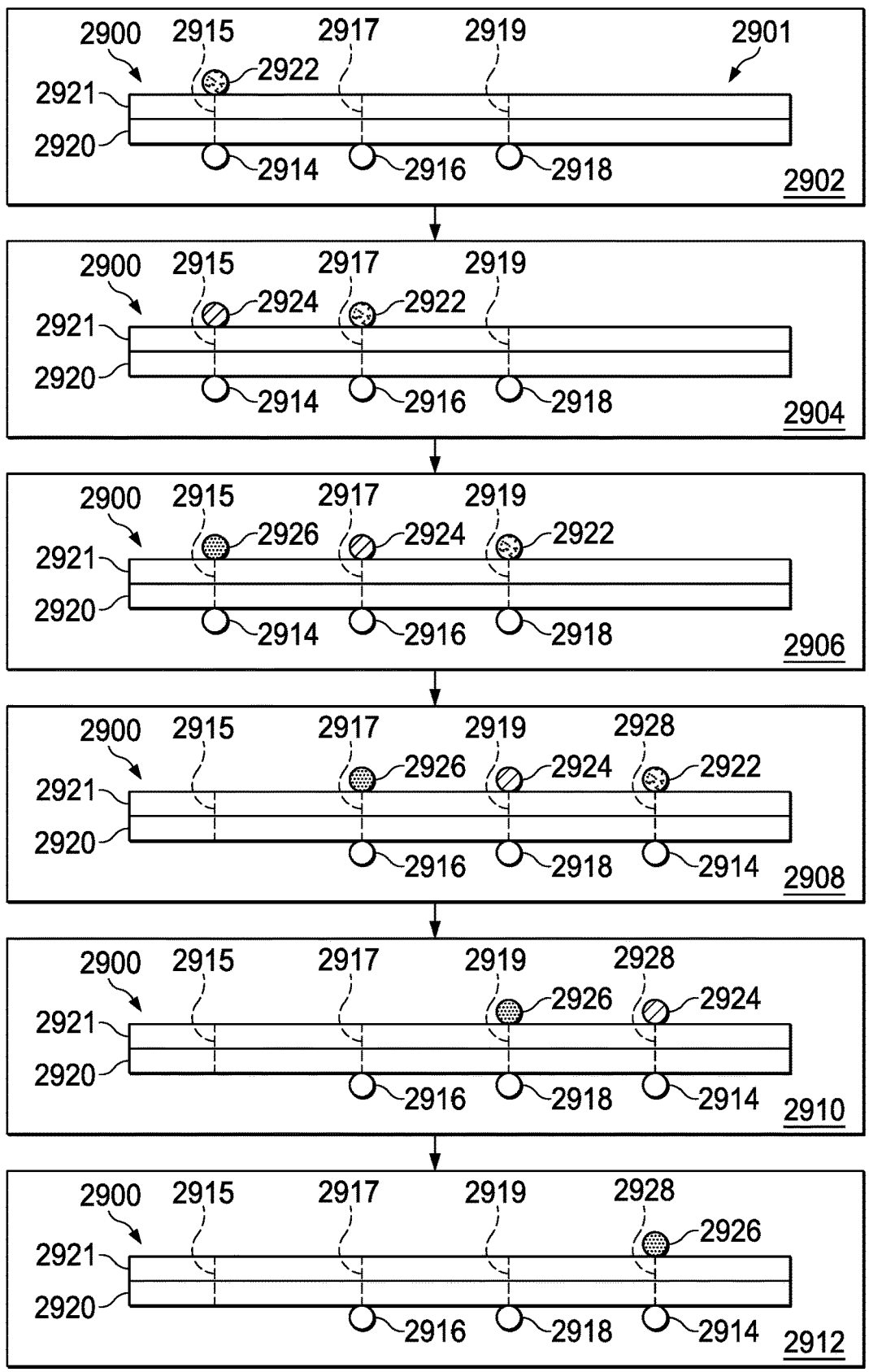
FIG. 29 is a representational sequence diagram of the various stages involved in a cell performing automated fastener installation operations at multiple fastener installation points along an assembly in accordance with an example embodiment.

FIG. 29 is a representational sequence diagram of the various stages involved in a cell performing automated fastener installation operations at multiple fastener installation points along an assembly in accordance with an example embodiment. Cell 2900 is an example of one implementation for cell 2404 in FIG. 24. Cell 2900 is used to perform the automated fastener installation operations on joint 2901. In particular, cell 2900 is used to perform these automated fastener installation operations according to a predetermined task sequence, such as predetermined task sequence 2438 in FIG. 24.

Joint 2901 may also be referred to as an assembly, a lap splice, a fuselage splice, or some other type of skin splice, depending on the implementation. In one illustrative example, joint 2901 includes two parts mated together. In some examples, these parts may be panels, such as fuselage panels or wing panels.

Cell 2900 is used to install fasteners along joint 2901 according to a predetermined task sequence that includes first stage 2902, second stage 2904, third stage 2906, fourth stage 2908, fifth stage 2910, and sixth stage 2912. The number and order of these stages is an example of only one implementation of the predetermined task sequence that may be performed using cell 2900.

Cell 2900 includes end effector 2914, end effector 2916, and end effector 2918, which are coupled to robotic devices (not shown) at first side 2920 of joint 2901. End effectors 2914, 2916, and 2918 may be implemented similarly to end effectors 2422, 2424, and 2426, respectively, from FIG. 24. Further, cell 2900 includes drilling end effector 2922, which is coupled to a robotic device (not shown) at second side 2921 of joint 2901. Drilling end effector 2922 may be implemented similarly to end effector 2428 from FIG. 24.

Cell 2900 is used to perform automated fastener installation operations at fastener installation points 2915, 2917, and 2919. These fastener installation points may be adjacent fastener installation points as shown, without any other fastener installation points between them. Alternatively, one or more other fastener installation points may be present between fastener installation point 2915 and fastener installation point 2917, fastener installation point 2917 and fastener installation point 2919, or both. This type of spacing apart of fastener installation points is similar to that shown in FIG. 28.

As further described below, the various end effectors of cell 2900 are moved and positioned relative to these different fastener installation points by moving the robotic devices to which these end effectors are coupled. Further, in some illustrative examples, the operations and movement of the end effectors and robotic devices as described below are controlled by a control system, such as control system 315 in FIGS. 3 and 24.

At first stage 2902, end effector 2914, end effector 2916, and end effector 2918 are positioned relative to fastener installation point 2915, fastener installation point 2917, and fastener installation point 2919, respectively. Further, drilling end effector 2922 is moved and positioned relative to fastener installation point 2915 for use in performing a specialized task at fastener installation point 2915.

In this illustrative example, at first stage 2902, end effector 2914 is aligned with drilling end effector 2922. Further, at first stage 2902, end effector 2914 and drilling end effector 2922 are used to establish a clamp-up of joint 2901 at fastener installation point 2915 and to drill a hole at fastener installation point 2915. These tasks may be performed in any of the number of ways described above.

In one illustrative example, end effector 2914 and drilling end effector 2922 first establish a clamp-up of joint 2901. Drilling end effector 2922 then drills a hole at fastener installation point 2915. Once the hole has been drilled, end effector 2914 then establishes a single-sided clamp-up using any of the number of methods described above. For example, end effector 2914 may use suctioning to establish and maintain the single-sided clamp-up. In other words, once the single-sided clamp-up has been established, end effector 2914 is able to maintain this clamp-up of joint 2901 at fastener installation point 2915 without further assistance from drilling end effector 2922.

At second stage 2904, drilling end effector 2922 is swapped out for inspection end effector 2924, while end effector 2914 maintains the clamp-up at fastener installation point 2915. As one illustrative example, at second stage 2904, drilling end effector 2922 is moved away from fastener installation point 2915 and positioned relative to fastener installation point 2917.

As previously described, fastener installation point 2917 may be adjacent to fastener installation point 2915 without any other fastener installation points in between them. Alternatively, fastener installation point 2917 and fastener installation point 2915 may be non-adjacent (i.e. having one or more other fastener installation points between them). In this manner, drilling end effector 2922 may be configured to skip over one or more fastener installation points to reach fastener installation point 2917. For example, drilling end effector 2922 may be controlled to only drill holes at every second, every third, every fourth, or every $n^{th}$ fastener installation point. In some cases, the fastener installation points may be in different horizontal rows along joint 2901.

Further, at second stage 2904, inspection end effector 2924 is moved and positioned relative to fastener installation point 2915 to perform a next specialized task at fastener installation point 2915. Inspection end effector 2924 is used to inspect the hole drilled at fastener installation point 2915, while end effector 2914 maintains the clamp-up at fastener installation point 2915. Concurrently, end effector 2916 and drilling end effector 2922 establish a clamp-up at fastener installation point 2917. Further, drilling end effector 2922 drills a hole at fastener installation point 2917. Once the hole is drilled, end effector 2916 is used to establish and independently maintain a single-sided clamp-up of joint 2901 at fastener installation point 2917. This single-sided clamp-up allows drilling end effector 2922 to be swapped out for inspection end effector 2924 at fastener installation point 2917 in the next stage.

At third stage 2906, drilling end effector 2922 is moved away from fastener installation point 2917 and positioned relative to fastener installation point 2919; inspection end effector 2924 is moved and positioned relative to fastener installation point 2917 to perform a next specialized task at fastener installation point 2917; and fastener insertion end effector 2926 is moved and positioned relative to fastener installation point 2915 to perform a next specialized task at fastener installation point 2915.

Fastener insertion end effector 2926 is used to install a fastener at fastener installation point 2915. In some illustrative examples, fastener insertion end effector 2926 is able to install the fastener on its own. For example, installing the fastener may include inserting a fastener within the hole drilled at fastener installation point 2915 until a desired interference fit is formed. In other examples, fastener insertion end effector 2926 is used to insert a fastener in the hole drilled at fastener installation point 2915, while end effector 2914 is used to complete installation of the fastener. End effector 2914 maintains the clamp-up at fastener installation point 2915 until the fastener has been fully installed at fastener installation point 2915, after which, end effector 2914 is no longer needed to maintain the clamp-up at fastener installation point 2915.

Concurrently with the installation of the fastener at fastener installation point 2915, inspection end effector 2924 inspects the hole drilled at fastener installation point 2917. Further, concurrently with the installation of the fastener at fastener installation point 2915 and the inspection of the hole at fastener installation point 2917, end effector 2918 and drilling end effector 2922 are used to establish a clamp-up at fastener installation point 2919. Further, drilling end effector 2922 drills a hole at fastener installation point 2919. Once the hole is drilled, end effector 2918 is used to establish and maintain a single-sided clamp-up of joint 2901 at fastener installation point 2919. This single-sided clamp-up allows drilling end effector 2922 to be swapped out for inspection end effector 2924 at fastener installation point 2919 at the next stage.

At fourth stage 2908, drilling end effector 2922 is moved and positioned relative to a new fastener installation point 2928; inspection end effector 2924 is moved and positioned relative to fastener installation point 2919; and fastener insertion end effector 2926 is moved and positioned relative to fastener installation point 2917. Further, end effector 2914 is moved and positioned relative to fastener installation point 2928.

At fourth stage 2908, end effector 2914 and drilling end effector 2922 establish a clamp-up at fastener installation point 2928. Drilling end effector 2922 drills a hole at fastener installation point 2928. End effector 2914 then establishes and maintains a single-sided clamp-up at fastener installation point 2928. Concurrently with the tasks being performed by end effector 2914 and drilling end effector 2922, inspection end effector 2924 inspects the hole drilled at fastener installation point 2919, while fastener insertion end effector 2926 installs a fastener in the hole drilled at fastener installation point 2917. Once the fastener has been installed at fastener installation point 2917, end effector 2918 is no longer needed to maintain the clamp-up at fastener installation point 2917.

In this illustrative example, fastener installation point 2928 may be the final location along joint 2901 at which a fastener is to be installed. However, in other illustrative examples, any other number of fastener installation points may be present between fastener installation point 2917 and fastener installation point 2928 or after fastener installation point 2928.

At fifth stage 2910, drilling end effector 2922 is moved away from joint 2901; inspection end effector 2924 is moved and positioned relative to fastener installation point 2928; and fastener insertion end effector 2926 is moved and positioned relative to fastener installation point 2919.

Inspection end effector 2924 inspects the hole drilled at fastener installation point 2928, while fastener insertion end effector 2926 concurrently installs a fastener at fastener installation point 2919. Once the fastener has been installed at fastener installation point 2919, end effector 2918 is no longer needed to maintain the clamp-up at fastener installation point 2919.

In other illustrative examples, joint 2901 may include many other locations after fastener installation point 2928 at which fasteners are to be installed. In these examples, drilling end effector 2922 would only move away from joint 2901 after it has been used to drill holes at each of these locations.

For example, any number of other stages may be present between fourth stage 2908 and fifth stage 2910. Drilling end effector 2922, inspection end effector 2924, and fastener insertion end effector 2426 may continue moving in the serial manner shown to perform concurrent tasks at other fastener installation points.

At sixth sage 2912, inspection end effector 2924 is moved away from joint 2901 and fastener insertion end effector 2926 is moved and positioned relative to fastener installation point 2928. Fastener insertion end effector 2926 installs a fastener at fastener installation point 2928. Once the fastener has been installed at fastener installation point 2928, end effector 2914 is no longer needed to maintain the clamp-up at fastener installation point 2928.

In this manner, the installation of fasteners at fastener installation points 2915, 2916, 2918, and 2928 may be automated by cell 2900. Cell 2900 quickly, accurately, and efficiently performs these automated fastener installation operations because of the interchangeability of the end effectors of cell 2900.

As described above via the various stages illustrated in FIG. 29, cell 2900 is used to perform different tasks (e.g., drilling, inspection, fastener insertion and installation) of a fastener installation operation at multiple locations concurrently, while still ensuring that the tasks are performed at any given fastener installation point in the proper sequence for the fastener installation operation. Cell 2900 is a high-density robotic cell that allows different tasks of a fastener installation operation to be performed in a small volumetric space.

In these illustrative examples, the interchanging of the various end effectors is tailored to meet selected takt time and production requirements. In other words, the moving and re-positioning of end effectors may be controlled and timed based on the selected takt time and production requirements. Further, the movement of these end effectors via the robotic devices to which they are coupled may be controlled and coordinated by the control system (e.g., control system 315 in FIGS. 3 and 24) to prevent collisions of the end effectors or robotic devices during movement.

Figure 30:
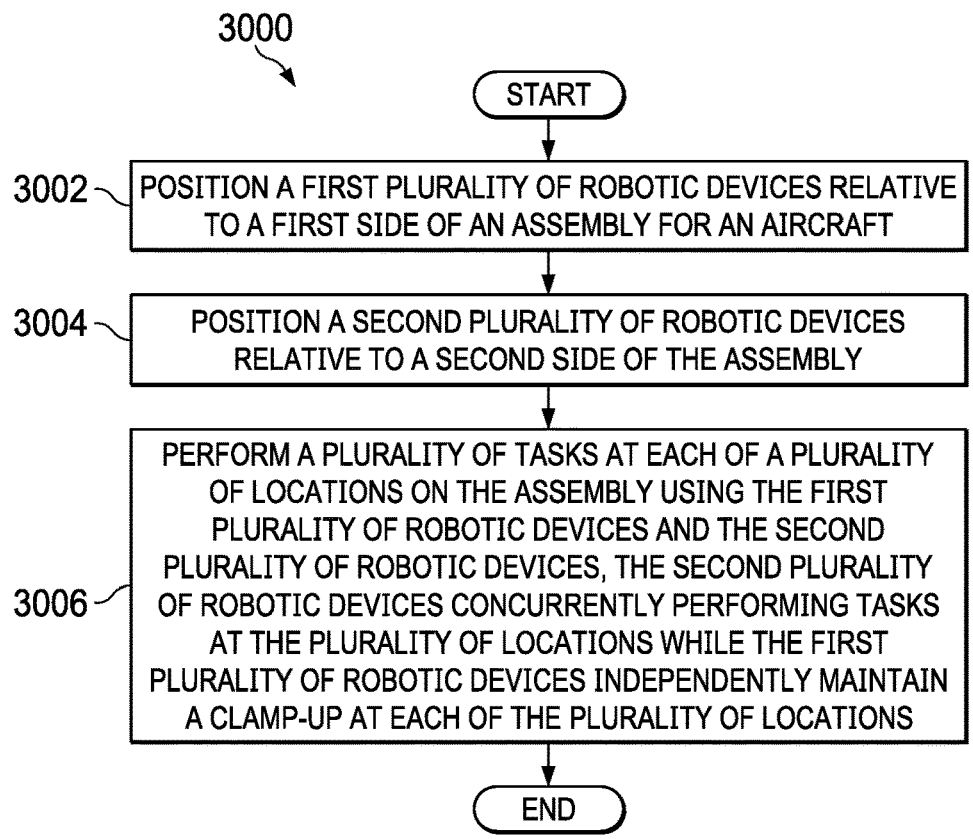
FIG. 30 is a flowchart of a process for performing automated operations for an assembly in accordance with an example embodiment.

FIG. 30 is a flowchart of a process for performing automated operations for an assembly in accordance with an example embodiment. Process 3000 illustrated in FIG. 30 may be performed using, for example, a cell, such as cell 2404 described in FIG. 24. Process 3000 is a fully automated process.

Process 3000 may begin by positioning a first plurality of robotic devices relative to a first side of an assembly for an aircraft (operation 3002). In operation 3002, the first plurality of robotic devices may be, for example, robotic devices 2406 in FIG. 24. In one illustrative example, the assembly is a fuselage assembly and the first area is a first volumetric area located within the interior of the fuselage assembly.

Next, a second plurality of robotic devices is positioned relative to a second side of the assembly (operation 3004). In operation 3004, the second plurality of robotic devices may be, for example, robotic devices 2408 in FIG. 24. In one illustrative example, the second area is a second volumetric area located at the exterior of the fuselage assembly. Further, each of the second plurality of robotic devices is used to perform a corresponding task.

A plurality of tasks is performed at each of a plurality of locations on the assembly using the first plurality of robotic devices and the second plurality of robotic devices, the second plurality of robotic devices concurrently performing tasks at the plurality of locations while the first plurality of robotic devices independently maintain a clamp-up at each of the plurality of locations (operation 3006), with the process terminating thereafter. In operation 3006, the plurality of tasks are automated tasks. In these illustrative examples, the plurality of tasks includes a drilling task, an inspection task (e.g., a hole inspection task), and a fastener installation task.

Figure 31:
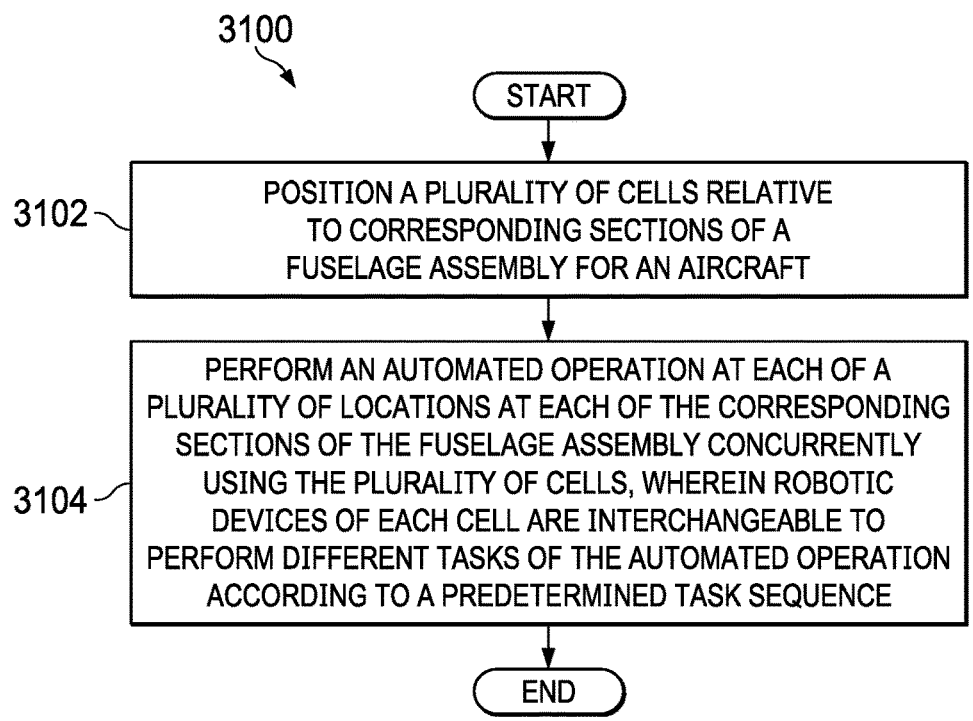
FIG. 31 is a flowchart of a process for performing automated operations to build a fuselage assembly for an aircraft in accordance with an example embodiment.

FIG. 31 is a flowchart of a process for performing automated operations to build a fuselage assembly for an aircraft in accordance with an example embodiment. Process 3100 illustrated in FIG. 31 may be performed using, for example, high-density robotic system 2400 described in FIG. 24. In particular, process 3100 is performed using plurality of cells 2402 of high-density robotic system 2400 in FIG. 24. Process 3100 is a fully automated process.

Process 3100 begins by positioning a plurality of cells relative to corresponding sections of a fuselage assembly for an aircraft (operation 3102). In operation 3102, the plurality of cells is a plurality of robotic cells. Each of the plurality of cells includes a first plurality of robotic devices positioned relative to an interior of the fuselage assembly and a second plurality of robotic devices positioned relative to an exterior of the fuselage assembly.

Thereafter, an automated operation is performed at each of a plurality of locations at each of the corresponding sections of the fuselage assembly concurrently using the plurality of cells, wherein robotic devices of each cell are interchangeable to perform different tasks of the automated operation according to a predetermined task sequence (operation 3104), with the process terminating thereafter. This type of coordinated operation of the plurality of cells and the robotic devices within each cell of the plurality of cells ensures efficiency and improved overall production times.

Figure 32A:
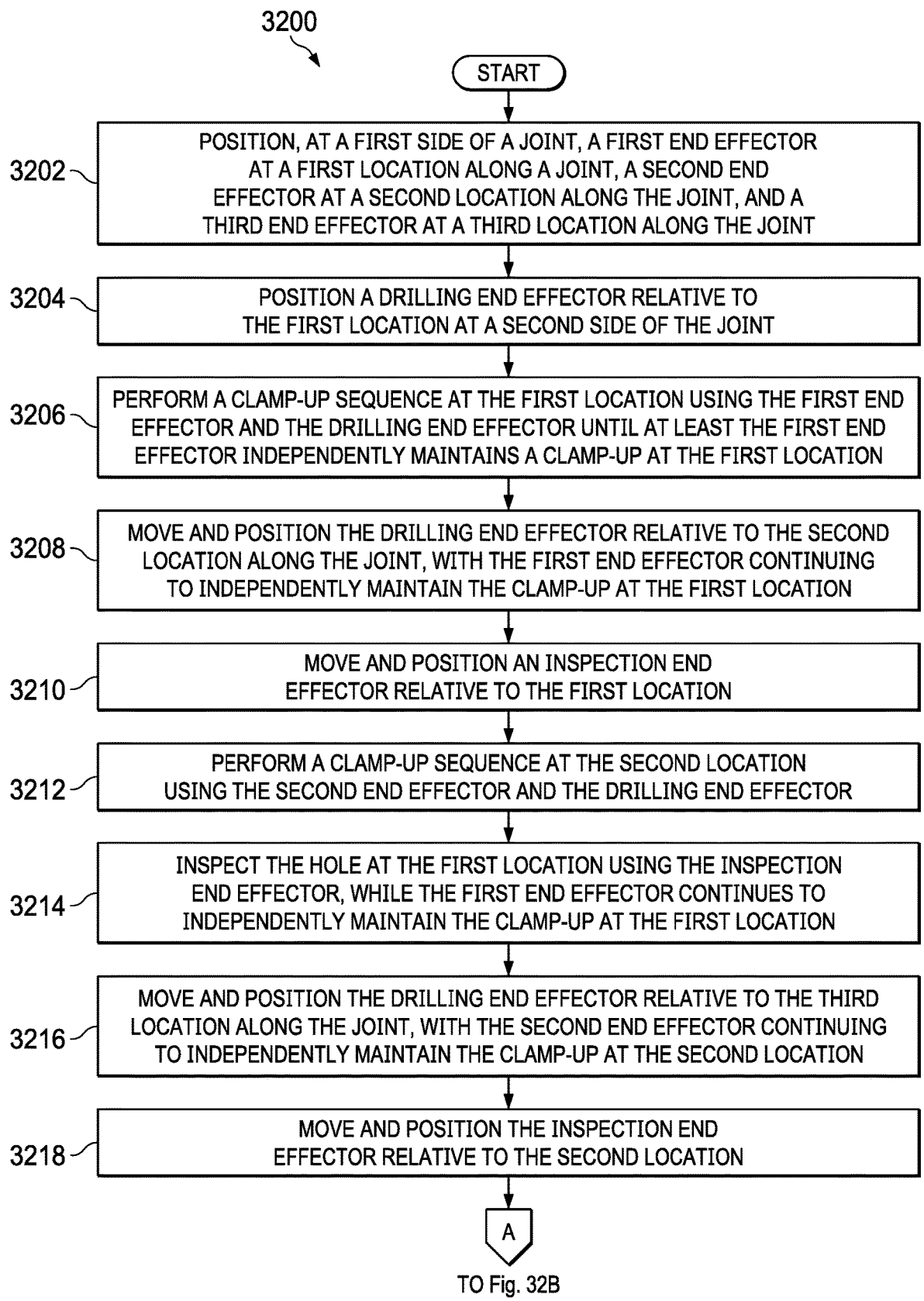
FIGS. 32A, 32B, and 32C are flowcharts of a process for performing automated fastener installation operations along a joint in accordance with an example embodiment.
Figure 32B:
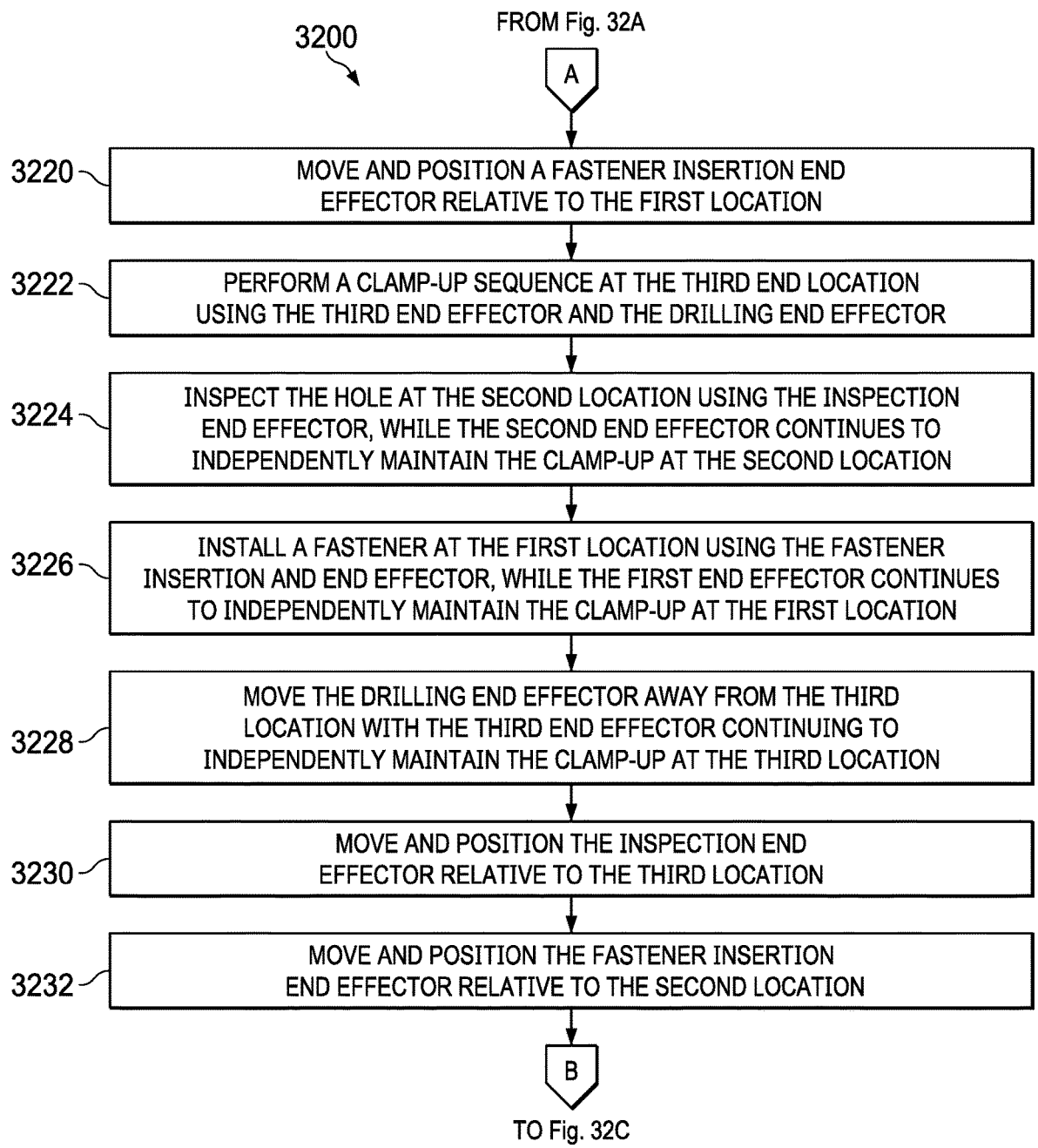
Figure 32C:
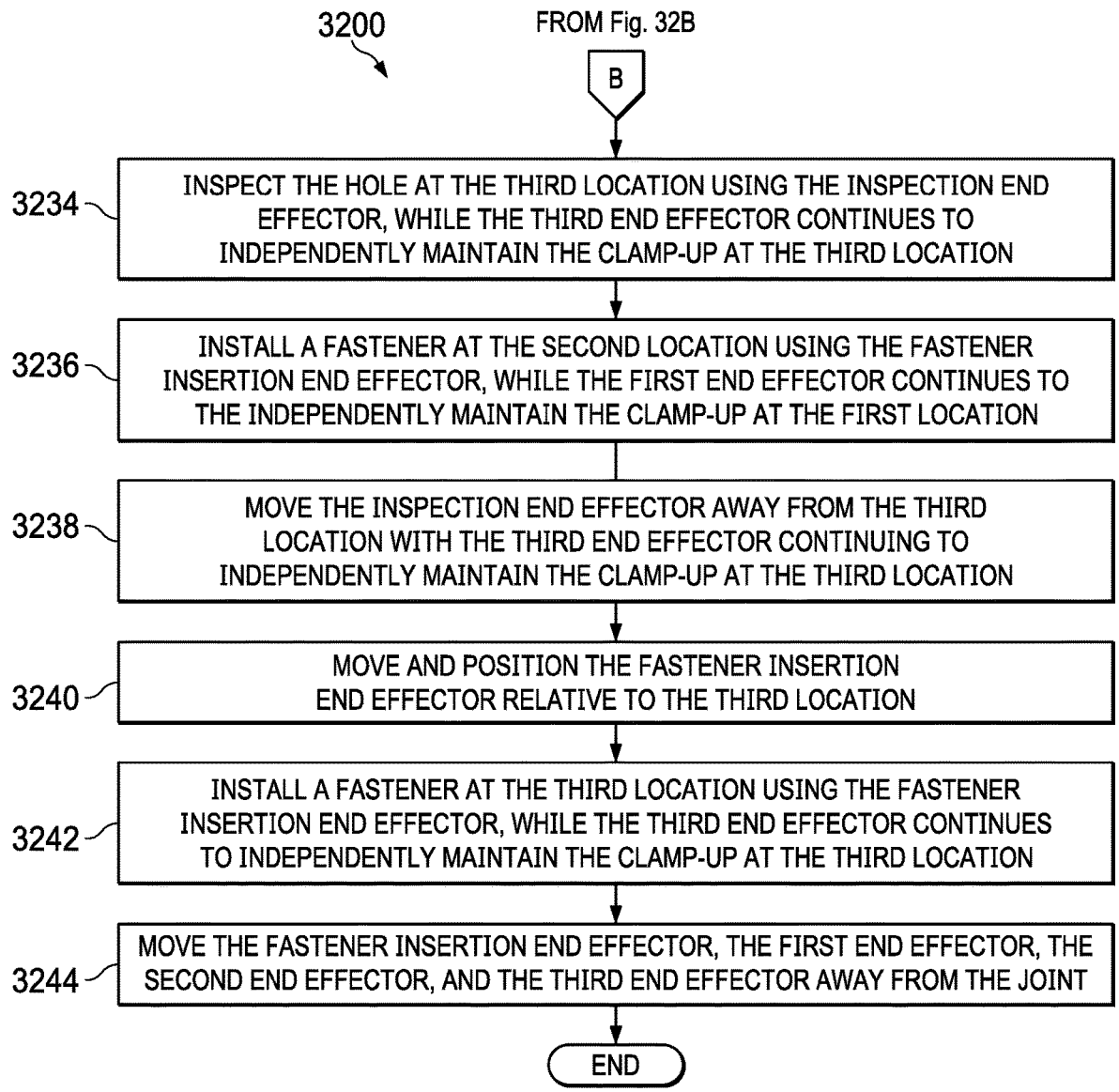

FIGS. 32A, 32B, and 32C are flowcharts of a process for performing automated fastener installation operations along a joint in accordance with an example embodiment. Process 3200 illustrated in FIG. 32 may be performed using, for example, a cell, such as cell 2404 described in FIG. 24. Process 3200 is a fully automated process. Further, process 3200 is an example of one way in which multiple automated operations, such as automated operation 2434, may be performed according to predetermined task sequence 2438 described in FIG. 24.

Process 3200 begins by positioning, at a first side of a joint, a first end effector at a first location along a joint, a second end effector at a second location along the joint, and a third end effector at a third location along the joint (operation 3202). The joint includes a first part and a second part, which may be, for example, skin panels. For example, the joint may be a lap splice comprised of fuselage or wing skin panels. In one example, the joint includes a first panel that forms a first side of the joint and a second panel that forms a second side of the joint. The first location is a first fastener installation point.

In these illustrative examples, operation 3202 includes generally aligning a nozzle of the first end effector with the first location. For example, the nozzle may be aligned with respect to an axis extending through the joint at the first location.

In one illustrative example, the first end effector, the second end effector, and the third end effector are positioned at the first location, the second location, and the third location, respectively, at the same time. In other illustrative examples, operation 3202 may be performed in stages during process 3200. For example, the first end effector may be positioned at the first location before operation 3204, but the second end effector may be positioned at the second location during operation 3208 or operation 3210 described further below or between these two operations. Similarly, in some cases, the third end effector may be positioned at the third location during operation 3218 or operation 3220 described further below or between these two operations.

Thereafter, a drilling end effector is positioned relative to the first location at a second side of the joint (operation 3204). In these illustrative examples, operation 3204 includes generally aligning a tool of the drilling end effector with the first location. For example, the tool may be aligned with respect to the axis extending through the joint at the first location.

Next, a clamp-up sequence is performed at the first location using the first end effector and the drilling end effector until at least the first end effector independently maintains a clamp-up at the first location (operation 3206). Operations 1602-1608 in FIG. 16 are an example of one manner in which a clamp-up sequence, such as the clamp-up sequence in operation 3206, may be performed. Operations 1602-1608 may be used to implement operation 3206 when a hole (e.g., a fastener hole or a through-hole) needs to be drilled at the first location in order to install a fastener at the first location.

For example, the first end effector may be used to apply the first mechanical force in operation 1602 as well as perform the suctioning in operation 1606. Further, the drilling end effector may be used to apply the second mechanical force in operation 1602 as well as perform the drilling task in operation 1604. With respect to operation 1602, the first and second mechanical forces are equal and opposite mechanical forces.

Operations 1702-1704 are an example of another way in which the clamp-up sequence may be performed. For example, the first end effector may be used to apply the first mechanical force in operation 1702 as well as perform the suctioning in operation 1704. The drilling end effector may be used to apply the second mechanical force in operation 1702.

Operations 1702-1704 may be used to implement operation 3206 when determinate assembly holes are already present in the first panel and the second panel of the joint. Aligning the holes in these two panels with forms a through-hole extending through the joint and within which a fastener can be installed.

In these illustrative examples, at the end of the clamp-up sequence of operation 3206, a single-sided clamp-up is provided at the first location. This single-sided clamp-up is independently maintained by the first end effector. Providing the single-sided clamp-up may be performed in a number of different ways. For example, providing a single-sided clamp-up may include performing operations similar to 1606 and 1608 in FIG. 16, operations 1704 and 1706 in FIG. 17, operation 1804 in FIG. 18, operations 1902 and 1904 in FIG. 19, operations 2004 and 2006 in FIG. 20, operations 2102, 2104, and 2106 in FIG. 21, operations 2202 and 2204 in FIG. 22, or operation 2304 in FIG. 23.

Thereafter, the drilling end effector is moved and positioned relative to the second location along the joint, with the first end effector continuing to independently maintain the clamp-up at the first location (operation 3208). An inspection end effector is then moved and positioned relative to the first location (operation 3210).

A clamp-up sequence is performed at the second location using the second end effector and the drilling end effector (operation 3212). Operations 1602-1608 in FIG. 16 are an example of one manner in which a clamp-up sequence, such as the clamp-up sequence in operation 3212, may be performed. For example, the second end effector may be used to apply the first mechanical force in operation 1602 as well as perform the suctioning in operation 1606. Further, the drilling end effector may be used to apply the second mechanical force in operation 1602 as well as perform the drilling task in operation 1604.

Operations 1702-1704 are an example of another way in which the clamp-up sequence may be performed. For example, the second end effector may be used to apply the first mechanical force in operation 1702 as well as perform the suctioning in operation 1704. The drilling end effector may be used to apply the second mechanical force in operation 1702.

In these illustrative examples, at the end of the clamp-up sequence of operation 3212, a single-sided clamp-up is provided at the first location. This single-sided clamp-up is independently maintained by the first end effector. As previously described, the single-sided clamp-up may be provided in a number of different ways.

The hole at the first location is inspected using the inspection end effector, while the first end effector continues to independently maintain the clamp-up at the first location (operation 3214). In these illustrative examples, operation 3212 and operation 3214 are performed concurrently.

The drilling end effector is then moved and positioned relative to the third location along the joint, with the second end effector continuing to independently maintain the clamp-up at the second location (operation 3216). The inspection end effector is then moved and positioned relative to the second location (operation 3218). Further, a fastener insertion end effector is moved and positioned relative to the first location (operation 3220).

A clamp-up sequence is performed at the third location using the third end effector and the drilling end effector (operation 3222). Operations 1602-1608 in FIG. 16 are an example of one manner in which a clamp-up sequence, such as the clamp-up sequence in operation 3222, may be performed. For example, the third end effector may be used to apply the first mechanical force in operation 1602 as well as perform the suctioning in operation 1606. Further, the drilling end effector may be used to apply the second mechanical force in operation 1602 as well as perform the drilling task in operation 1604.

Operations 1702-1704 are an example of another way in which the clamp-up sequence may be performed. For example, the third end effector may be used to apply the first mechanical force in operation 1702 as well as perform the suctioning in operation 1704. The drilling end effector may be used to apply the second mechanical force in operation 1702.

In these illustrative examples, at the end of the clamp-up sequence of operation 3222, a single-sided clamp-up is provided at the first location. This single-sided clamp-up is independently maintained by the first end effector. As previously described, the single-sided clamp-up may be provided in a number of different ways.

The hole at the second location is inspected using the inspection end effector, while the second end effector continues to independently maintain the clamp-up at the second location (operation 3224). A fastener is installed at the first location using the fastener insertion end effector, while the first end effector continues to independently maintain the clamp-up at the first location (operation 3226). In these illustrative examples, operations 3222, 3224, and 3226 are performed concurrently.

Thereafter, the drilling end effector is moved away from the third location with the third end effector continuing to independently maintain the clamp-up at the third location (operation 3228). The inspection end effector is moved and positioned relative to the third location (operation 3230). The fastener insertion end effector is moved and positioned relative to the second location (operation 3232).

The hole at the third location is inspected using the inspection end effector, while the third end effector continues to independently maintain the clamp-up at the third location (operation 3234). A fastener is installed at the second location using the fastener insertion end effector, while the first end effector continues to independently maintain the clamp-up at the first location (operation 3236). In these illustrative examples, operations 3234 and 3236 are performed concurrently.

Thereafter, the inspection end effector is moved away from the third location with the third end effector continuing to independently maintain the clamp-up at the third location (operation 3238). The fastener insertion end effector is moved and positioned relative to the third location (operation 3240). A fastener is installed at the third location using the fastener insertion end effector, while the third end effector continues to independently maintain the clamp-up at the third location (operation 3242).

The fastener insertion end effector, the first end effector, the second end effector, and the third end effector are moved away from the joint (operation 3244), with the process terminating thereafter. Although these end effectors are described as being moved away in operation 3244, one or more of these end effectors may be moved at various times during the overall process 3200.

For example, the first end effector may be moved away from the first location after the fastener is installed at the first location. The second end effector may be moved away from the second location after the fastener is installed at the second location. Further, the third end effector and the fastener insertion end effector may both be moved away from the third location after the third fastener has been installed at the third location.

Figure 33:
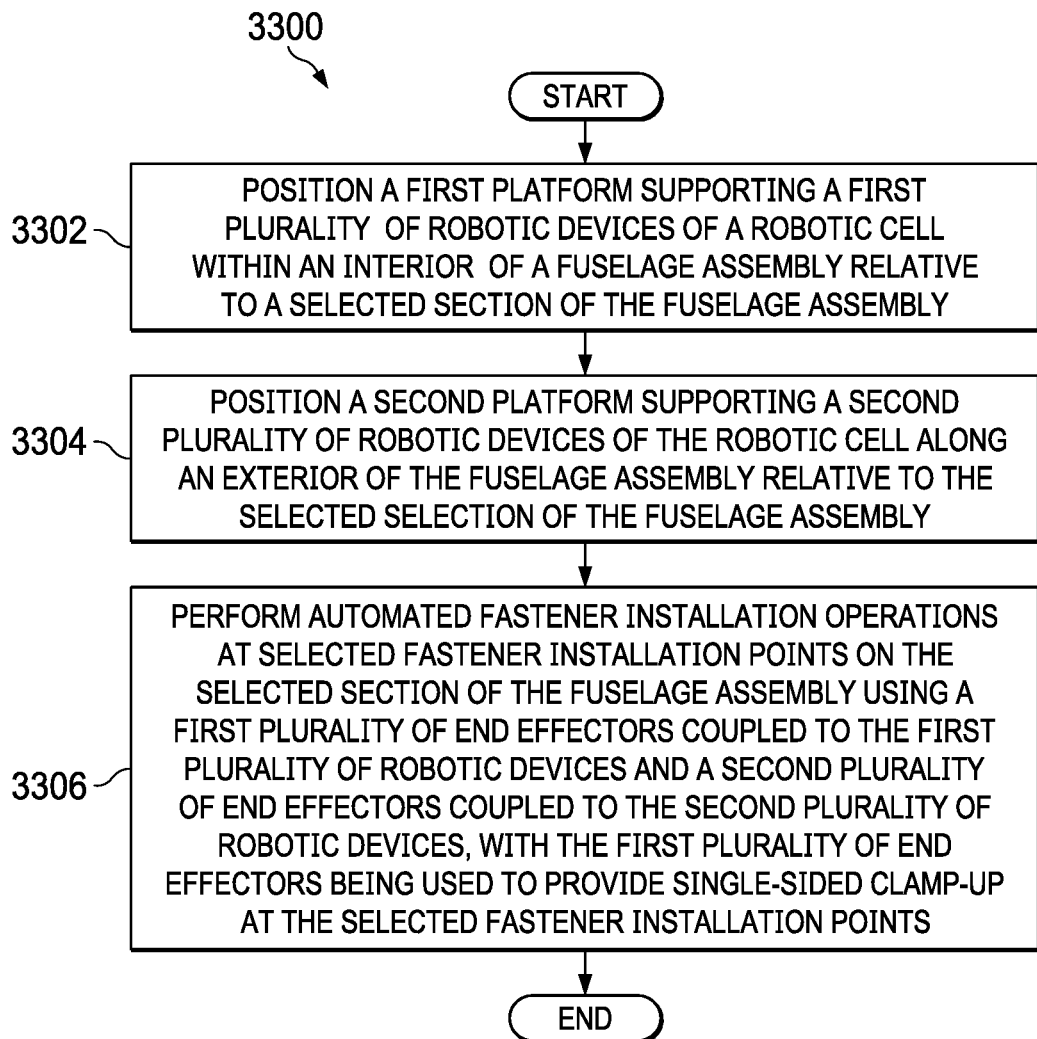
FIG. 33 is a flowchart of a process for performing automated fastener installation operations along a fuselage assembly for an aircraft in accordance with an example embodiment.

FIG. 33 is a flowchart of a process for performing automated fastener installation operations along a fuselage assembly for an aircraft in accordance with an example embodiment. Process 3300 illustrated in FIG. 33 may be performed using, for example, a cell, such as cell 2404 described in FIG. 24. Process 3300 is a fully automated process.

Process 3300 begins by positioning a first platform supporting a first plurality of robotic devices of a robotic cell within an interior of a fuselage assembly relative to a selected section of the fuselage assembly (operation 3302). Next, a second platform supporting a second plurality of robotic devices of the robotic cell is positioned along an exterior of the fuselage assembly relative to the selected section of the fuselage assembly (operation 3304). In operations 3302 and 3304, the first and second platforms are positioned to provide coordinated operation of the first plurality of robotic devices and the second plurality of robotic devices.

Operations 3302 and 3304 may be performed in a number of different ways. In one illustrative example, each of the first platform and the second platform is directly or indirectly coupled to a mobile device, such as an automated guided vehicle. The mobile device is able to move the first platform and the second platform relative to the fuselage assembly.

In another illustrative example, the first platform and the second platform are stationary. In this example, the fuselage assembly may be supported by a mobile support system, which may include one or more automated guided vehicles, that is used to move the fuselage assembly relative to the first and second platforms.

Thereafter, automated fastener installation operations are performed at selected fastener installation points on the selected section of the fuselage assembly using a first plurality of end effectors coupled to the first plurality of robotic devices and a second plurality of end effectors coupled to the second plurality of robotic devices, with the first plurality of end effectors being used to provide single-sided clamp-up at the selected fastener installation points (operation 3306), with the process terminating thereafter. Operation 3308 includes tailoring interchanging of the second plurality of robotic devices, and thereby the second plurality of end effectors, to meet selected takt time and production requirements.

The single-sided clamp-up provided by the first plurality of end effectors enables the second plurality of robotic devices, and thereby the second plurality of end effectors, to be moved around the second platform and switched out at the various fastener installation points. Movement of the second plurality of robotic devices may be coordinated based on the time needed to perform the tasks that are performed concurrently.

The "takt" time for a stage or phase is the time interval within which any one or more of the tasks are to be performed alone or concurrently. The "takt" time may be selected, for example, based on the task having the longest duration. In one illustrative example, drilling a hole takes about 4 seconds; inspection of the hole takes about 15 seconds; and installing a fastener in the hole may take about 5 seconds. Thus, the "takt time" for this stage or phase may be selected as 20 seconds. In other words, coordinate movement and swapping of the second plurality of robotic devices is set to occur every 20 seconds.

Although process 3300 is described with respect to a single robotic cell. Process 3300 may be repeated any number of additional times using different robotic cells positioned relative to different sections of the fuselage assembly. As one illustrative example, three different instances of process 3300 may be performed by three different robotic cells concurrently. In this manner, the overall time and resources needed to perform fastener installation operations at the desired fastener installation points along fuselage assembly is greatly reduced.

The robotic cells (i.e. high-density robotic cells) form a high-density robotic system that improves overall efficiency, simplifies the fastener installation process, and reduces the overall production time for building the fuselage assembly. The high-density robotic system streamlines the various tasks involved in fastener installation and provides a high-efficiency continuous-flow production system. The continuous flow is maintained by the movement of at least one of the first platform relative to the fuselage assembly, the second platform relative to the fuselage assembly, or the fuselage assembly relative to at least one of the first or second platforms.

Figure 34:
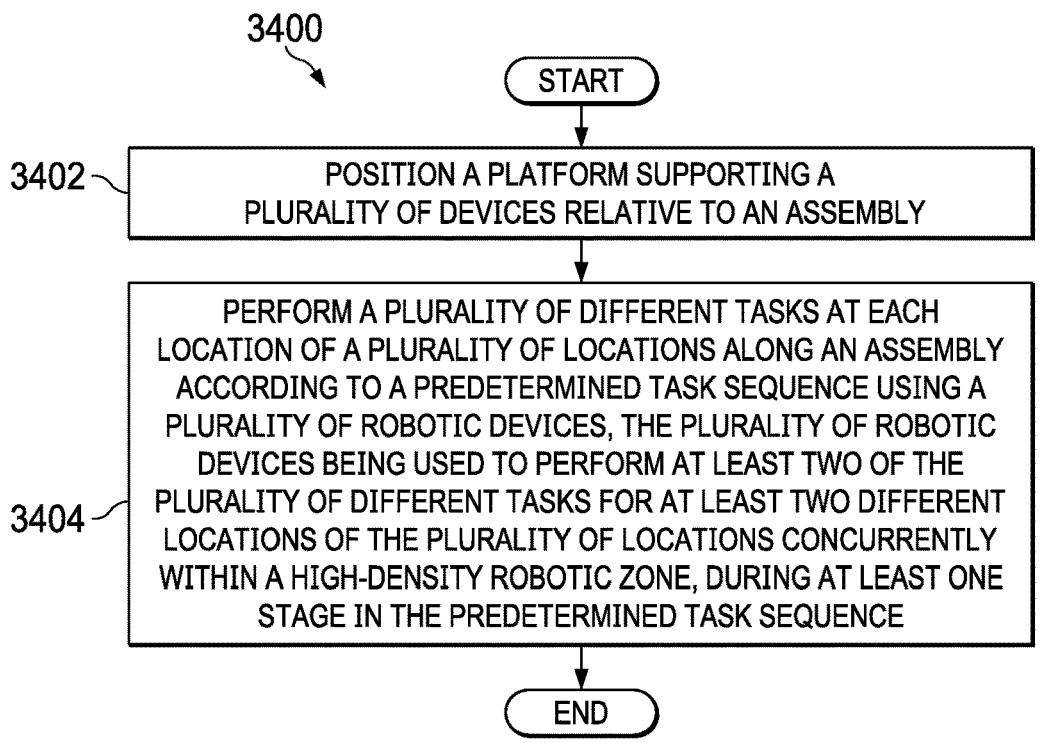
FIG. 34 is a flowchart of a process for performing automated operations using a high-density robotic cell in accordance with an example embodiment.

FIG. 34 is a flowchart of a process for performing automated operations using a high-density robotic cell in accordance with an example embodiment. Process 3400 illustrated in FIG. 34 may be performed using, for example, a cell, such as cell 2404 described in FIG. 24. Process 3400 is a fully automated process.

Process 3400 includes positioning a platform supporting a plurality of devices relative to an assembly (operation 3402). In operation 3402, the assembly may be a fuselage assembly, such as fuselage assembly 313 in FIG. 3. Process 3400 further includes performing a plurality of different tasks at each location of a plurality of locations along an assembly according to a predetermined task sequence using a plurality of robotic devices, the plurality of robotic devices being used to perform at least two of the plurality of different tasks for at least two different locations of the plurality of locations concurrently within a high-density robotic zone, during at least one stage in the predetermined task sequence (operation 3404).

Figure 35:
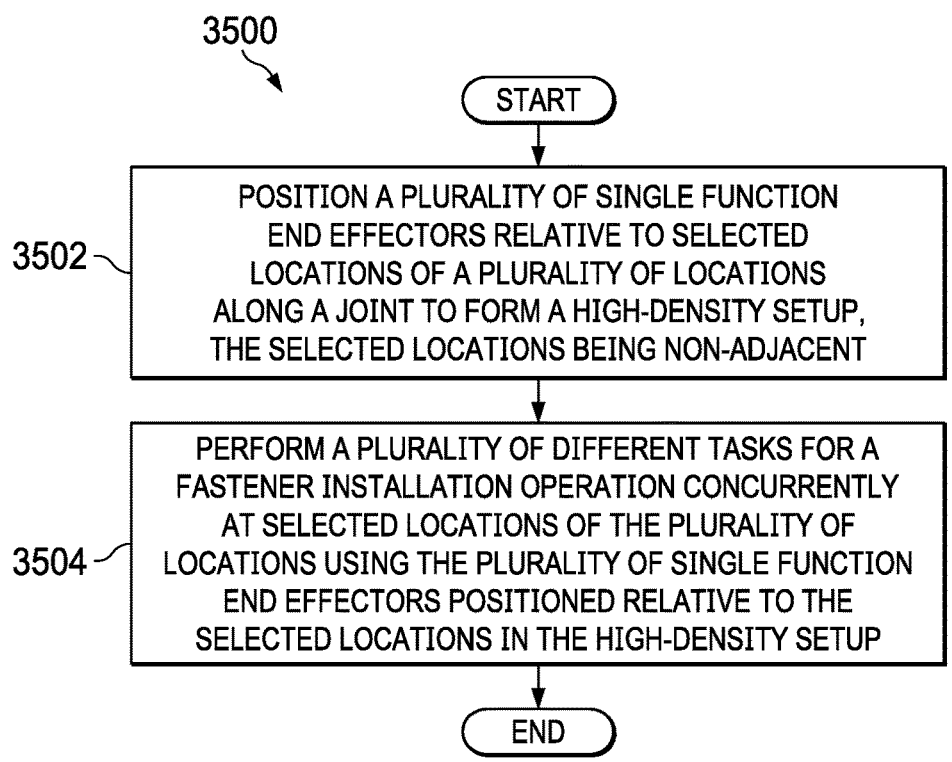
FIG. 35 is a flowchart of a process for installing fasteners at a plurality of locations along a joint in accordance with an example embodiment.

FIG. 35 is a flowchart of a process for installing fasteners at a plurality of locations along a joint in accordance with an example embodiment. Process 3500 illustrated in FIG. 35 may be performed using, for example, a cell, such as cell 2404 described in FIG. 24. Process 3500 is a fully automated process.

Process 3500 includes positioning a plurality of single function end effectors relative to selected locations of a plurality of locations along a joint to form a high-density setup, the selected locations being non-adjacent (operation 3502). The plurality of locations may be locations at which fasteners are to be installed. These locations may be referred to as fastener installation points. Two locations that are non-adjacent means that one or more other locations may be present between these two locations. In other illustrative examples, two non-adjacent locations are locations that are not horizontally adjacent. For example, the two non-adjacent locations may be on different rows. In some cases, the two non-adjacent locations may be vertically aligned but on different rows.

Process 3500 further includes performing a plurality of different tasks for a fastener installation operation concurrently at selected locations of the plurality of locations using the plurality of single function end effectors positioned relative to the selected locations in the high-density setup (operation 3504). The plurality of different tasks may include for example, without limitation, a drilling task and an inspection task; an inspection task and a fastener insertion task; or a drilling task, an inspection task, and a fastener insertion task. In some illustrative examples, a task may be performing a clamp-up sequence using two single function end effectors (e.g., a drilling end effector and an end effector with a nozzle and suction device).

Figure 36:
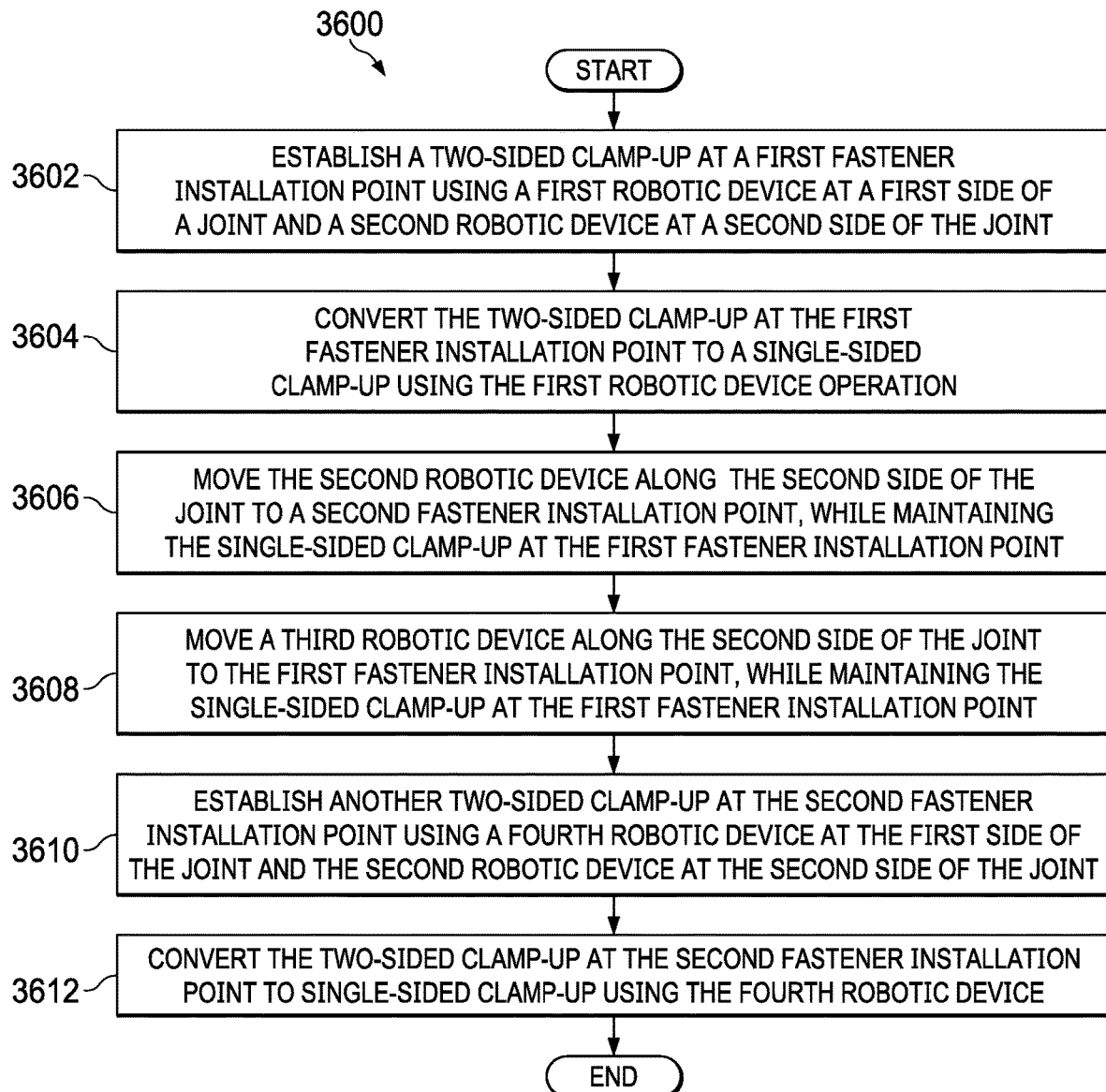
FIG. 36 is a flowchart of a process for providing multiple single-sided clamp-ups in accordance with an example embodiment.

FIG. 36 is a flowchart of a process for providing multiple single-sided clamp-ups in accordance with an example embodiment. Process 3600 illustrated in FIG. 36 may be performed using, for example, a cell, such as cell 2404 described in FIG. 24. Process 3600 is a fully automated process.

Process 3600 includes establishing a two-sided clamp-up at a first fastener installation point using a first robotic device at a first side of a joint and a second robotic device at a second side of the joint (operation 3602). Next, the two-sided clamp-up at the first fastener installation point is converted to a single-sided clamp-up using the first robotic device (operation 3604). The second robotic device is then moved along the second side of the joint to a second fastener installation point, while maintaining the single-sided clamp-up at the first fastener installation point using only the first robotic device (operation 3606). Thereafter, a third robotic device is moved along the second side of the joint to the first fastener installation point, while maintaining the single-sided clamp-up at the first fastener installation point using only the first robotic device (operation 3608).

Another two-sided clamp-up is then established at the second fastener installation point using a fourth robotic device at the first side of the joint and the second robotic device at the second side of the joint (operation 3610). The two-sided clamp-up at the second fastener installation point is converted to single-sided clamp-up using the fourth robotic device (operation 3612).

Thus, in this manner, process 3600 illustrates how multiple single-sided clamp-ups may be established in a serial manner. By providing the single-sided clamp-ups in this manner, the various tasks involved in fastener installation may be also automated in a serial manner.

Figure 37:
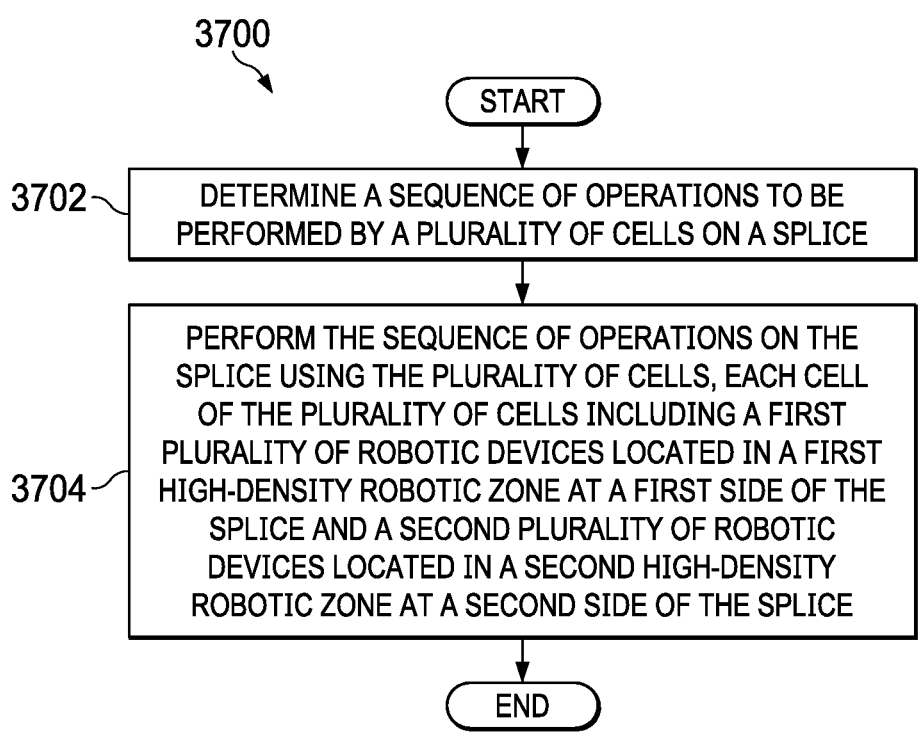

FIG. 37 is a flowchart of a process for providing multiple single-sided clamp-ups in accordance with an example embodiment. Process 3700 illustrated in FIG. 37 may be performed using, for example, a high-density robotic system, such as high-density robotic system 2400 in FIG. 24, which comprises cells 2402. Process 3700 is a fully automated process.

Process 3700 includes determining a sequence of operations to be performed by a plurality of cells on a splice (operation 3702). The sequence of operations is performed on the splice using the plurality of cells, each cell of the plurality of cells including a first plurality of robotic devices located in a first high-density robotic zone at a first side of the splice and a second plurality of robotic devices located in a second high-density robotic zone at a second side of the splice (operation 3704), with the process terminating thereafter.

Operation 3702 may be performed in different ways. In one illustrative example, the sequence for each of the plurality of cells is determined such that one cell is used to perform a fastener installation operation at every $n^{th}$ location along a length of a structure (e.g., across all of the plurality of high-density robotic zones or areas). Another cell may then be determined for use in performing a fastener installation operation at every $m^{th}$ location along the length of the structure to thereby "fill in" the locations not worked on by the first cell. Depending on the implementation, "m" and "n" may be the same or different.

For example, operation 3707 includes a first cell beginning fastener installation operations at a first location along the splice at one stage in the sequence and a second cell beginning fastener installation operations at a second location along the spice after a period of time has passed at another stage in the sequence. The first location and the second location may be different such that the second cell begins filling in the locations skipped by the first cell after the first cell has moved to a different stage in the sequence of operations.

In other illustrative examples, each cell is selected for performing all of the fastener installation operations needed for a corresponding high-density robotic zone or area. In this manner, each cell is designated for a specific corresponding high-density robotic zone area around the splice. In one illustrative example, the first plurality of robotic devices and the second plurality of robotic devices of a first cell in the plurality of cells perform all fastener installation operations for one section along the splice and the first plurality of robotic devices and the second plurality of robotic devices of a second cell in the plurality of cells perform all fastener installation operations for a different section along the splice. Each section along the splice may be associated with two corresponding high-density robotic zones, one of either side of the section.

Using process 3700, fasteners may be installed using the plurality of cells according to any number of different types of sequences based on efficiency. For example, the determination in operation 3702 may result in multiple cells operating simultaneously within a single high-density robotic area around the splice. In other cases, each cell may be designated to perform all of the operations needed in a given high-density robotic area around the splice. In still other cases, the plurality of cells may be used together in a coordinated manner to perform the different operations needed along the entire length of the splice.

Figure 38:
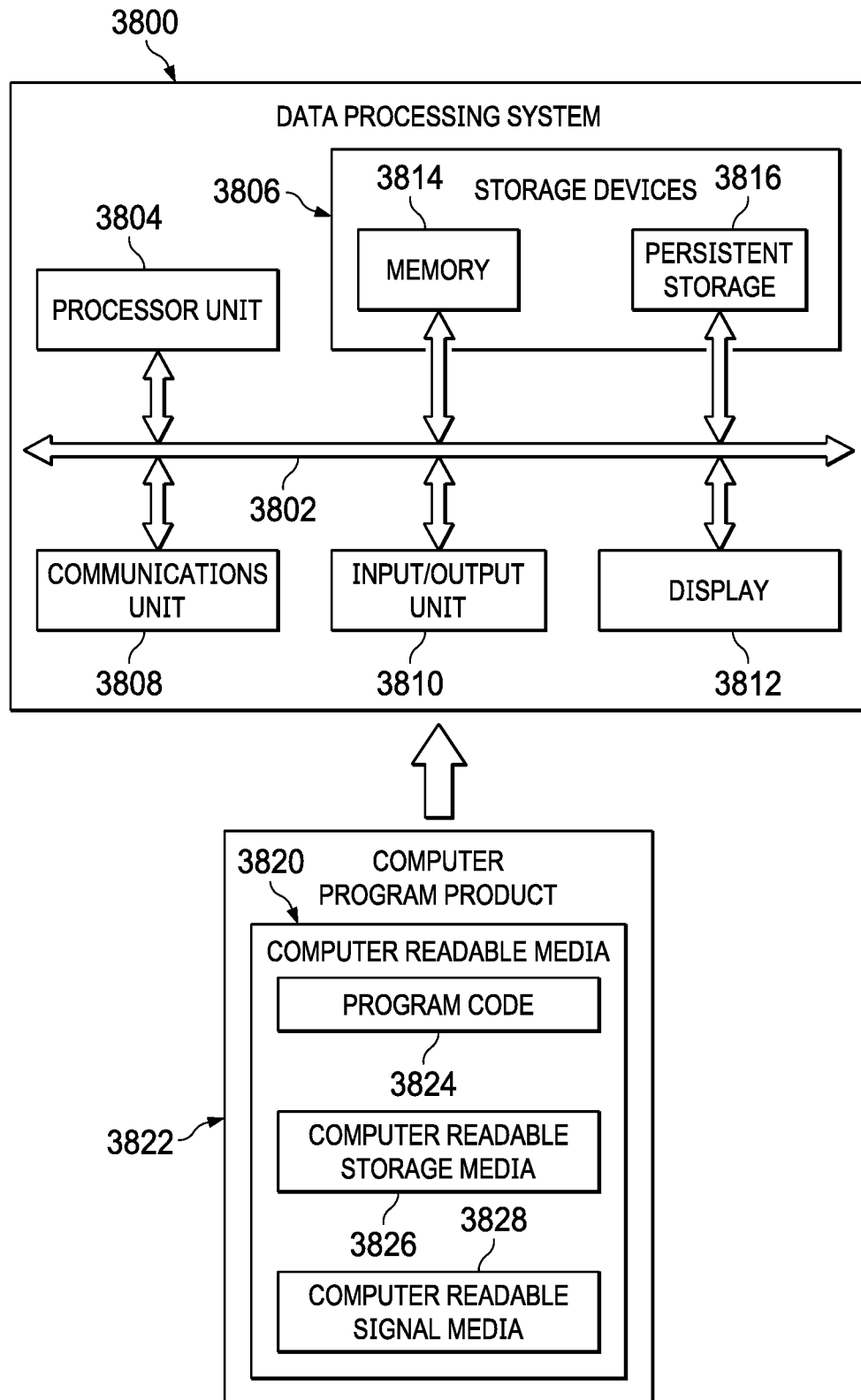
FIG. 38 is a block diagram of a data processing system in accordance with an example embodiment.

Turning now to FIG. 38, an illustration of a data processing system in the form of a block diagram is depicted in accordance with an example embodiment. Data processing system 3800 may be used to implement control system 315 in FIG. 3. As depicted, data processing system 3800 includes communications framework 3802, which provides communications between processor unit 3804, storage devices 3806, communications unit 3808, input/output unit 3810, and display 3812. In some cases, communications framework 3802 may be implemented as a bus system.

Processor unit 3804 is configured to execute instructions for software to perform a number of operations. Processor unit 3804 may comprise a number of processors, a multi-processor core, and/or some other type of processor, depending on the implementation. In some cases, processor unit 3804 may take the form of a hardware unit, such as a circuit system, an application specific integrated circuit (ASIC), a programmable logic device, or some other suitable type of hardware unit.

Instructions for the operating system, applications, and/or programs run by processor unit 3804 may be located in storage devices 3806. Storage devices 3806 may be in communication with processor unit 3804 through communications framework 3802. As used herein, a storage device, also referred to as a computer readable storage device, is any piece of hardware capable of storing information on a temporary and/or permanent basis. This information may include, but is not limited to, data, program code, and/or other information.

Memory 3814 and persistent storage 3816 are examples of storage devices 3806. Memory 3814 may take the form of, for example, a random-access memory or some type of volatile or non-volatile storage device. Persistent storage 3816 may comprise any number of components or devices. For example, persistent storage 3816 may comprise a hard drive, a flash memory, a rewritable optical disk, a rewritable magnetic tape, or some combination of the above. The media used by persistent storage 3816 may or may not be removable.

Communications unit 3808 allows data processing system 3800 to communicate with other data processing systems and/or devices. Communications unit 3808 may provide communications using physical and/or wireless communications links.

Input/output unit 3810 allows input to be received from and output to be sent to other devices connected to data processing system 3800. For example, input/output unit 3810 may allow user input to be received through a keyboard, a mouse, and/or some other type of input device. As another example, input/output unit 3810 may allow output to be sent to a printer connected to data processing system 3800.

Display 3812 is configured to display information to a user. Display 3812 may comprise, for example, without limitation, a monitor, a touch screen, a laser display, a holographic display, a virtual display device, and/or some other type of display device.

In this illustrative example, the processes of the different example embodiments may be performed by processor unit 3804 using computer-implemented instructions. These instructions may be referred to as program code, computer usable program code, or computer readable program code and may be read and executed by one or more processors in processor unit 3804.

In these examples, program code 3818 is located in a functional form on computer readable media 3820, which is selectively removable, and may be loaded onto or transferred to data processing system 3800 for execution by processor unit 3804. Program code 3818 and computer readable media 3820 together form computer program product 3822. In this illustrative example, computer readable media 3820 may be computer readable storage media 3824 or computer readable signal media 3826.

Computer readable storage media 3824 is a physical or tangible storage device used to store program code 3818 rather than a medium that propagates or transmits program code 3818. Computer readable storage media 3824 may be, for example, without limitation, an optical or magnetic disk or a persistent storage device that is connected to data processing system 3800.

Alternatively, program code 3818 may be transferred to data processing system 3800 using computer readable signal media 3826. Computer readable signal media 3826 may be, for example, a propagated data signal containing program code 3818. This data signal may be an electromagnetic signal, an optical signal, and/or some other type of signal that can be transmitted over physical and/or wireless communications links.

The illustration of data processing system 3800 in FIG. 38 is not meant to provide architectural limitations to the manner in which the example embodiments may be implemented. The different example embodiments may be implemented in a data processing system that includes components in addition to or in place of those illustrated for data processing system 3800. Further, components shown in FIG. 38 may be varied from the illustrative examples shown.

Figure 39:
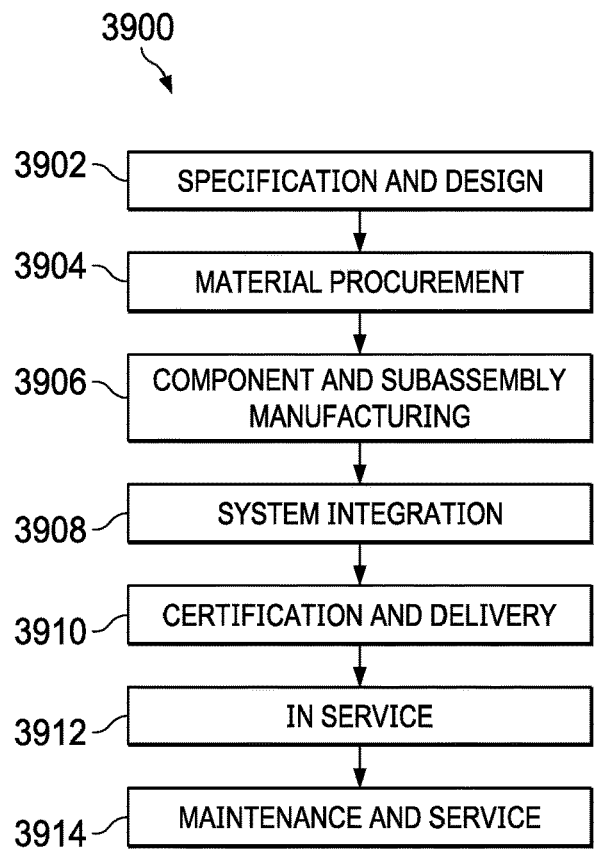
FIG. 39 is an illustration of an aircraft manufacturing and service method in accordance with an example embodiment.
Figure 40:
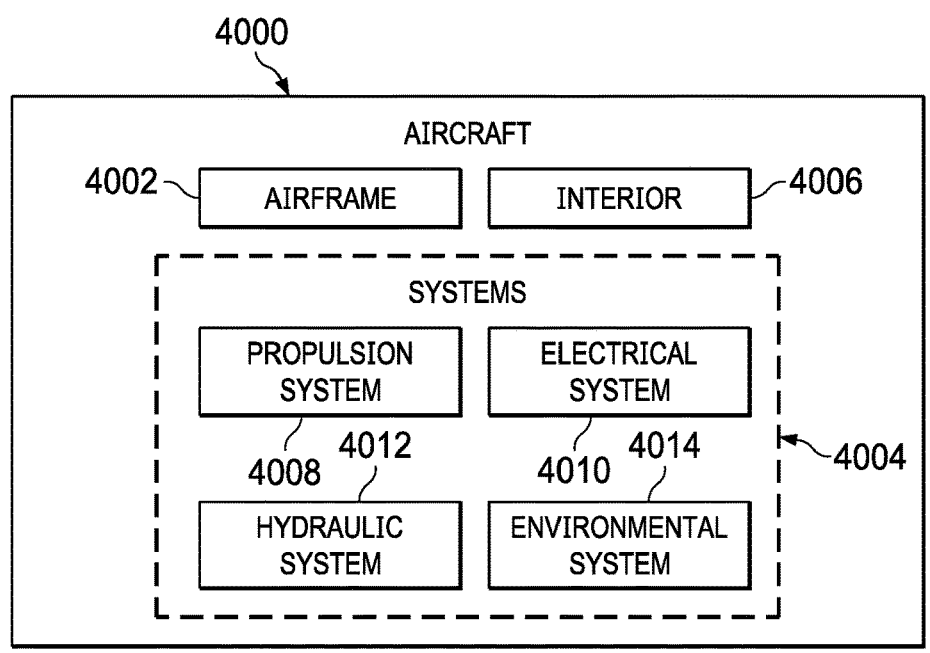
FIG. 40 is a block diagram of an aircraft in accordance with an example embodiment.

Example embodiments of the disclosure may be described in the context of aircraft manufacturing and service method 3900 as shown in FIG. 39 and aircraft 4000 as shown in FIG. 40. Turning first to FIG. 39, an illustration of an aircraft manufacturing and service method is depicted in accordance with an example embodiment. During pre-production, aircraft manufacturing and service method 3900 may include specification and design 3902 of aircraft 4000 in FIG. 40 and material procurement 3904.

During production, component and subassembly manufacturing 3906 and system integration 3908 of aircraft 4000 in FIG. 40 takes place. Thereafter, aircraft 4000 in FIG. 40 may go through certification and delivery 3910 in order to be placed in service 3912. While in service 3912 by a customer, aircraft 4000 in FIG. 40 is scheduled for routine maintenance and service 3914, which may include modification, reconfiguration, refurbishment, and other maintenance or service.

Each of the processes of aircraft manufacturing and service method 3900 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 40, an illustration of an aircraft is depicted in which an example embodiment may be implemented. In this example, aircraft 4000 is produced by aircraft manufacturing and service method 3900 in FIG. 39 and may include airframe 4002 with plurality of systems 4004 and interior 4006. Examples of systems 4004 include one or more of propulsion system 4008, electrical system 4010, hydraulic system 4012, and environmental system 4014. Any number of other systems may be included. Although an aerospace example is shown, different example embodiments may be applied to other industries, such as the automotive industry.

Apparatuses and methods embodied herein may be employed during at least one of the stages of aircraft manufacturing and service method 3900 in FIG. 39. In particular, assembly 304 from FIG. 3 or fuselage assembly 102 from FIG. 1 may be manufactured during any one of the stages of aircraft manufacturing and service method 3900. For example, without limitation, assembly system 302 from FIG. 3 or assembly system 413 from FIG. 4 may be used to join parts of assembly 304 from FIG. 3 or lap splice 400 from FIG. 4, respectively, during at least one of component and subassembly manufacturing 3906, system integration 3908, routine maintenance and service 3914, or some other stage of aircraft manufacturing and service method 3900. Further, assembly 304 or lap splice 400 may be used to form at least one of airframe 4002 or interior 4006 of aircraft 4000.

Still further, high-density robotic system 2400 of FIG. 24 or any one of plurality of cells 2402 described in FIG. 24 may be used to perform automated fastener installation operations during any one of the stages of aircraft manufacturing and service method 3900. For example, high-density robotic system 2400 of FIG. 24 or any one of plurality of cells 2402 described in FIG. 24 may be used during at least one of component and subassembly manufacturing 3906, system integration 3908, routine maintenance and service 3914, or some other stage of aircraft manufacturing and service method 3900. Additionally, these automated fastener installation operations may be performed to build at least one of airframe 4002 or interior 4006 of aircraft 4000.

In one illustrative example, components or subassemblies produced in component and subassembly manufacturing 3906 in FIG. 39 may be fabricated or manufactured in a manner similar to components or subassemblies produced while aircraft 4000 is in service 3912 in FIG. 39. As yet another example, one or more apparatus embodiments, method embodiments, or a combination thereof may be utilized during production stages, such as component and subassembly manufacturing 3906 and system integration 3908 in FIG. 39. One or more apparatus embodiments, method embodiments, or a combination thereof may be utilized while aircraft 4000 is in service 3912 and/or during maintenance and service 3914 in FIG. 39. The use of a number of the different example embodiments may substantially expedite the assembly of and/or reduce the cost of aircraft 4000.

Thus, the example embodiments provide a method and apparatus for easily and efficiently performing automated fastener installation operations. The example embodiments describe single function end effectors that provide a single-sided (one-sided) clamp-up solution to maintain the clamping of parts while other single function end effectors are being swapped out on the opposite side.

Using single function end effectors that perform distinct, specialized tasks may provide for smaller, lighter, and less complex end effectors. The simplicity of these single function end effectors may improve the efficiency, reliability, and maintenance demands of these end effectors and may reduce the overall size of the supporting robotic devices to which these end effectors are coupled.

With these types of single function end effectors and the methods and apparatuses described in the different example embodiments, multiple automated operations, such as automated fastener installation operations, may be performed quickly and efficiently. In particular, overall production times may be reduced. The example embodiments described provide time and cost savings, while also greatly reducing the complexity of the overall process needed for performing hundreds to thousands of fastener installation operations accurately.

In one example embodiment, a method for performing a fastener installation is provided. A first mechanical force is applied to a first part and a second mechanical force is applied to a second part to form a clamp-up of the first part and the second part. Air is suctioned through a fastener hole, which is formed by a first hole in the first part that is aligned with a second hole in the second part, to pull the second part towards the first part and thereby maintain the clamp-up of the first part and the second part.

In still yet another example embodiment, a method is provided for aligning a first hole in a first panel with a second hole in a second panel to define a through-hole. A wall that defines the second hole is gripped from within the through-hole to pull the second panel towards the first panel and thereby establish a clamp-up of the first panel and the second panel.

In another example embodiment, a method for maintaining a clamp-up is provided. A first mechanical force and a second mechanical force are applied to a first part and a second part, respectively, to form the clamp-up. The first part forms a first side of the clamp-up and the second part forms a second side of the clamp-up. Air is suctioned, from the first side of the clamp-up, through a fastener hole that extends through the first part and the second part to pull the second part towards the first part. The first mechanical force and the second mechanical force are removed simultaneously while continuing to suction such that the suctioning independently maintains the clamp-up after removal of the first mechanical force and the second mechanical force.

In another example embodiment, a method is provided for maintaining a clamp-up. Air is suctioned from a first side of a clamp-up of a first part and a second part through a fastener hole formed by a first hole in the first part and a second hole in the second part to pull the second part towards the first part and thereby provide the clamp-up of the first part and the second part.

In yet another example embodiment, a method for maintaining a clamp-up is provided. A first end effector at a first side of a panel joint applies a first force via contact with the first side of a panel joint. A second end effector at a second side of the panel joint applies a second force that is equal and opposite to the first force via contact with the second side of the panel joint to establish the clamp-up. The first end effector at the first side of the panel joint maintains the clamp-up after the second end effector is removed from contact with the second side.

In still yet another example embodiment, a method for a single-sided clamp-up is provided. A single function end effector positioned at a first side of a panel joint applies a first force to a first panel of the panel joint. The single function end effector applies a second force that is equal and opposite to the first force to a second panel of the panel joint to thereby provide the single-sided clamp-up of the first panel and the second panel.

In another example embodiment, a method of providing a clamp-up is provided. The method includes reaching through a first hole in a first part to grip a wall that defines a second hole in a second part to thereby pull the second part against the first part.

In an example embodiment, an apparatus for maintaining a clamp-up comprises a nozzle and a suction device. The nozzle has a nozzle diameter greater than a hole diameter of a first hole in a first part. The nozzle is used to apply a first mechanical force to a first side of the clamp-up when engaged with the first part. The suction device is for suctioning air, from the first side of the clamp-up, through a fastener hole formed by the first hole in the first part and a second hole in a second part and through the nozzle. The air is suctioned with a volumetric flow rate sufficient to maintain the clamp-up of the first part and the second part from the first side without requiring an additional force at a second side of the clamp-up.

In another example embodiment, an apparatus for forming a clamp-up comprises an end effector. The end effector is positioned at a first side of a panel joint and applies a first clamp-up force to a first panel of a panel joint and an equal and opposite second clamp-up force to a second panel of the panel joint to provide the clamp-up.

In another example embodiment, an apparatus for forming a clamp-up comprises a first clamp-up end effector on a first side of a panel joint; a second clamp-up end effector on a second side of a panel joint; and a through-hole clamping apparatus incorporated into the first clamp-up end effector. The first clamp-up end effector is in communication with the second clamp-up end effector.

In one example embodiment, a method for performing automated tasks for an assembly is provided. A first plurality of robotic devices is positioned relative to a first side of the assembly. A second plurality of robotic devices is positioned relative to a second side of the assembly, each of the second plurality of robotic devices being used to perform a corresponding task. A plurality of tasks is performed at each of a plurality of locations on the assembly using the first plurality of robotic devices and the second plurality of robotic devices. The second plurality of robotic devices concurrently perform tasks at the plurality of locations while the first plurality of robotic devices independently maintain a clamp-up at each of the plurality of locations.

In another example embodiment, a method is provided for building a fuselage assembly of an aircraft. A plurality of cells is positioned relative to corresponding sections of the fuselage assembly, each of the plurality of cells comprising a first plurality of robotic devices positioned relative to a first side of the fuselage assembly; and a second plurality of robotic devices positioned relative to a second side of the fuselage assembly. An automated operation is performed at each of a plurality of locations at each of the corresponding sections of the fuselage assembly concurrently using the plurality of cells, wherein robotic devices of each cell are interchangeable to perform different tasks of the automated operation according to a predetermined task sequence.

In yet another example embodiment, an apparatus comprises a first plurality of robotic devices; a second plurality of robotic devices; and a control system. Each of the second plurality of robotic devices is coupled to a single function end effector. The control system controls the second plurality of robotic devices to concurrently perform tasks at a plurality of locations on an assembly, while the first plurality of robotic devices independently maintain a clamp-up at each of the plurality of locations.

In another example embodiment, a high-density robotic system comprises a first plurality of robotic devices; a second plurality of robotic devices; a first platform; and a second platform. Each of the first plurality of robotic devices is capable of providing a single-sided clamp-up. The second plurality of robotic devices includes a first robotic device coupled to a drilling end effector; a second robotic device coupled to an inspection end effector; and a third robotic device coupled to a fastener insertion end effector. The first platform supports the first plurality of robotic devices, the first platform being sized to fit and move within an interior of a fuselage assembly. The second platform supports the second plurality of robotic devices, the second platform being sized for positioning and movement along an exterior of the fuselage assembly.

In another example embodiment, a method is provided for performing automated fastener installation operations along a fuselage assembly for an aircraft. A first platform supporting a first plurality of robotic devices of a robotic cell is positioned within an interior of a fuselage assembly relative to a selected section of the fuselage assembly. A second platform supporting a second plurality of robotic devices of the robotic cell is positioned along an exterior of the fuselage assembly relative to the selected section of the fuselage assembly. Automated fastener installation operations are performed at selected fastener installation points on the selected section of the fuselage assembly using a first plurality of end effectors coupled to the first plurality of robotic devices and a second plurality of end effectors coupled to the second plurality of robotic devices, with the first plurality of end effectors being used to provide single-sided clamp-up at the selected fastener installation points.

In another example embodiment, a method is provided for performing automated operations using a high-density robotic cell. A plurality of different tasks is performed at each location of a plurality of locations along an assembly according to a predetermined task sequence using a plurality of robotic devices. The plurality of robotic devices is used to perform at least two of the plurality of different tasks for at least two different locations of the plurality of locations concurrently within a high-density robotic zone, during at least one stage in the predetermined task sequence.

In another example embodiment, a method is provided for installing fasteners at a plurality of locations along a joint. A plurality of different tasks for a fastener installation operation is performed concurrently at selected locations of the plurality of locations using a plurality of single function end effectors positioned relative to the selected locations in a high-density setup.

In another example embodiment, a method is provided for providing multiple single-sided clamp-ups. A two-sided clamp-up is established at a first fastener installation point using a first robotic device at a first side of a joint and a second robotic device at a second side of the joint. The two-sided clamp-up at the first fastener installation point is converted to a single-sided clamp-up using the first robotic device. The second robotic device is moved along the second side of the joint to a second fastener installation point, while maintaining the single-sided clamp-up at the first fastener installation point. A third robotic device is moved along the second side of the joint to the first fastener installation point, while maintaining the single-sided clamp-up at the first fastener installation point.

In another example embodiment, a method is provided for installing fasteners on a splice. A sequence of operations to be performed by a plurality of cells on the splice is determined. The sequence of operations is performed on the splice using the plurality of cells, each cell of the plurality of cells including a first plurality of robotic devices located in a first high-density robotic zone at a first side of the splice and a second plurality of robotic devices located in a second high-density robotic zone at a second side of the splice.

The flowcharts and block diagrams in the different depicted embodiments illustrate the architecture, functionality, and operation of some possible implementations of apparatuses and methods in an example embodiment. In this regard, each block in the flowcharts or block diagrams may represent a module, a segment, a function, and/or a portion of an operation or step.

In some alternative implementations of an example embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

As used herein, the phrase "at least one of," when used with a list of items, means different combinations of one or more of the listed items may be used and only one of the items in the list may be needed. The item may be a particular object, thing, step, operation, process, or category. In other words, "at least one of" means any combination of items or number of items may be used from the list, but not all of the items in the list may be required. For example, without limitation, "at least one of item A, item B, or item C" or "at least one of item A, item B, and item C" may mean item A; item A and item B; item B; item A, item B, and item C; item B and item C; or item A and C. In some cases, "at least one of item A, item B, or item C" or "at least one of item A, item B, and item C" may mean, but is not limited to, two of item A, one of item B, and ten of item C; four of item B and seven of item C; or some other suitable combination.

The description of the different example embodiments has been presented for purposes of illustration and description, and is not intended to be exhaustive or limited to the embodiments in the form disclosed. Many modifications and variations will be apparent to those of ordinary skill in the art. Further, different example embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A high-density robotic system comprising:
 a first plurality of robotic devices, each of the first plurality of robotic devices being capable of providing a single-sided clamp-up;
 a second plurality of robotic devices, the second plurality of robotic devices including:
  a first robotic device coupled to a drilling end effector;
  a second robotic device coupled to an inspection end effector; and
  a third robotic device coupled to a fastener insertion end effector;
 a first platform that supports the first plurality of robotic devices, the first platform being sized to fit and move within an interior of a fuselage assembly;
 a second platform that supports the second plurality of robotic devices, the second platform being sized for positioning and movement along an exterior of the fuselage assembly; and
 a control system configured to control the first plurality of robotic devices and the second plurality of robotic devices, the control system being configured to control each of the first plurality of robotic devices to provide the single-sided clamp-up of at least two parts of the fuselage assembly at a location of a plurality of locations when a corresponding hole has been drilled at the location through the at least two parts of the fuselage assembly, the single-sided clamp-up being maintained at the location while the control system causes at least one of the drilling, inspection, and fastener insertion end effectors to be switched out at the location with at least one other one of the drilling, inspection, and fastener insertion end effectors.

2. The high-density robotic system of claim 1, wherein the second platform is coupled to an automated guided vehicle to allow the second platform to be moved relative to the exterior of the fuselage assembly;
 wherein providing each single-sided clamp-up comprises suctioning by the respective one of the first plurality of robotic devices through the corresponding hole to pull at least one of the at least two parts towards one or more other ones of the at least two parts.

3. The high-density robotic system of claim 1, wherein:
 the control system is for controlling the first plurality of robotic devices and the second plurality of robotic devices to perform an automated operation at each of the plurality of locations on the fuselage assembly concurrently and for controlling interchanging of the second plurality of robotic devices to perform different tasks of the automated operation according to a predetermined task sequence; and
 each single-sided clump-up is maintained using suctioning through the corresponding hole from at least before the drilling end effector moves away from the corresponding hole upon drilling the corresponding hole, wherein the suctioning through the corresponding hole continues at least until the fastener insertion end effector inserts a fastener into the corresponding hole.

4. A method for building the fuselage assembly of an aircraft using the system of claim 1.

5. A method for performing automated fastener installation operations along a fuselage assembly for an aircraft, the method comprising:
 positioning a first platform supporting a first plurality of robotic devices of a robotic cell within an interior of a fuselage assembly relative to a selected section of the fuselage assembly;
 positioning a second platform supporting a second plurality of robotic devices of the robotic cell along an exterior of the fuselage assembly relative to the selected section of the fuselage assembly; and
 performing automated fastener installation operations at selected fastener installation points on the selected section of the fuselage assembly using a first plurality of end effectors coupled to the first plurality of robotic devices and a second plurality of end effectors coupled to the second plurality of robotic devices, with the first plurality of end effectors being used to provide single-sided clamp-up at the selected fastener installation points;
 wherein each of the first plurality of end effectors provides the single-sided clamp-up of at least two parts of the fuselage assembly at a location of a plurality of locations and maintains the single-sided clamp-up at the location while at least one of the second plurality of end effectors is switched out at the location with at least one other one of the second plurality of end effectors.

6. The method of claim 5, wherein:
 performing each automated fastener installation operation comprises performing a plurality of different tasks at each location of the plurality of locations along the fuselage assembly according to a predetermined task sequence using the first and second pluralities of robotic devices, each of the second plurality of robotic devices being used to perform a respective one of the plurality of tasks at two or more of the plurality of locations;
 wherein the plurality of tasks are performed at the plurality of locations in consecutive stages, and in each of the consecutive stages, each of the second plurality of robotic devices is used to perform the respective one of the plurality of tasks at at most one of the plurality of locations;
 wherein in at least one of the consecutive stages, at least two of the second plurality of robotic devices are used to perform at least two of the plurality of different tasks for at least two different locations of the plurality of locations concurrently within a high-density robotic zone.

7. The method of claim 6, wherein the at least two of the plurality of different tasks comprise a drilling task performed at a first location of the plurality of locations using a drilling end effector coupled to a first robotic device of the second plurality of robotic devices and an inspection task performed at a second location of the plurality of locations using an inspection end effector coupled to a second robotic device of the plurality of robotic devices, the first robotic device and the second robotic device being positioned in a high-density setup while performing drilling of the drilling task and inspection of the inspection task, at least part of the drilling and at least part of the inspection being performed simultaneously.

8. The method of claim 6, wherein the at least two of the plurality of different tasks comprise a drilling task performed at a first location of the plurality of locations using a drilling end effector coupled to a first robotic device of the second plurality of robotic devices and a fastener insertion task performed at a second location of the plurality of locations using a fastener insertion end effector coupled to a second robotic device of the second plurality of robotic devices, the first robotic device and the second robotic being positioned in a high-density setup while performing drilling of the drilling task and fastener insertion of the fastener insertion task, at least part of the drilling and at least part of the fastener insertion being performed simultaneously.

9. The method of claim 6, wherein performing the plurality of tasks comprises:
providing, simultaneously, multiple single-sided clamp-ups from a first side of the assembly during at least part of the time when the plurality of tasks is performed at a second side of the assembly.

10. The method of claim 6, wherein at least three different tasks of the plurality of tasks are performed at each of three different locations of the plurality of locations along the assembly according to the predetermined task sequence using the second plurality of robotic devices, the second plurality of robotic devices being used to perform a different one of the three different tasks concurrently at the three different locations during at least two of the consecutive stages in the predetermined task sequence.

11. The method of claim 6, wherein performing the plurality of tasks comprises:
performing two different tasks at each of two different locations along the assembly according to the predetermined task sequence using the second plurality of robotic devices, the second plurality of robotic devices being used to perform a different one of the two different tasks concurrently at the two different locations during at least two stages in the predetermined task sequence.

12. A system for installing fasteners at a plurality of locations along a joint, the system comprising:
a first plurality of robotic devices, each of the first plurality of robotic devices being capable of providing a single-sided clamp-up at a location of the plurality of locations during at least part of fastener installation at the location, the single-sided clamp-up clamping at least two parts of the joint from a first side of the joint; and
a second plurality of robotic devices capable of performing different tasks to install a fastener at each location, the second plurality of robotic devices being capable of performing the different tasks from a second side of the joint, each of the second plurality of robotic devices being capable of performing only a respective one of the different tasks;
wherein the system comprises a control system for controlling each of the first plurality of robotic devices to provide the single-sided clamp-up at a corresponding location of the plurality of locations while at least one of the second plurality of robotic devices is switched out at the corresponding location with at least one other one of the second plurality of robotic devices.

13. The system of claim 12, wherein each of the first plurality of robotic devices is capable of providing the single-sided clamp-up by suctioning through a hole passing through the at least two parts.

14. The system of claim 12, wherein the plurality of different tasks includes a drilling task for drilling a hole, an inspection task for inspecting the hole, and a fastener insertion task for installing a fastener in the hole.

15. The method of claim 14, wherein each of the first plurality of robotic devices is capable of providing the single-sided clamp-up by suctioning through a hole drilled in the drilling task.

16. The system of claim 12, wherein performing the plurality of different tasks comprises:
performing a clamp-up sequence at a first location of the plurality of locations;
providing a single-sided clamp-up at a second location of the plurality of locations at the first side of the joint; and
performing, simultaneously with at least part of the clamp-up sequence, an inspection task at the second location at the second side of the joint.

17. The system of claim 12, wherein performing the plurality of different tasks comprises:
performing an inspection task at a first location of the plurality of locations;
maintaining a single-sided clamp-up at a second location of the plurality of locations at the first side of the joint; and
performing, simultaneously with at least part of the inspection task, a fastener insertion task at the second location at the second side of the joint.

18. A control system for controlling fastener installation at each of a plurality of locations along a joint, the controlling comprising:
controlling each of a first plurality of robotic devices to provide a single-sided clamp-up at a location of the plurality of locations during at least part of fastener installation at the location, the single-sided clamp-up clamping at least two parts of the joint from a first side of the joint; and
controlling a second plurality of robotic devices to perform different tasks to install a fastener at each location, the second plurality of robotic devices performing the different tasks from a second side of the joint, each of the second plurality of robotic devices performing only a respective one of the different tasks;
wherein the control system is configured to control each of the first plurality of robotic devices to provide the single-sided clamp-up at a corresponding location of the plurality of locations while at least one of the second plurality of end effectors is switched out at the corresponding location with at least one other one of the second plurality of end effectors.

19. The control system of claim 18, wherein at each location, the single-sided clamp up is provided after drilling a hole at the location until at least a fastener insertion into the hole.

20. A method for providing multiple single-sided clamp-ups, the method comprising:
establishing a two-sided clamp-up to clamp at least two parts together at a first fastener installation point using a first robotic device at a first side of a joint to be formed by the at least two parts and a second robotic device at a second side of the joint;
converting the two-sided clamp-up at the first fastener installation point to a single-sided clamp-up to clamp the at least two parts together using the first robotic device;
moving the second robotic device along the second side of the joint to a second fastener installation point, while maintaining the single-sided clamp-up at the first fastener installation point; and moving a third robotic device along the second side of the joint to the first fastener installation point, while maintaining the single-sided clamp-up at the first fastener installation point.

21. The method of claim 20, further comprising:

establishing the two-sided clamp-up at the second fastener installation point using a fourth robotic device at the first side of the joint and the second robotic device at the second side of the joint; and converting the two-sided clamp-up at the second fastener installation point to the single-sided clamp-up using the fourth robotic device.

22. The method of claim 21, further comprising:

moving the second robotic device away from the second fastener installation point, while maintaining the single-sided clamp-up at the second fastener installation point; and moving the third robotic device along the second side of the joint to the second fastener installation point, while maintaining the single-sided clamp-up at the second fastener installation point.

23. A method of installing fasteners on a splice, the method comprising:

determining a sequence of operations to be performed by a plurality of cells on the splice; and performing the sequence of operations on the splice using the plurality of cells, each cell of the plurality of cells including a first plurality of robotic devices located in a first high-density robotic zone at a first side of the splice and a second plurality of robotic devices located in a second high-density robotic zone at a second side of the splice;

wherein in each of the plurality of cells, each of the first plurality of robotic devices provides a single-sided clamp-up of the splice at a location of a plurality of locations and maintains the single-sided clamp-up at the location while at least one of the second plurality of robotic devices is switched out at the location with at least one other one of the second plurality of robotic devices.

24. The method of claim 23, wherein a first cell of the plurality of cells performs a fastener installation operation at every $n^{th}$ location along a length of the splice and a second cell of the plurality of cells performs the fastener installation operation at every $m^{th}$ location along the length of the splice.

25. The method of claim 24, wherein the first cell begins performing fastener installation operations at a first location along the splice and wherein the second cell begins performing fastener installation operations at a second location along the spice after a period of time has passed.

26. The method of claim 23, wherein the first plurality of robotic devices and the second plurality of robotic devices of a first cell in the plurality of cells perform all fastener installation operations for one section along the splice and wherein the first plurality of robotic devices and the second plurality of robotic devices of a second cell in the plurality of cells perform all fastener installation operations for a different section along the splice.

* * * * *